United States Patent
Yamada et al.

(10) Patent No.: US 9,143,013 B2
(45) Date of Patent: Sep. 22, 2015

(54) ROTOR AND MOTOR

(71) Applicant: ASMO Co., Ltd., Shizuoka-ken (JP)

(72) Inventors: Yoji Yamada, Hamamatsu (JP); Chie Morita, Kosai (JP); Yoshiaki Takemoto, Toyohashi (JP); Makoto Morisaki, Kosai (JP)

(73) Assignee: ASMO Co. Ltd, Shizuoka-ken (JP)

( * ) Notice: Subject to any disclaimer, the term of this patent is extended or adjusted under 35 U.S.C. 154(b) by 246 days.

(21) Appl. No.: 13/662,810

(22) Filed: Oct. 29, 2012

(65) Prior Publication Data

US 2013/0113323 A1 May 9, 2013

(30) Foreign Application Priority Data

| Oct. 31, 2011 | (JP) | 2011-239508 |
| Oct. 31, 2011 | (JP) | 2011-239510 |
| Oct. 31, 2011 | (JP) | 2011-239511 |
| Oct. 31, 2011 | (JP) | 2011-239512 |
| Oct. 31, 2011 | (JP) | 2011-239514 |
| Nov. 2, 2011 | (JP) | 2011-241284 |

(51) Int. Cl.
*H02K 21/12* (2006.01)
*H02K 1/27* (2006.01)
*H02K 16/02* (2006.01)

(52) U.S. Cl.
CPC ............ *H02K 1/2706* (2013.01); *H02K 16/02* (2013.01); *H02K 1/276* (2013.01); *H02K 1/2713* (2013.01); *H02K 1/2773* (2013.01)

(58) Field of Classification Search
USPC .................. 310/156.43, 156.66–156.73, 263
See application file for complete search history.

(56) References Cited

U.S. PATENT DOCUMENTS

| 2,212,192 A | * | 8/1940 | Howell .................... 310/156.66 |
| 2,802,959 A | * | 8/1957 | Powers .................... 310/156.66 |
| 3,206,623 A | | 9/1965 | Snowdon |
| 3,555,327 A | | 1/1971 | Terry |
| 4,388,545 A | | 6/1983 | Honsinger et al. |
| 4,882,515 A | | 11/1989 | Radomski |
| 4,959,577 A | | 9/1990 | Radomski |
| 5,132,581 A | | 7/1992 | Kusase |
| 5,177,391 A | | 1/1993 | Kusase |
| 5,483,116 A | | 1/1996 | Kusase et al. |

(Continued)

FOREIGN PATENT DOCUMENTS

| EP | 2157679 A1 | 2/2010 |
| GB | 987882 A | 3/1965 |

(Continued)

OTHER PUBLICATIONS

Notice of Allowance corresponding to U.S. Appl. No. 13/662,781, dated Jan. 22, 2015, 26 pages.

(Continued)

*Primary Examiner* — Thanh Lam
(74) *Attorney, Agent, or Firm* — Kilpatrick Townsend & Stockton LLP

(57) ABSTRACT

A rotor having an axial direction includes at least a pair of rotor cores arranged in the axial direction, and a field magnet located between the rotor cores and magnetized in the axial direction. Each of the rotor cores includes a plurality of claw poles extending in the axial direction. Each of the rotor cores includes a magnetic flux controlling section, which appropriately causes a magnetic flux to flow to the claw poles.

18 Claims, 23 Drawing Sheets

(56) References Cited

U.S. PATENT DOCUMENTS

| | | | |
|---|---|---|---|
| 5,502,424 A | 3/1996 | Kato et al. | |
| 5,543,676 A | 8/1996 | York et al. | |
| 5,663,605 A | 9/1997 | Evans et al. | |
| 5,747,913 A | 5/1998 | Amlee et al. | |
| 5,780,953 A | 7/1998 | Umeda et al. | |
| 5,903,084 A * | 5/1999 | Asao et al. | 310/263 |
| 5,925,964 A | 7/1999 | Kusase et al. | |
| 5,969,459 A | 10/1999 | Taniguchi et al. | |
| 6,002,194 A | 12/1999 | Asao | |
| 6,013,967 A | 1/2000 | Ragaly et al. | |
| 6,013,968 A | 1/2000 | Lechner et al. | |
| 6,037,695 A * | 3/2000 | Kanazawa et al. | 310/263 |
| 6,104,118 A | 8/2000 | Kanazawa et al. | |
| 6,157,111 A | 12/2000 | Asao | |
| 6,311,383 B1 | 11/2001 | Umeda et al. | |
| 6,331,746 B1 | 12/2001 | Fujitani et al. | |
| 6,426,581 B1 | 7/2002 | York et al. | |
| 6,437,477 B1 | 8/2002 | Krefta et al. | |
| 6,455,978 B1 | 9/2002 | Krefta et al. | |
| 6,538,358 B1 | 3/2003 | Krefta et al. | |
| 6,720,703 B1 | 4/2004 | Braun et al. | |
| 6,853,111 B2 | 2/2005 | Umeda et al. | |
| 6,885,129 B1 | 4/2005 | Oohashi et al. | |
| 7,569,968 B2 | 8/2009 | Nakamura | |
| 7,605,519 B2 * | 10/2009 | Morita et al. | 310/263 |
| 7,737,602 B2 | 6/2010 | Harada | |
| 7,750,529 B2 | 7/2010 | Tajima et al. | |
| 7,843,107 B2 * | 11/2010 | Inoue et al. | 310/263 |
| 7,893,594 B2 * | 2/2011 | Fujita et al. | 310/263 |
| 7,919,900 B2 | 4/2011 | Kusase | |
| 7,969,057 B2 | 6/2011 | Kusase et al. | |
| 7,994,684 B2 * | 8/2011 | Inoue et al. | 310/263 |
| 8,067,874 B2 | 11/2011 | Kusase | |
| 8,624,459 B2 | 1/2014 | Tokizawa | |
| 2003/0102758 A1 | 6/2003 | Kusase et al. | |
| 2005/0062348 A1 | 3/2005 | Ohnishi et al. | |
| 2005/0184617 A1* | 8/2005 | Fujita et al. | 310/263 |
| 2006/0202582 A1 | 9/2006 | Umesaki et al. | |
| 2007/0029886 A1 | 2/2007 | Shiga | |
| 2007/0046139 A1 | 3/2007 | Ishizuka | |
| 2007/0090699 A1 | 4/2007 | Ohnishi et al. | |
| 2007/0236098 A1 | 10/2007 | Kusase et al. | |
| 2007/0241633 A1 | 10/2007 | Kusase et al. | |
| 2007/0267938 A1 | 11/2007 | Nishimura | |
| 2008/0007126 A1 | 1/2008 | Popov et al. | |
| 2008/0018190 A1 | 1/2008 | Takahata et al. | |
| 2008/0048516 A1 | 2/2008 | Oowatari et al. | |
| 2008/0088199 A1 | 4/2008 | Hamada | |
| 2008/0211337 A1 | 9/2008 | Lutz et al. | |
| 2008/0315714 A1 | 12/2008 | Badey et al. | |
| 2009/0218907 A1 | 9/2009 | Kusase | |
| 2010/0148612 A1 | 6/2010 | Takemoto et al. | |
| 2010/0226803 A1 | 9/2010 | Tajima et al. | |
| 2013/0057102 A1 | 3/2013 | Yamada et al. | |
| 2013/0069471 A1 | 3/2013 | Kadiri et al. | |
| 2013/0106208 A1 | 5/2013 | Yamada et al. | |
| 2013/0106229 A1 | 5/2013 | Goto et al. | |
| 2013/0106230 A1 | 5/2013 | Morita et al. | |
| 2013/0113329 A1 | 5/2013 | Yokoyama et al. | |
| 2013/0121856 A1 | 5/2013 | Yamada et al. | |
| 2013/0147288 A1 | 6/2013 | Jack et al. | |
| 2013/0270928 A1 | 10/2013 | Nord | |

FOREIGN PATENT DOCUMENTS

| | | |
|---|---|---|
| JP | S52-74412 U | 6/1977 |
| JP | S52145708 A | 12/1977 |
| JP | S56-12846 A | 2/1981 |
| JP | S6043059 A | 3/1985 |
| JP | 62-145475 U | 9/1987 |
| JP | H01101166 U | 7/1989 |
| JP | 03-265451 A | 11/1991 |
| JP | H03-251067 A | 11/1991 |
| JP | 5-43749 U | 6/1993 |
| JP | H0670526 A | 3/1994 |
| JP | H08308190 A | 11/1996 |
| JP | 9327139 | 12/1997 |
| JP | H201149 A | 7/1998 |
| JP | 11-098787 A | 4/1999 |
| JP | H11-150902 A | 6/1999 |
| JP | H11206052 A | 7/1999 |
| JP | 2000-209825 A | 7/2000 |
| JP | 2000224830 A | 8/2000 |
| JP | 2002101625 A | 4/2002 |
| JP | 2005-102366 A | 4/2005 |
| JP | 2005110403 A | 4/2005 |
| JP | 2006003251 A | 1/2006 |
| JP | 2006230125 A | 8/2006 |
| JP | 2007-228677 A | 9/2007 |
| JP | 2007-282420 A | 10/2007 |
| JP | 2007288864 A | 11/2007 |
| JP | 2007330025 A | 12/2007 |
| JP | 2007330095 A | 12/2007 |
| JP | 2008535453 A | 8/2008 |
| JP | 2010-213455 A | 9/2010 |
| JP | 2010226922 A | 10/2010 |
| JP | 2010239818 A | 10/2010 |
| JP | 2011-015555 A | 1/2011 |
| JP | 2011-019994 A | 3/2011 |
| JP | 2011097756 A | 5/2011 |
| JP | 2011-120419 A | 6/2011 |
| JP | 2012-115085 A | 6/2012 |
| WO | WO02/27897 A1 | 4/2002 |
| WO | WO2007043161 A1 | 4/2007 |
| WO | 2012/067223 | 5/2012 |

OTHER PUBLICATIONS

Notice of Allowance and Fee Due related to corresponding U.S. Appl. No. 13/662,762.

Office Action dated Apr. 21, 2015 corresponding to the Japanese Patent Application No. 2011-239512.

Office Action dated Apr. 21, 2015 corresponding to the Japanese Patent Application No. 2011-239513.

Office Action of Mar. 17, 2015 corresponding to the Japanese Patent Application No. 2011-239514.

Office Action of Feb. 10, 2015 corresponding to Japanese Patent Application No. 2011-239508.

Office Action corresponding to the Japanese Patent Application No. 2011-239523.

Office Action corresponding to U.S. Appl. No. 13/662,834, received on Jun. 2, 2015.

Office Action corresponding to Japanese Patent Application No. 2011-247668, received on Jun. 2, 2015.

Office Action dated Apr. 14, 2015 corresponding to Japanese Patent Application No. 2011-241284.

Office Action dated Apr. 14, 2015 corresponding to Japanese Patent Application No. 2011-239518.

Office Action dated Apr. 14, 2015 corresponding to Japanese Patent Application No. 2011-239517.

Office Action dated Apr. 14, 2015 corresponding to Japanese Patent Application No. 2011-239511.

* cited by examiner

ROTOR AND MOTOR

BACKGROUND OF THE INVENTION

The present invention relates to a rotor and a motor.

Conventionally, a rotor of a Lundell type structure has been known, which is of a permanent magnetic field system. See Japanese Laid-Open Utility Model Publication No. 5-43749, for example. The rotor includes a plurality of pairs of (e.g., two pairs of) magnetic pole plates and permanent magnets, each sandwiched between a pair of the magnetic pole plates. Each pair of magnetic pole plates includes a disk portion and a plurality of flange portions arranged in the circumferential direction of the rotor, and each pair of magnetic pole plates are combined with each other. Adjacent flange portions of the permanent magnet have different magnetic poles. The magnetic pole plates of each pair are arranged such that the disk portions of the same polarities are in contact with each other. In the case of two pairs of magnetic pole plates for example, two disk portions corresponding to north poles are located on both ends of the rotor in its axial direction, and two disk portions corresponding to south poles are located adjacent to each other in the axial direction.

A motor including the above described rotor is desired for improved performance (e.g., increased power). However, the magnetic flux density of the flange portion is affected by the position of the magnetic pole plate. Hence, the rotor is required to reduce variation in magnetic flux density.

SUMMARY OF THE INVENTION

It is an objective of the present invention to provide a rotor and a motor capable of reducing variation in magnetic flux density.

To achieve the foregoing objective and in accordance with one aspect of the present invention, a rotor having an axial direction is provided. The rotor includes at least a pair of rotor cores arranged in the axial direction and a field magnet arranged between the rotor cores and magnetized in the axial direction. Each of the rotor cores includes a plurality of claw poles extending in the axial direction. Each of the rotor cores includes a magnetic flux controlling section, which appropriately causes magnetic flux to flow to the claw poles.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DESCRIPTION OF THE PREFERRED EMBODIMENTS (First Embodiment)

A first embodiment of the present invention will be described below with reference to the drawings.

Figure 1:
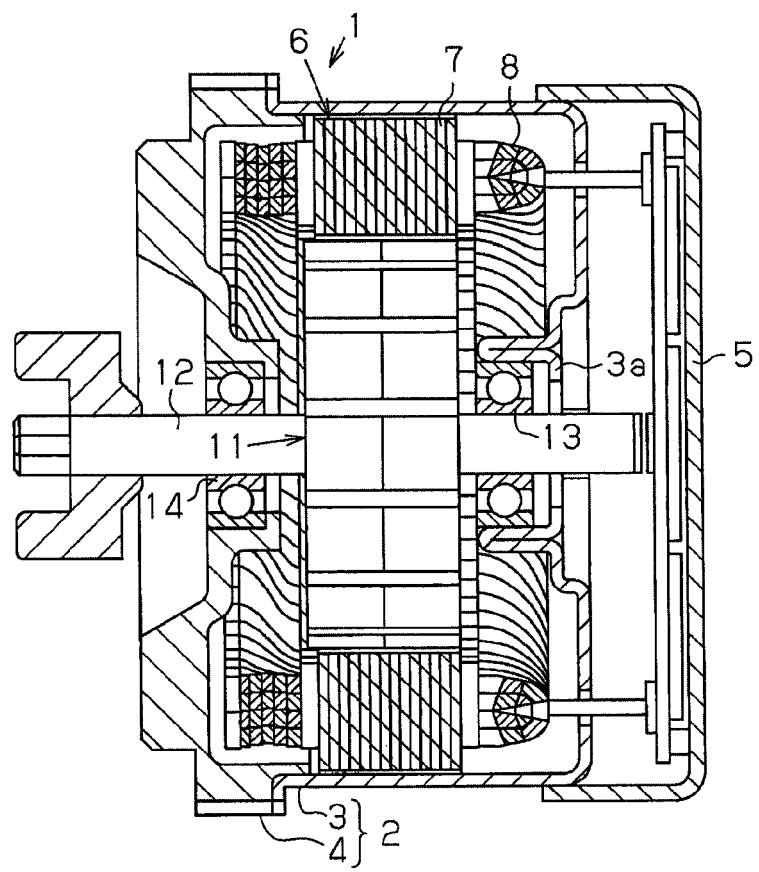
FIG. 1 is a schematic cross-sectional view of a motor according to a first embodiment of the present invention.

As shown in FIG. 1, a motor case 2 of a motor 1 includes a cylindrical housing 3 having a closed end on the rear side (right side in FIG. 1), an opening on the front side (left side in FIG. 1), and an end plate 4, which closes the opening of the housing 3. A box 5, in which a power supply circuit such as a circuit substrate is accommodated, is mounted on the rear end of the housing 3. A stator 6 is fixed to an inner peripheral surface of the housing 3. The stator 6 includes an armature core 7 including a plurality of teeth extending radially inward, and a segment conductor (SC) coil 8, which is wound around each of the teeth of the armature core 7. A rotor 11 includes a rotary shaft 12, and is located radially inside of the stator 6. The rotary shaft 12 is made of non-magnetic metal and is rotationally supported by bearings 13 and 14, which are respectively located on the bottom 3a of the housing 3 and the end plate 4.

Figure 2:
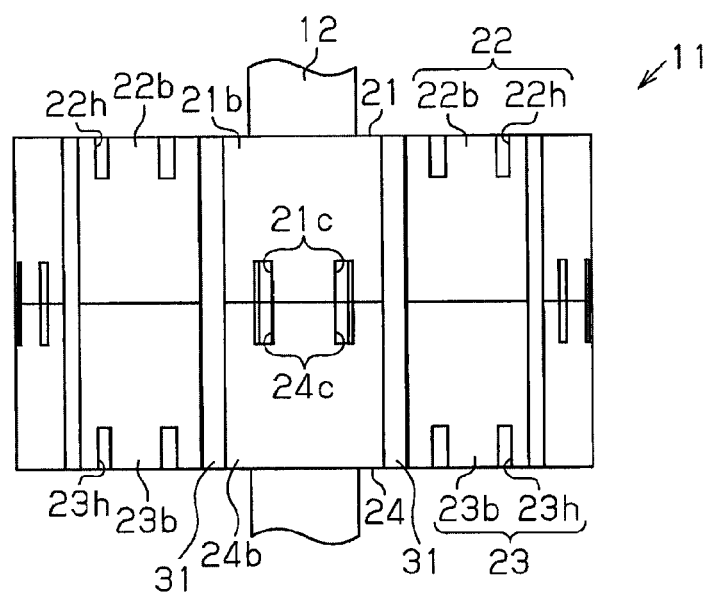
FIG. 2 is a schematic side view of a rotor shown in FIG. 1.

As shown in FIG. 2, the rotor 11 includes first to fourth rotor cores 21 to 24 arranged along the rotary shaft 12.

Figure 3A:
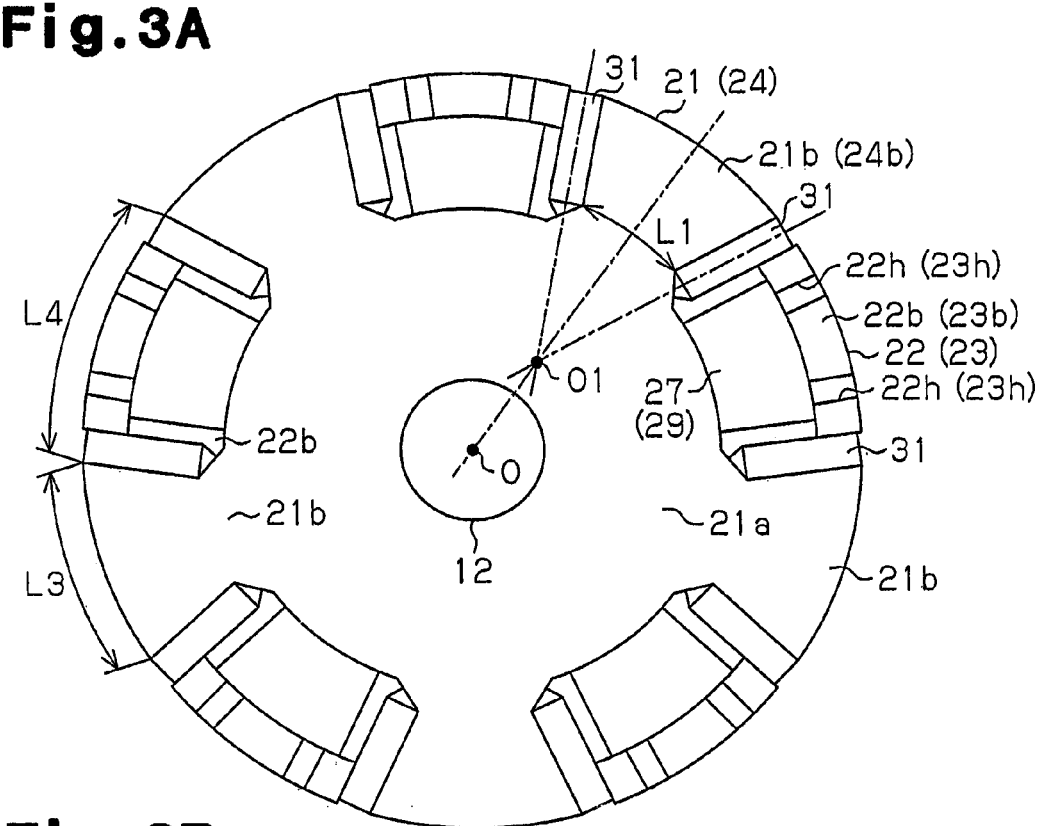
FIGS. 3A and 3B show rotor cores, auxiliary magnets and interpole magnets of the rotor shown in FIG. 2.

As shown in FIG. 3A, the first rotor core 21 includes a disk-shaped core base 21a. The core base 21a is fixed to the rotary shaft 12. A plurality of (five in this embodiment) claw poles 21b extending radially outward are formed on an outer periphery of the core base 21a. Distances between the claw poles 21b that are adjacent to each other in a circumferential direction of the rotor 11, i.e., in a circumferential direction of the core base 21a are equal to each other.

As shown in FIG. 2, each of the claw poles 21b is formed into a rectangular shape as viewed in a radial direction of the rotor 11. As shown in FIG. 3A, the claw pole 21b is formed into substantially an arcuate shape as viewed in the axial direction of the rotor 11. The width (the arc length of the outer periphery) L3 of the claw pole 21b in the circumferential direction is smaller than the distance L4 between a circumferentially adjacent pair of the claw poles 21b.

Figure 3B:
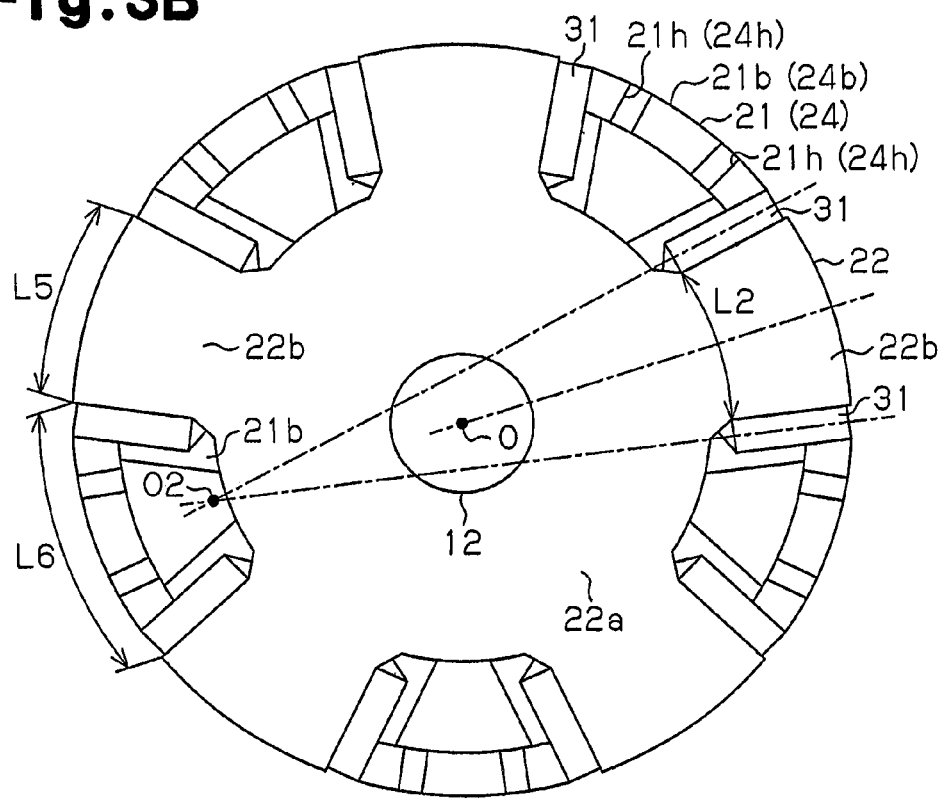

As shown in FIG. 3B, like the first rotor core 21, a second rotor core 22 is formed into a disk shape and includes a core base 22a fixed to the rotary shaft 12. A plurality of (five in this embodiment) claw poles 22b extending radially outward are formed on an outer periphery of the core base 22a. Distances between a circumferentially adjacent pair of the claw poles 22b of the rotor 11, i.e., in the circumferential direction of the core base 22a are equal to each other.

As shown in FIG. 2, like the claw poles 21b of the first rotor core 21, each of the claw poles 22b is formed into a rectangular shape as viewed in the radial direction of the rotor 11. As shown in FIG. 3B, the claw pole 22b is formed into substantially an arcuate shape as viewed in an axial direction of the rotor 11. The width (the arc length of the outer periphery) L5 of the claw pole 22b in the circumferential direction is smaller than the distance L6 between a circumferentially adjacent pair of the claw poles 22b.

Figure 4:
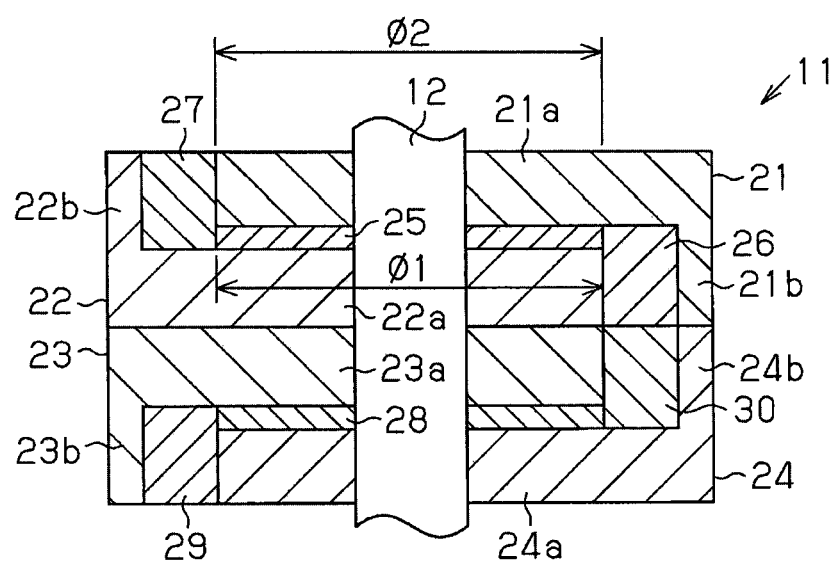
FIG. 4 is a schematic cross-sectional view of the rotor shown in FIG. 2.

As shown in FIG. 4, an annular magnet 25 is located between the first rotor core 21 and the second rotor core 22 in the axial direction. The annular magnet 25 of the present embodiment is formed into an annular shape. The outer diameter φ1 of the annular magnet 25 is equal to the outer diameters φ2 of the core bases 21a and 22a of the first and second rotor cores 21 and 22. The first and second rotor cores 21 and 22 are fixed to the rotary shaft 12 such that the respective claw poles 21b and 22b are alternately arranged in the circumferential direction of the rotor 11. The annular magnet 25 is sandwiched between the core bases 21a and 22a of the first and second rotor cores 21 and 22 in the axial direction of the rotary shaft 12.

The annular magnet 25 is a flat-plate shaped permanent magnet having first and second main surfaces, and the annular magnet 25 is magnetized in a front and back direction, i.e., in the axial direction of the rotary shaft 12. A first main surface, e.g., a north pole surface is in intimate contact with the core base 21a of the first rotor core 21, and a second main surface, e.g., a south pole surface, is in intimate contact with the core base 22a of the second rotor core 22. Therefore, according to the annular magnet 25, each of the claw poles 21b of the first rotor core 21 functions as a first magnetic pole, e.g., a north pole, and each of the claw poles 22b of the second rotor core 22 functions as a second magnetic pole, e.g., a south pole.

The core base 21a of the first rotor core 21 includes an inner end surface, which is in contact with the first main surface of the annular magnet 25, and an outer end surface (axial outer end surface), which faces the inner end surface in the axial direction. The core base 22a of the second rotor core 22 includes an inner end surface, which is in contact with the second main surface of the annular magnet 25, and an outer end surface (axial outer end surface), which faces the inner end surface in the axial direction. Each of the claw poles 21b extends from the axial outer end surface of the first rotor core 21 to the axial outer end surface of the second rotor core 22. Each of the claw poles 22b extends from the axial outer end surface of the second rotor core 22 to the axial outer end surface of the first rotor core 21.

As shown in FIG. 3B, first back surface auxiliary magnets 26 are located between back surfaces (radially inner surfaces) of the claw poles 21b and the outer peripheral surface of the core base 22a. The first back surface auxiliary magnet 26 is formed into an arcuate shape as viewed in the axial direction of the rotary shaft 12. An outer peripheral surface of each of the first back surface auxiliary magnets 26 abuts against the back surface (radially inner surface) of the claw pole 21b, and an inner peripheral surface of the first back surface auxiliary magnet 26 abuts against the outer peripheral surface of the core base 22a. The circumferential width of the first back surface auxiliary magnet 26 is narrower than the circumferential width of the claw pole 21b. A center line of the first back surface auxiliary magnet 26, i.e., a straight line of the first back surface auxiliary magnet 26 that is parallel to an axial center of the rotary shaft 12 and which passes through a circumferential center of the back surface auxiliary magnet 26, and a center line of the claw pole 21b, i.e., a straight line of the claw pole 21b that is parallel to an axial center of the rotary shaft 12 and passes through the circumferential center of the claw pole 21b match with each other. The first back surface auxiliary magnet 26 is magnetized in the radial direction such that a portion of the first back surface auxiliary magnet 26 close to the back surface of the claw pole 21b functions as a first magnetic pole, e.g., a north pole, which is the same as that of the claw pole 21b, and a portion of the first back surface auxiliary magnet 26 close to the core base 22a functions as a second magnetic pole, e.g., a south pole, which is the same as that of the core base 22a.

As shown in FIG. 3A, second back surface auxiliary magnets 27 are located between the back surfaces (radially inner surfaces) of the claw poles 22b and the outer peripheral surface of the core base 21a. Each of the second back surface auxiliary magnets 27 is formed into an arcuate shape as viewed in the axial direction of the rotary shaft 12. An outer peripheral surface of each of the second back surface auxiliary magnets 27 abuts against the back surface (radially inner surface) of the claw pole 22b, and an inner peripheral surface of the second back surface auxiliary magnet 27 abuts against the outer peripheral surface of the core base 21a. The circumferential width of the second back surface auxiliary magnet 27 is narrower than the circumferential width of the claw pole 22b. A center line of the second back surface auxiliary magnet 27, i.e., a straight line of the second back surface auxiliary magnet 27 that is parallel to the axial center of the rotary shaft 12 and passes through a circumferential center of the back surface auxiliary magnet 27, and a center line of the claw pole 22b, i.e., a straight line of the claw pole 22b that is parallel to an axial center of the rotary shaft 12 and passes through a circumferential center of the claw pole 22b match with each other. The second back surface auxiliary magnet 27 is magnetized in the radial direction such that a portion of the second back surface auxiliary magnet 27 close to the back surface of the claw pole 22b functions as a second magnetic pole, e.g., a south pole, which is the same as that of the claw pole 22b, and a portion of the second back surface auxiliary magnet 27 close to the core base 21a functions as a first magnetic pole, e.g., a north pole, which is the same as that of the core base 21a.

As shown in FIG. 4, the first back surface auxiliary magnet 26 extends from an inner end surface (axially inner end surface) of the first rotor core 21 (core base 21a) to an outer end surface of the second rotor core 22 (core base 22a) in the axial direction. The second back surface auxiliary magnet 27 extends from an inner end surface of the second rotor core 22 (core base 22a) to an outer end surface of the first rotor core 21 (core base 21a) in the axial direction.

As shown in FIG. 4, the first rotor core 21 and the fourth rotor core 24 located on both axial ends of the rotary shaft 12 are formed into the same shapes. The second rotor core 22 and the third rotor core 23 located between the first rotor core 21 and the fourth rotor core 24 are formed into the same shapes.

An annular magnet 28 is located between the third rotor core 23 and the fourth rotor core 24. The annular magnet 28 is a flat-plate shaped permanent magnet formed into the same shape as that of the annular magnet 25. The annular magnet 28 has third and fourth main surfaces and is magnetized like the annular magnet 25.

A fourth main surface, e.g., a north pole surface is in intimate contact with a core base 24a of the fourth rotor core 24, and a third main surface (e.g., south pole surface) is in intimate contact with a core base 23a of the third rotor core 23. Therefore, according to the annular magnet 28, a claw pole 24b of the fourth rotor core 24 functions as a fourth magnetic pole, e.g., a north pole, and a claw pole 23b of the third rotor core 23 functions as a third magnetic pole, e.g., a south pole.

A third back surface auxiliary magnet 29 is located between back surfaces (radially inner surfaces) of the claw poles 23b of the third rotor core 23 and the outer peripheral surface of the core base 24a. The third back surface auxiliary magnet 29 is formed into an arcuate shape as viewed in the axial direction of the rotary shaft 12. A pair of circumferential side surfaces of the third back surface auxiliary magnet 29, i.e., an inner peripheral surface and an outer peripheral surface of the third back surface auxiliary magnet 29, is located on the same planes as an inner peripheral surface and an outer peripheral surface of the corresponding claw pole 23b. The third back surface auxiliary magnet 29 is magnetized in the radial direction such that a portion of the third back surface auxiliary magnet 29 close to the back surface of the claw pole 23b functions as a third magnetic pole, e.g., a south pole, which is the same as that of the claw pole 23b, and a portion of the third back surface auxiliary magnet 29 close to the core base 24a functions as a fourth magnetic pole, e.g., a north pole, which is the same as that of the core base 24a.

A fourth back surface auxiliary magnet 30 is located between back surfaces (radially inner surfaces) of the claw poles 24b and the outer peripheral surface of the core base 23a. The fourth back surface auxiliary magnet 30 is formed into an arcuate shape as viewed in the axial direction of the rotary shaft 12. An inner peripheral surface and an outer peripheral surface of the fourth back surface auxiliary magnet 30 are located on the same planes as an inner peripheral surface and an outer peripheral surface of the corresponding claw pole 24b. The fourth back surface auxiliary magnet 30 is magnetized in the radial direction such that a portion of the fourth back surface auxiliary magnet 30 close to the back surface of the claw pole 24b functions as a fourth magnetic pole, e.g., a north pole, which is the same as that of the claw pole 24b, and a portion of the fourth back surface auxiliary magnet 30 close to the core base 23a functions as a third magnetic pole, e.g., a south pole, which is the same as that of the core base 23a.

As shown in FIG. 2, the first and fourth rotor cores 21 and 24 are mounted on the rotary shaft 12 such that the claw poles 21b and 24b are arranged in the axial direction of the rotary shaft 12. The first and fourth rotor cores 21 and 24 are arranged such that the claw poles 21b and 24b extend in directions opposite from each other. Therefore, a distal end of the claw pole 21b of the first rotor core 21 and a distal end of the claw pole 24b of the fourth rotor core 24 abut against each other.

Similarly, the second rotor core 22 and the third rotor core 23 are mounted on the rotary shaft 12 such that the claw poles 22b and 23b are arranged in the axial direction of the rotary shaft 12. The second rotor core 22 and the third rotor core 23 are arranged such that the claw poles 22b and 23b extend in direction opposite from each other. Therefore, a proximal end of the claw pole 22b of the second rotor core 22 and a proximal end of the claw pole 23b of the third rotor core 23 abut against each other.

As shown in FIG. 3A, interpole magnets 31 are arranged between a circumferentially adjacent pair of the claw poles 21b and 22b. Each of the interpole magnets 31 is formed into a rectangular shape as viewed in the axial direction of the rotary shaft 12. As shown in FIG. 2, the interpole magnet 31 is formed into a rectangular shape as viewed in the radial direction of the rotary shaft 12. As shown in FIG. 2, the interpole magnet 31 extends in the axial direction of the rotary shaft 12. The axial length of each of the interpole magnets 31 is equal to the distance from two end surfaces of the rotary shaft 12 that are exposed in the axial direction of the rotary shaft 12, i.e., from an axial outer end surface of the first rotor core 21 to an axial outer end surface of the fourth rotor core 24.

As shown in FIG. 3A, each of the interpole magnets 31 is arranged such that a plane of the interpole magnet 31 passing through its circumferential center has an angle with respect to a radial direction of the rotor 11 as viewed in the axial direction. That is, circumferential end surfaces of the claw poles 21b to 24b of the rotor cores 21 to 24 are formed such that the interpole magnets 31 located between the adjacent claw poles have angles with respect to the radial directions of the rotor cores 21 to 24. For example, as shown in FIG. 3A, each of the claw poles 21b is formed such that an intersection point O1 between line segments (shown by lines formed by a long dash alternating with a short dash) passing through the circumferential centers of the two circumferentially adjacent interpole magnets 31 is located radially outside of a rotation center O of the rotor 11, i.e., an axial center of the rotary shaft 12 and is located at a position closer to the claw pole 21b. The intersection point O1 is located on a line connecting a circumferential center of the claw pole 21b and the axial center of the rotary shaft 12. That is, the angle of both circumferential side surfaces of the claw pole 21b is set such that two interpole magnets 31 that are adjacent to the claw pole 21b in the circumferential direction are symmetric with respect to a circumferential center line of the claw pole 21b.

As shown in FIG. 3B, each of the claw poles 22b is formed such that an intersection point O2 of line segments (shown by lines formed by a long dash alternating with a short dash)

passing through circumferential centers of the two circumferentially adjacent interpole magnets 31 is located radially outside of the rotation center O of the rotor 11, i.e., the axial center of the rotary shaft 12 and is located at position separating away from the claw pole 22b. The intersection point O2 is located on a line connecting a circumferential center of the claw pole 22b and an axial center of the rotary shaft 12. That is, the angle of the circumferential side surfaces of the claw pole 22b is set such that two interpole magnets 31 that are adjacent to the claw pole 22b in the circumferential direction are symmetric with respect to the circumferential center line of the claw pole 22b.

Therefore, the circumferential width of a proximal end of the claw pole 21b (see FIG. 3A) is narrower than the circumferential width of a proximal end of the claw pole 22b (see FIG. 3B). More specifically, widths of the proximal ends when the claw poles have the same shapes are defined as a reference width L0. The width L1 of the proximal end of the claw pole 21b is less than the reference width L0 by ΔL, and the width L2 of the proximal end of the claw pole 22b is greater than the reference width L0 by ΔL.

Each of the interpole magnets 31 is magnetized such that surfaces thereof that are adjacent to the claw pole in the circumferential direction have the same polarities as those of the adjacent claw poles. For example, each of the interpole magnets 31 is magnetized in a direction that passes through a plane intersecting the axial center of the rotary shaft 12 at right angles and intersects circumferential centers of the interpole magnets on the plane at right angles. That is, the interpole magnet 31 is magnetized such that a surface thereof that is in contact with the claw pole 21b functions as a north pole, and a surface of the interpole magnet 31 that is in contact with the claw pole 22b functions as a south pole.

As shown in FIG. 2, a plurality of (two, in the present embodiment) auxiliary grooves 21h to 24h are formed in a distal end of each of the claw poles 21b and 24b. As shown in FIGS. 3A and 3B, each of the auxiliary grooves 21h to 24h opens radially outward and inward in the claw poles 21b to 24b. That is, the auxiliary grooves 21h to 24h extend between the outer peripheral surface and the inner peripheral surface of the rotor core 21 in the radial direction of the rotor 11. The third rotor core 23 has the same shape as that of the second rotor core 22, and the fourth rotor core 24 has the same shape as that of the first rotor core 21. Therefore, in FIGS. 3A and 3B, symbols of members of the third rotor core 23 and the fourth rotor core 24 are shown using parentheses. In the first embodiment, the auxiliary grooves 21h to 24h are magnetic flux restricting portions as magnetic flux controlling sections.

As shown in FIG. 3B, the two auxiliary grooves 21h formed in the distal ends of the claw pole 21b are formed at positions that are symmetric with respect to a circumferential center line of the claw pole 21b as viewed in the axial direction of the rotor 11. Similarly, the two auxiliary grooves 22h to 24h formed in distal ends of each of the claw poles 22b to 24b are formed at positions that are symmetric with respect to circumferential center lines of the claw poles 22b to 24b.

Next, operation of the motor 1 will be described.

In the motor 1, when drive current is supplied to the segment conductor (SC) coil 8 through the power supply circuit in the box 5, a magnetic field for rotating the rotor 11 is generated in the stator 6, and the rotor 11 is rotated.

In the rotor 11, the annular magnet 25 makes the claw pole 21b function as a first magnetic pole and makes the claw pole 22b function as a second magnetic pole. Circumferential surfaces of the interpole magnets 31 arranged between a circumferentially adjacent pair of the claw poles 21b and the claw poles 22b are magnetized such that the circumferential surfaces have the same polarities as those of the adjacent claw poles. Therefore, each of the interpole magnets 31 prevents a direct magnetic flux travelling from the claw pole 21b to the claw pole 22b from being formed. As a result, a direct leakage magnetic flux between the claw pole 21b and the claw pole 22b is reduced.

Radial surfaces of the first back surface auxiliary magnet 26 located between the inner end surface of the claw pole 21b and the core base 22a are magnetized such that the radial surfaces have the same polarities as that of the claw pole. Therefore, the first back surface auxiliary magnet 26 prevents a direct magnetic flux travelling from the claw pole 21b to the core base 22a from being formed. As a result, a direct leakage magnetic flux between the claw pole 21b and the core base 22a is reduced.

Similarly, radial surfaces of the second back surface auxiliary magnet 27 located between the inner end surface of the claw pole 22b and the core base 21a are magnetized such that the radial surfaces have the same polarities as that of the claw pole. Therefore, the second back surface auxiliary magnet 27 prevents a direct magnetic flux travelling from the claw pole 22b to the core base 21a from being formed. As a result, a direct leakage magnetic flux between the claw pole 22b and the core base 21a is reduced.

A north pole of the magnetized interpole magnet 31 comes into contact with the claw pole 21b having the same polarity, and a south pole of the interpole magnet 31 comes into contact with the claw pole 22b. Similarly, a north pole of the magnetized first back surface auxiliary magnet 26 comes into contact with the claw pole 21b having the same polarity, and a south pole of the first back surface auxiliary magnet 26 comes into contact with the core base 22a having the same polarity. Therefore, magnetic flux generated between the claw pole 21b and the stator 6 includes magnetic flux caused by the annular magnet 25, magnetic flux caused by the first back surface auxiliary magnet 26 and magnetic flux caused by the interpole magnet 31. In this manner, the amount of magnetic flux travelling from the rotor 11 to the stator 6 is increased more than the amount of magnetic flux caused by the annular magnet 25 only.

As shown in FIG. 4, the first to fourth rotor cores 21 to 24 are arranged in the axial direction (vertical direction in FIG. 4) of the rotary shaft 12. The annular magnet 25 is located between the first rotor core 21 and the second rotor core 22, and the annular magnet 28 is located between the third rotor core 23 and the fourth rotor core 24.

A main magnetic flux of the rotor 11 travels from the annular magnet 25 to the stator 6 shown in FIG. 1 through the core base 21a and the claw pole 21b of the first rotor core 21. Most of the main magnetic flux travels from an axial proximal end portion of the claw pole 21b (upper side in FIG. 4) to the stator 6. Therefore, a difference is generated between the magnetic flux density of the axial proximal end portion and the magnetic flux density of the axial distal end portion of each of the claw poles 21b. As shown in FIG. 2, each of the claw poles 21b is formed into a rectangular shape as viewed in the radial direction. Therefore, a variation is generated in a distribution of the magnetic flux density in the claw pole 21b where the auxiliary groove 21h is not formed. For example, in one claw pole, the magnetic flux density is substantially uniform in the circumferential direction, but in other claw pole, the magnetic flux density in a circumferential central portion thereof becomes higher than magnetic flux densities on circumferential both ends thereof.

The two auxiliary grooves 21h are formed in the distal end of the claw pole 21b of the present embodiment. Therefore, main magnetic fluxes travelling toward the stator 6 concentrate on a portion of the claw pole 21b where the auxiliary groove 21h is not formed. That is, the auxiliary groove 21h restricts places of magnetic fluxes travelling from the outer peripheral surface of the claw pole 21b toward the stator 6. The auxiliary grooves 21h are formed at the same positions of the claw poles 21b. Therefore, magnetic fluxes travelling from the relatively same positions of the claw poles 21b toward the stator 6 are formed. By restricting the places of the magnetic fluxes in this manner, portions of the claw poles 21b where the magnetic fluxes are dense become the same, i.e., the magnetic flux density distribution in the claw poles 21b becomes uniform.

Although the claw pole 21b of the first rotor core 21 has been described above, the claw poles 22b to 24b of the second to fourth rotor cores 22 to 24 also have the same configurations. That is, the auxiliary grooves 22h to 24h formed in distal ends of the claw poles 22b to 24b restrict places of the outer peripheral surfaces of the claw poles 22b to 24b where magnetic fluxes are generated. According to this configuration, a variation in magnetic flux density distributions in the claw poles 22b to 24b formed in the rotor cores 22 to 24 is reduced. Further, the auxiliary groove 21h of the claw pole 21b and the auxiliary groove 24h of the claw pole 24b are formed in the axial direction. Therefore, a variation in the magnetic flux density distribution in the claw pole 21b and the claw pole 24b is reduced. Similarly, the auxiliary groove 22h of the claw pole 22b and the auxiliary groove 23h of the claw pole 23b reduce variations in the magnetic flux density distributions in the claw pole 22b and the claw pole 23b, respectively.

As shown in FIGS. 3A and 3B, the circumferential width L1 of the proximal end of the claw pole 21b is narrower, by ΔL, than the reference width L0 when the shapes of the claw poles 21b to 24b of the rotor cores 21 to 24 are the same, and the circumferential width L2 of the proximal end of the claw pole 22b is greater than the reference width L0 by ΔL. Therefore, the intersection points O1 and O2 of the line segments passing through the circumferential center of each of the interpole magnets 31 arranged between a circumferentially adjacent pair of the claw pole 21b and the claw pole 22b are deviated from an intersection point of the circumferential center lines of the claw poles 21b and 22b, i.e., from the rotation center O of the rotor 11. Therefore, when the rotor 11 rotates, each of the interpole magnets 31 is pressed against a circumferential side surface of the claw pole 21b by a centrifugal force. Hence, the interpole magnet 31 is prevented from being pulled out from the rotor 11.

The circumferential width L1 of the proximal end of the claw pole 21b is narrower than the reference width L0 when the shapes of the claw poles 21b to 24b of the rotor cores 21 to 24 are the same. Therefore, as compared with a rotor core in which the circumferential width of a proximal end is formed in accordance with the same reference width, since volumes of the first and fourth rotor cores 21 and 24 become small, the amount of material used (e.g., iron) becomes small. Since the volume is small, the rotor 11 becomes lighter.

As shown in FIG. 4, the core bases 21a and 24a of the rotor cores 21 and 24 respectively including the claw poles 21b and 24b, which function as the same polarities (north poles in this embodiment) are exposed from axial sides. Therefore, magnetic fluxes (leakage magnetic fluxes), which do not travel from the core bases 21a and 24a to the claw poles 21b and 24b are generated. On the other hand, since the core bases 22a and 23a of the rotor cores 22 and 23 respectively including the claw poles 22b and 23b, which function as the south poles, are adjacent to each other, and the annular magnets 25 and 28 are adjacent to axial outsides of the core bases 22a and 23a, the core bases 22a and 23a are not exposed in the axial direction. Therefore, leakage magnetic fluxes are not generated in the core bases 22a and 23a. According to this configuration, a difference is generated between the amount of magnetic fluxes travelling from the core bases 21a and 24a toward the claw poles 21b and 24b and the amount of magnetic fluxes travelling from the claw poles 22b and 23b toward the core bases 22a and 23a.

When the shapes of the claw poles 21b to 24b of the rotor cores 21 to 24 are the same, the amount of magnetic fluxes that can pass through the proximal ends of the claw poles 22b and 23b of the rotor cores 22 and 23, which are located inside, determines magnetic forces of the annular magnets 25 and 28. This is because that even if the amount of magnetic fluxes emitted from the annular magnets 25 and 28 is large, magnetic saturation is generated in each of the proximal ends of the claw poles 22b and 23b, and the magnetic flux does not become effective for rotation. At this time, since leakage magnetic fluxes are generated in the rotor cores 21 and 24 located on axial ends, magnetic saturation is not generated at the proximal ends of the claw poles 21b and 24b of the rotor cores 21 and 24.

In the case of the claw poles 21b to 24b of the present embodiment, as shown in FIGS. 3A and 3B, the widths L1 of the proximal ends of the claw poles 21b and 24b are narrower than the widths of the proximal ends, i.e., than the reference width L0 when the shapes of the claw poles 21b to 24b of the rotor cores 21 to 24 are the same, and the widths L2 of the proximal ends of the claw poles 22b and 23b are greater than the reference width L0. Therefore, when an annular magnet used for a rotor core having a claw pole of the reference width L0 is used, magnetic saturation is not generated in the claw poles 22b and 23b. That is, a magnetic force of the annular magnet can be made stronger. When this annular magnet is used, the widths of the proximal ends of the claw poles 21b and 24b of the present embodiment are also set such that magnetic saturation is not generated. For example, the widths of the proximal ends of the claw poles 21b to 24b and magnetic forces of the annular magnets 25 and 28 are set such that magnetic saturation is generated in the claw poles 21b to 24b. According to the rotor 11 using the annular magnets 25 and 28 having the increased magnetic forces, the amount of magnetic fluxes in the claw poles 21b to 24b, i.e., the amount of magnetic flux that is effective for rotation of the rotor 11 is increased as compared with a rotor in which the claw poles have the same shapes.

The first embodiment has the following advantages.

(1) The first to fourth rotor cores 21 to 24 of the rotor 11 are arranged in the axial direction of the rotary shaft 12. The claw poles 21b and 22b of the first and second rotor cores 21 and 22 respectively extend radially outward from the outer peripheries of the core bases 21a and 22a and are alternately arranged in the circumferential direction. The claw poles 21b and 22b extend in the axial direction in the directions opposite from each other. Similarly, the claw poles 23b and 24b of the third and fourth rotor cores 23 and 24 extend radially outward from the outer peripheries of the core bases 23a and 24a and are arranged alternately in the circumferential direction. The claw poles 23b and 24b extend in the axial direction in the directions opposite from each other.

The two auxiliary grooves 21h to 24h are formed in the distal ends of the claw poles 21b to 24b. Magnetic fluxes travelling from the annular magnets 25 and 28 toward the stator 6 concentrate on a portion of the claw pole 21b where the auxiliary groove 21h is not formed. That is, the auxiliary groove 21h restricts the places of magnetic fluxes travelling from the outer peripheral surface of the claw pole 21b toward the stator 6. The auxiliary grooves 21*h* are formed in the same positions of the claw poles 21*b*. Therefore, magnetic fluxes travelling from the relatively same positions of the claw poles 21*b* toward the stator 6 are formed. The auxiliary grooves 21*h* to 24*h* restrict the places of the magnetic fluxes in this manner. As a result, portions in the claw poles 21*b* where the magnetic fluxes are dense become the same, i.e., the magnetic flux density distributions in the claw pole 21*b* become equal to each other. Similarly, the magnetic flux density distributions in the claw poles 22*b* to 24*b* in the rotor cores 22 to 24 become equal to each other.

(2) The annular magnet 25 is located between the core bases 21*a* and 22*a* of the pair of first and second rotor cores 21 and 22, and the annular magnet 25 is sandwiched between the core bases 21*a* and 22*a*. Similarly, the annular magnet 28 is located between the core bases 23*a* and 24*a* of the pair of third and fourth rotor cores 23 and 24, and the annular magnet 28 is sandwiched between the core bases 23*a* and 24*a*.

The circumferential width L1 of proximal ends of the claw poles 21*b* and 24*b* of the rotor cores 21 and 24 located on axial ends is narrower than the width L2 of proximal ends of the claw poles 22*b* and 23*b* of the rotor cores 22 and 23. Therefore, the widths of the proximal ends of the claw poles 22*b* and 23*b* of the rotor cores 22 and 23 are greater as compared with a case where all of the claw poles of the rotor cores 21 to 24 have the same shapes.

Leakage magnetic fluxes are generated in the rotor cores 21 and 24, which are located on the axial ends. Therefore, when all of the claw poles 21*b* to 24*b* of the rotor cores have the same shapes, a portion of the magnetic fluxes of the annular magnets 25 and 28 becomes leakage magnetic flux. The widths of the proximal ends of the claw poles 22*b* and 23*b* of the rotor cores 22 and 23 can be made greater as compared with the case where all of the claw poles 21*b* to 24*b* of the rotor cores 21 to 24 have the same shapes. Therefore, as compared with the case where all of the claw poles 21*b* to 24*b* have the same shapes, a magnetic force of an annular magnet can be increased, i.e., it is possible to use a stronger permanent magnet. As a result, the amount of magnetic fluxes in the claw poles 21*b* to 24*b* is increased, i.e., it is possible to increase the amount of effective magnetic flux, and the power of the motor 1 can be increased.

(3) The back surface auxiliary magnet 26 is located between the claw pole 21*b* of the first rotor core 21 and the core base 22*a* of the second rotor core 22, and the back surface auxiliary magnet 26 is magnetized such that its magnetic poles having the same polarities as those of the claw pole 21*b* and the core base 22*a* face each other. The back surface auxiliary magnet 27 is located between the claw pole 22*b* of the second rotor core 22 and the core base 21*a* of the first rotor core 21, and the back surface auxiliary magnet 27 is magnetized such that its magnetic poles having the same polarities as those of the claw pole 22*b* and the core base 21*a* face each other. Therefore, the magnetic fluxes of the back surface auxiliary magnets 26 and 27 are included in the magnetic flux between the stator 6 and the claw poles 21*b* and 22*b*. According to this configuration, it is possible to increase the amount of effective magnetic flux. By the back surface auxiliary magnets 26 and 27, it is possible to suppress the generation of a direct magnetic flux between the core bases 21*a* and 22*a* and the claw poles 21*b* and 22*b*. According to this configuration, it is possible to increase the amount of the effective magnetic flux.

(4) Each of the interpole magnets 31 is arranged between a circumferentially adjacent pair of the claw poles 21*b* and 22*b*. The surface of each of the interpole magnets 31, which faces the claw poles 21*b* and 22*b* in the circumferential direction is magnetized such that the surface has the same polarity as those of the opposed claw poles. Therefore, the magnetic flux of the interpole magnet 31 is included in the magnetic flux between the stator 6 and the claw poles 21*b* and 22*b*. According to this configuration, it is possible to increase the amount of the effective magnetic flux. By the interpole magnet 31, it is possible to suppress the generation of a direct magnetic flux between the claw poles 21*b* and 22*b*. According to this configuration, it is possible to increase the amount of effective magnetic flux.

(5) The interpole magnet 31 is formed such that it extends from the axial outer end surface of the first rotor core 21 to the axial outer end surface of the fourth rotor core 24. Therefore, it is possible to reduce the number of parts that configure the rotor 11 as compared with a case where the interpole magnets corresponding to the rotor cores 21 to 24 are prepared.

(6) Each of the claw poles 21*b* to 24*b* is formed such that the line of the interpole magnets 31 located between the claw poles 21*b* and 22*b* or between the claw poles 23*b* and 24*b* that passes through the circumferential center of the interpole magnet 31 has an angle with respect to the straight line radially outwardly extending from the axial center of the rotary shaft 12. Therefore, when the rotor 11 rotates, the interpole magnet 31 is pressed against the circumferential side surface of the claw pole 21*b* by the centrifugal force. Hence, it is possible to prevent the interpole magnet 31 from being pulled out from the rotor 11.

(Second Embodiment)

A second embodiment according to the present invention will be described below with reference to the drawings.

Figure 6:
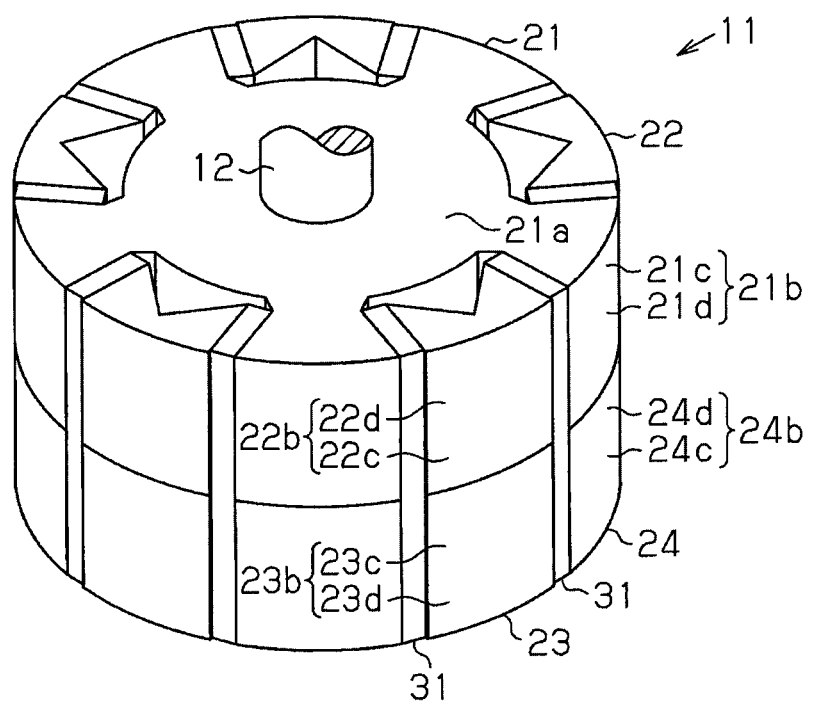
FIG. 6 is a schematic perspective view of a rotor according to a second embodiment of the present invention.

As shown in FIG. 6, a first rotor core 21 and a second rotor core 22 are combined with each other as a pair. Similarly, a third rotor core 23 and a fourth rotor core 24 are combined with each other as a pair.

Figure 8A:
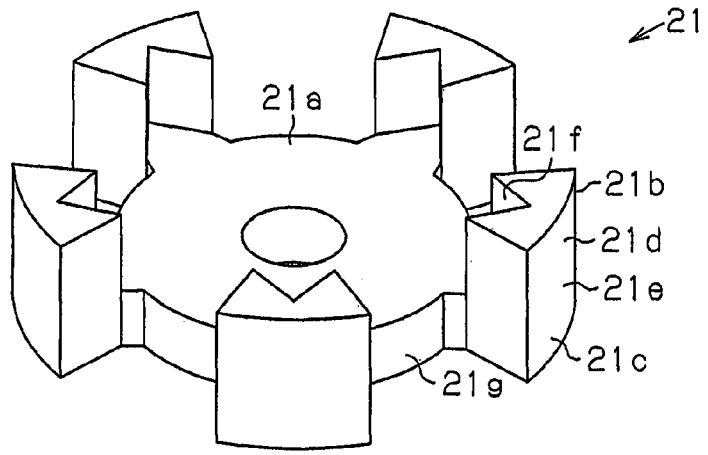
FIGS. 8A and 8B are schematic perspective views of the rotor cores shown in FIG. 6.
Figure 8B:
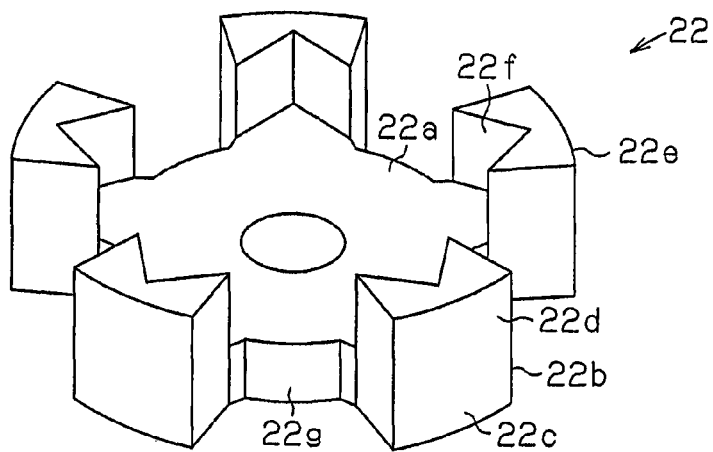

As shown in FIG. 8A, a claw pole 21*b* of the first rotor core 21 includes a projection 21*c* radially outwardly extending from a core base 21*a* and a claw portion 21*d* extending in the axial direction from a first axial end surface of the projection 21*c*. As shown in FIG. 8B, a claw pole 22*b* of the second rotor core 22 includes a projection 22*c* radially outwardly extending from the core base 22*a* and a claw portion 22*d* extending in the axial direction from a first axial end surface of the projection 22*c*.

Figure 9:
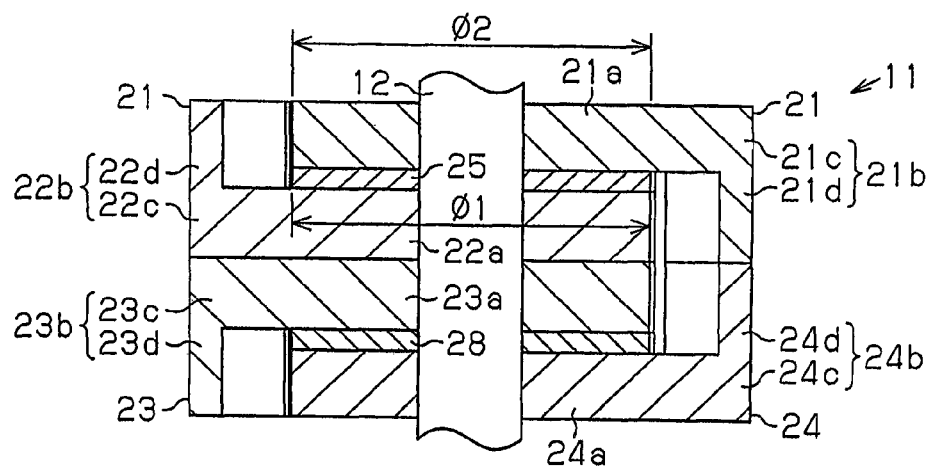
FIG. 9 is a schematic cross-sectional view of the rotor shown in FIG. 6.

As shown in FIG. 9, the first and second rotor cores 21 and 22 are combined with each other such that the claw poles 21*b* and 22*b* project in the axial direction in directions opposite from each other. As shown in FIG. 6, the claw poles 21*b* of the first rotor cores 21 and the claw poles 22*b* of the second rotor cores 22 are arranged alternately in the circumferential direction of the rotor 11.

Each of the core bases 21*a* and 22*a* includes an inner end surface, which is in contact with an annular magnet 25, and an outer end surface, which faces the inner end surface in the axial direction. The claw portion 22*d* of the claw pole 21*b* extends from the inner end surface of the core base 21*a* to the outer end surface of the core base 22*a* in the axial direction. Similarly, the claw portion 22*d* of the claw pole 22*b* extends from the inner end surface of the core base 22*a* to the outer end surface of the core base 21*a* in the axial direction.

The annular magnet 25 makes the claw pole 21*b* of the first rotor core 21 function as a first magnetic pole, i.e., a north pole, and makes the claw pole 22*b* of the second rotor core 22 function as a second magnetic pole, i.e., a south pole.

Figure 7A:
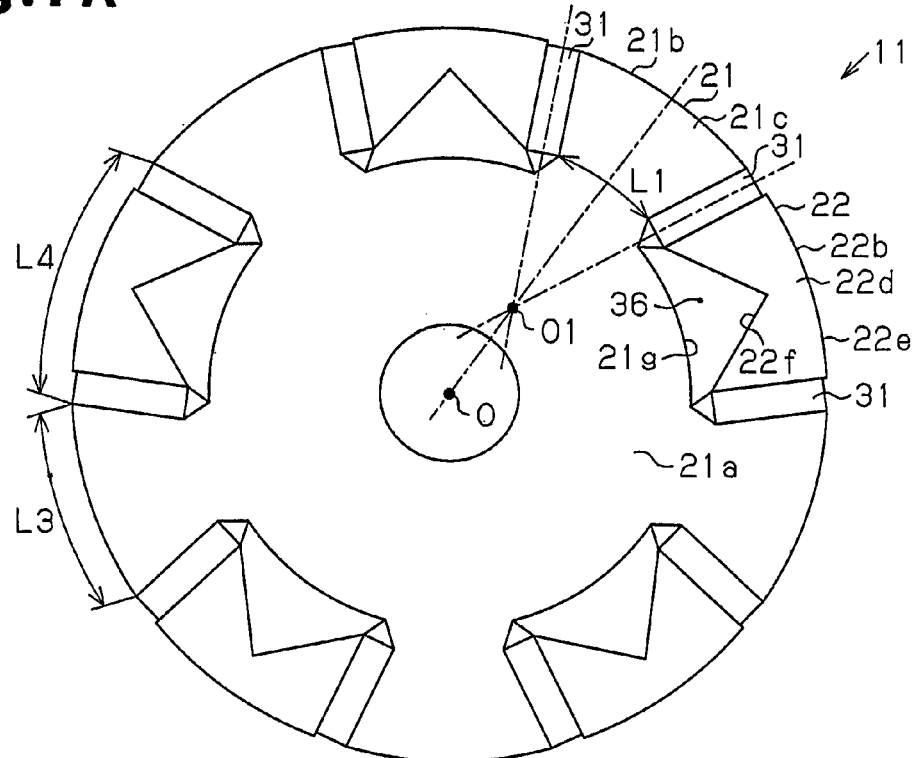
FIGS. 7A and 7B show rotor cores and interpole magnets shown in FIG. 6.

As shown in FIG. 7A, the projection 21*c* is formed into an arcuate shape as viewed in the axial direction. The width (the arc length of the outer periphery) L3 of each of the claw poles 21*b* in the circumferential direction is smaller than the distance L4 between a circumferentially adjacent pair of the claw poles 21b. As shown in FIG. 8A, the circumferential side surfaces of each of the claw portions 21d are respectively located on the same planes as the circumferential side surfaces of the corresponding projections 21c. A radially outer end surface 21e of the claw portion 21d is located on the same arcuate as a radially outer end surface of the projection 21c. A radially inner end surface 21f of the claw portion 21d is formed such that its circumferential central portion more closely approaches the radially outer end surface 21e of the claw portion 21d than its circumferential ends. That is, the radially inner end surface 21f of the claw portion 21d includes the circumferential ends and the circumferential central portion, and the distance between the circumferential central portion and the radially outer end surface 21e in the radial direction is smaller than the distance between the circumferential ends and the radially outer end surface 21e in the radial direction. In this embodiment, the radially inner end surface 21f is formed by two flat surfaces as shown in FIG. 7B.

The radially inner end surface 21f and an outer peripheral surface 22g of the core base 22a, which faces the radially inner end surface 21f in the radial direction, form substantially a triangular prism-shaped gap 35, which extends in the axial direction. A circumferential center of the radially inner end surface 21f is an intersection line of two flat surfaces of the radially inner end surface 21f, i.e., a radially outward apex of the gap 35. The radially outward apex of the gap 35 is located on a straight line that connects a center line of the claw pole 21b, i.e., a circumferential center of the claw pole 21b and an axial center of the rotary shaft 12.

Figure 7B:
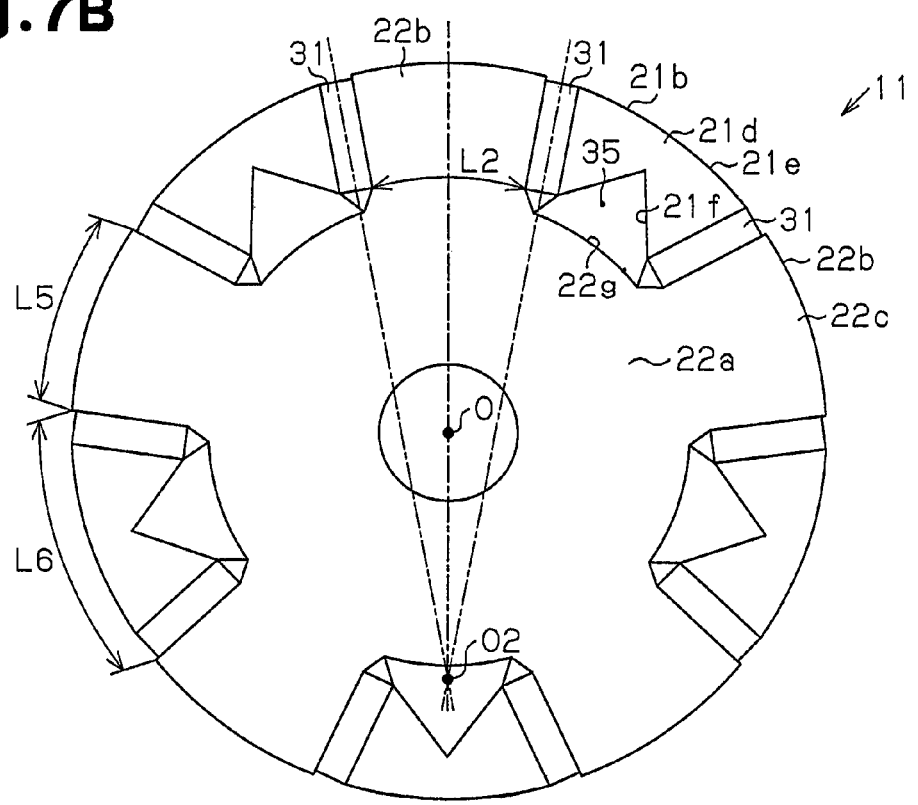

As shown in FIG. 7B, the projection 22c is formed into an arcuate shape as viewed in the axial direction. The width (the arc length of the outer periphery) L5 of the claw pole 22b in the circumferential direction is smaller than the distance L6 between a circumferentially adjacent pair of the claw poles 22b. As shown in FIG. 8B, the circumferential side surfaces of each of the claw portions 22d are located on the same planes as the circumferential side surfaces of the corresponding projection 22c. A radially outer end surface 22e of the claw portion 22d is located on the same arcuate as the radially outer end surface of the projection 22c. A radially inner end surface 22f of the claw portion 22d is formed such that a circumferential central portion of the radially inner end surface 22f more closely approaches the radially outer end surface 22e of the claw portion 22d than circumferential ends of the radially inner end surface 22f. In this embodiment, the radially inner end surface 22f is formed by two flat surfaces as shown in FIG. 7A. The radially inner end surface 22f and an outer peripheral surface 21g of the core base 21a, which faces the radially inner end surface 22f in the radial direction, form a triangular prism-shaped gap 36, which extends along the axial direction. A circumferential center of the radially inner end surface 22f is an intersection line of two flat surfaces of the radially inner end surface 22f, i.e., a radially outward apex of the gap 36. The radially outward apex of the gap 36 is located on a straight line that connects a center line of the claw pole 22b, i.e., a circumferential center of the claw pole 22b and an axial center of the rotary shaft 12.

As shown in FIG. 7A, interpole magnets 31 are arranged between each circumferentially adjacent pair of the claw pole 21b and the claw pole 22b. The interpole magnet 31 is formed into substantially a radially extending rectangular shape as viewed in the axial direction of the rotary shaft 12. As shown in FIG. 7B, substantially the radial length of the interpole magnet 31 is substantially equal to substantially the radial length of a circumferential side surface of the claw pole 21b. As shown in FIG. 6, the interpole magnet 31 is formed into a rectangular shape as viewed in the radial direction of the rotary shaft 12. That is, each of the interpole magnets 31 is formed into a rectangular parallelepiped shape.

A claw pole 23b of the third rotor core 23 is formed in the same manner as the claw pole 22b of the second rotor core 22. A claw pole 24b of the fourth rotor core 24 is formed in the same manner as the claw pole 21b of the first rotor core 21. Therefore, detailed descriptions and illustrations of the claw poles 23b and 24b will be omitted.

Next, operation of the motor 1 will be described.

Like the first embodiment, in the motor 1, when drive current is supplied to a segment conductor (SC) coil 8 through a power supply circuit in a box 5, a magnetic field for rotating the rotor 11 is generated in a stator 6, and the rotor 11 is rotated.

Each of the interpole magnets 31 is arranged between a circumferentially adjacent pair of the claw poles 21b and 22b. Each of the interpole magnets 31 is magnetized such that a surface thereof that comes into contact with the claw pole 21b having the same polarity functions as a north pole, and a surface of the interpole magnet 31 that comes into contact with the claw pole 22b functions as a south pole. A substantially radial length of the interpole magnet 31 is substantially equal to substantially a radial length of a circumferential end surface of the claw pole 21b. The north pole of the interpole magnet 31 is in abutment against a circumferential end surface of the claw pole 21b, which functions as the north pole. Therefore, magnetic flux of the interpole magnet 31 enters the claw pole 21b from the circumferential end surface of the claw pole 21b and reaches the stator 6 (see FIG. 1) from the radially outer end surface 21e of the claw pole 21b. That is, magnetic flux generated between the claw pole 21b and the stator 6 includes magnetic flux caused by the annular magnet 25 and magnetic flux caused by the interpole magnet 31. That is, the pair of portions formed on the circumferential ends of each of the claw poles 21b by the circumferential end surfaces of the claw pole 21b and the radially inner end surface 21f, i.e., a triangle portion as viewed in the axial direction functions as a magnetic flux guiding portion, which guides magnetic flux of the interpole magnet 31 to the radially outer end surface 21e of the claw pole 21b, i.e., to an end surface of the claw pole 21b, which faces the stator 6. In this manner, the amount of magnetic flux travelling from the rotor 11 toward the stator 6 is increased more than the amount of magnetic flux of only the annular magnet 25. According to the second embodiment, the magnetic flux guiding portion is the magnetic flux controlling section.

The radially inner end surface 22f of the claw portion 22d of the claw pole 22b, which functions as a south pole, is formed in the same manner as the claw portion 21d of the claw pole 21b. Therefore, the pair of portions formed on the circumferential ends of each of the claw poles 22b by the circumferential end surfaces of the claw pole 22b and the radially inner end surface 22f, i.e., a triangle portion as viewed in the axial direction functions as a magnetic flux guiding portion, which guides, to the interpole magnet 31, magnetic flux that enters from an end surface of the claw pole 22b, which faces the stator 6, i.e., from the radially outer end surface 22e of the claw pole 22b.

The radially inner end surface 21f of the claw pole 21b is formed such that the circumferential central portion of the radially inner end surface 21f more closely approaches the radially outer end surface 21e of the claw pole 21b than the circumferential ends of the radially inner end surface 21f. The radially inner end surface 21f and the outer peripheral surface 22g of the core base 22a, which faces the radially inner end surface 21f form the gap 35. The gap 35 suppresses the generation of the magnetic flux travelling from the claw pole 21b, which functions as a north pole toward the outer peripheral surface 22g of the core base 22a, which abuts against a south pole of the annular magnet 25. Therefore, the gap 35 reduces leakage magnetic flux travelling from the claw pole 21b toward the core base 22a.

As described above, the operations of the first rotor core 21 and the second rotor core 22 have been described. The third rotor core 23 has the same shape as that of the second rotor core 22, and the fourth rotor core 24 has the same shape as that of the first rotor core 21. Therefore, the same effect is exerted also in the third rotor core 23 and the fourth rotor core 24.

As described above, according to the second embodiment, the following advantages are exerted in addition to the advantages (2) and (4) to (6) in the first embodiment.

(1) The triangle portion as viewed in the axial direction, which is formed on the circumferential ends of each of the claw poles 21b by the circumferential end surfaces of the claw pole 21b and the radially inner end surface 21f functions as the magnetic flux guiding portion, which guides the magnetic flux of the interpole magnet 31 to the radially outer end surface 21e of the claw pole 21b, i.e., to the end surface of the claw pole 21b, which faces the stator 6. In this manner, the amount of the magnetic flux travelling from the rotor 11 toward the stator 6 is made greater than the amount of the magnetic flux of only the annular magnet 25 and, according to this configuration, it is possible to increase the amount of effective magnetic flux.

(2) The radially inner end surface 22f of the claw portion 22d of the claw pole 22b, which functions as a south pole is formed in the same manner as that of the claw portion 21d of the claw pole 21b. Therefore, the triangle portion as viewed in the axial direction, which is formed on the circumferential ends of each of the claw pole 22b by the circumferential end surfaces of the claw pole 22b and the radially inner end surface 22f, functions as a magnetic flux guiding portion, which guides, to the interpole magnet 31, magnetic flux that enters from the end surface of the claw pole 22b facing the stator 6, i.e., from the radially outer end surface 22e of the claw pole 22b. Therefore, it is possible to increase the amount of effective magnetic flux in the rotor 11.

(3) It is possible to reduce a direct magnetic flux without providing a magnet between the claw poles 21b to 24b and the core bases 21a to 24a. According to this configuration, it is possible to increase the amount of the effective magnetic flux. Since a magnet between the claw poles 21b to 24b and the core bases 21a to 24a is not required, it is possible to restrain the number of parts and manufacturing steps from increasing correspondingly.

(Third Embodiment)

A third embodiment according to the present invention will be described below with reference to the drawings. The third embodiment is characterized in that shapes of rotor cores 41 to 44 are different from those of the rotor cores 21 to 24 in the second embodiment. For purposes of illustration, only the characteristic portions will be described in detail, and description of common portions will be omitted.

Figure 12A:
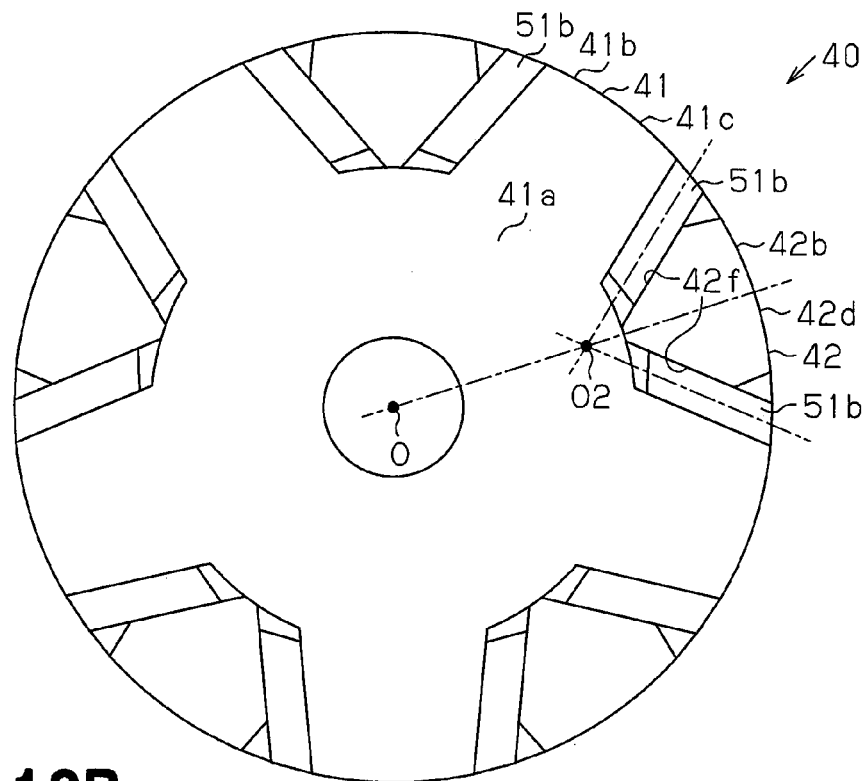
FIGS. 12A and 12B show rotor cores and interpole magnets shown in FIG. 11A.

As shown in FIG. 12A, each of projections 41c is formed into substantially a trapezoidal shape of which the circumferential width is gradually narrowed radially outward as viewed in an axial direction. An outer peripheral surface of the projection 41c is an arcuate curved surface as viewed in the axial direction. The length (the arc length of outer periphery) of the outer peripheral surface of each of the projections 41c in the circumferential direction is smaller than the distance between outer peripheral ends of a circumferentially adjacent pair of the projections 41c.

Figure 12B:
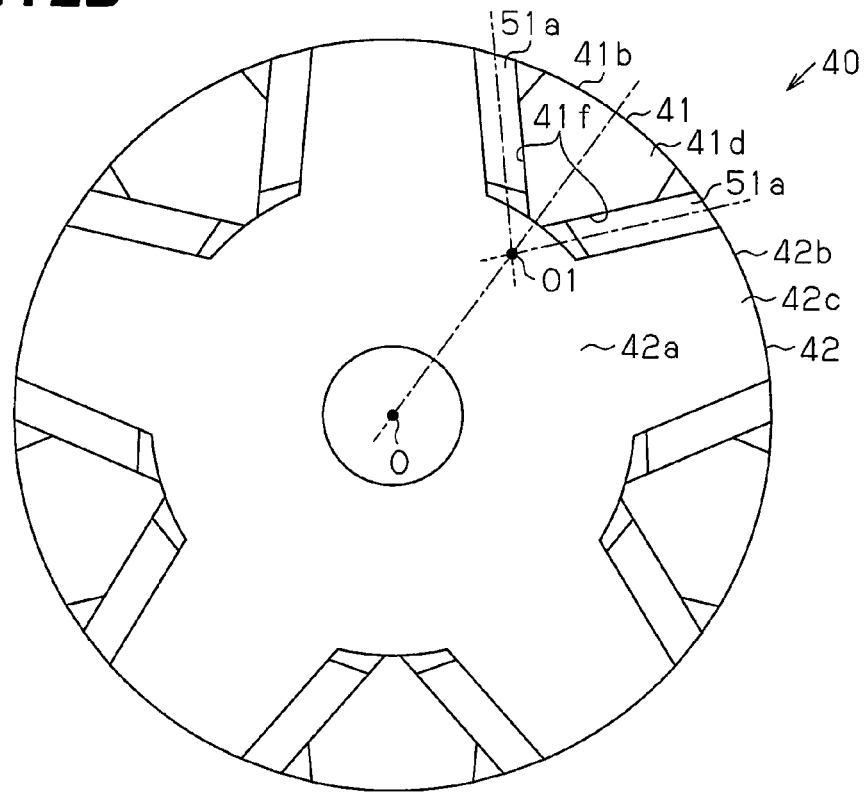

As shown in FIG. 12B, each of projections 42c is formed into substantially a trapezoidal shape of which the circumferential width is gradually narrowed radially outward as viewed in the axial direction. An outer peripheral surface of the projection 42c is an arcuate curved surface as viewed in the axial direction. The length (the arc length of outer periphery) of the outer peripheral surface of each of the projections 42c in the circumferential direction is smaller than the distance between outer peripheral ends of a circumferentially adjacent pair of the projections 42c.

As shown in FIG. 12B, a claw portion 41d of the first rotor core 41 is formed into a shape corresponding to the projection 42c of the second rotor core 42 to be combined. The projection 42c is formed into substantially a trapezoidal shape of which the circumferential width is gradually narrowed radially outward. The claw portion 41d corresponds to circumferential side surfaces of a circumferentially adjacent pair of the projections 42c, and the claw portion 41d is formed into a shape having a pair of surfaces that are parallel to the side surfaces of the projection 42c. As shown in FIGS. 12A and 12B, a radially outside portion of the claw portion 41d is formed into an arcuate shape that is equal to a radially outside portion of the projection 42c (projection 41c). A radially inside portion of the claw portion 41d corresponds to circumferentially adjacent pair of the trapezoidal projections 42c, and the radially inside portion is formed into substantially a triangle shape, which projects radially inward. Therefore, the circumferential width of the claw portion 41d becomes narrow from the radially outside toward the radially inside. Two side surfaces 41f on circumferential sides of the triangle portion of the claw portion 41d are formed into flat surface shapes that are parallel to the circumferential side surface of the projections 42c of the circumferentially adjacent second rotor cores 42.

As shown in FIG. 12A, a claw portion 42d of the second rotor core 42 is formed into a shape corresponding to the projection 41c of the first rotor core 41 to be combined with the claw portion 42d. The projection 41c is formed into substantially a trapezoidal shape of which the circumferential width is gradually narrowed radially outward. The claw portion 42d corresponds to circumferential side surfaces of the circumferentially adjacent projections 41c and is formed into a shape having a pair of surfaces that are parallel to the side surfaces. As shown in FIGS. 12A and 12B, a radially outside portion of the claw portion 42d is formed into an arcuate shape that is equal to a radially outside portion of the projection 41c (projection 42c). A radially inside portion of the claw portion 42d corresponds to the trapezoidal projection 41c, which is adjacent to the radially inside portion in the circumferential direction, and is formed into substantially a triangle shape projecting toward the radially inside. Therefore, the circumferential width of the claw portion 42d becomes narrower from the radially outside toward the radially inside. Two side surfaces 42f of the triangle portion of the claw portion 42d on circumferential sides are formed into flat surface shapes that are parallel to a circumferential side surface of the projection 41c of the circumferentially adjacent first rotor cores 41.

An interpole magnet is arranged between a circumferentially adjacent two claw poles. As shown in FIGS. 12A and 12B, each of the projections is formed into substantially a trapezoidal shape of which the circumferential width in its proximal end is narrower than the circumferential width in its outer peripheral end. Each of the claw portions is arranged between a circumferentially adjacent pair of the projections. A radially inside portion of the claw portion is formed into substantially a triangle shape corresponding to circumferential side surfaces of the circumferentially adjacent projections.

Figure 11A:
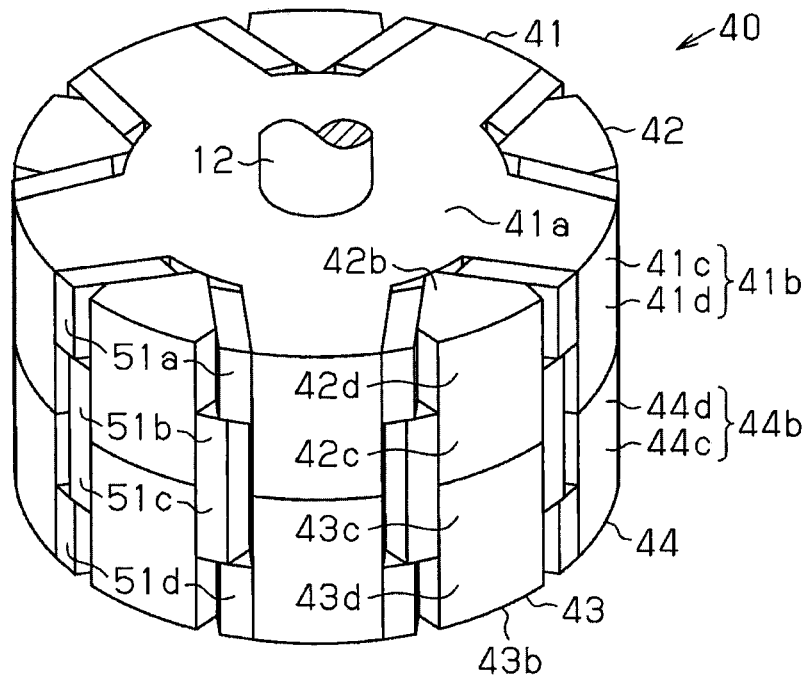
FIGS. 11A and 11B are schematic perspective views of a rotor according to a third embodiment of the present invention.

Therefore, the interpole magnet is arranged between a circumferentially adjacent pair of the projection and the claw portion. That is, as shown in FIG. 11A, a first interpole magnet 51a is located between the projection 41c of the first rotor core 41 and the claw portion 42d of the second rotor core 42, and a second interpole magnet 51b is located between the claw portion 41d of the first rotor core 41 and the projection 42c of the second rotor core 42. Similarly, a third interpole magnet 51c is located between a claw portion 44d of a fourth rotor core 44 and a projection 43c of a third rotor core 43, and a fourth interpole magnet 51d is located between a projection 44c of a fourth rotor core 44 and a claw portion 43d of a third rotor core 43.

A distal end of the claw pole 41b of the first rotor core 41 and a distal end of a claw pole 44b of the fourth rotor core 44, i.e., the claw portions 41d and 44d are arranged in the axial direction. Therefore, inner peripheral surfaces of both claw portions 41d and 44d are located on the same plane. A proximal end of a claw pole 42b of the second rotor core 42 and a proximal end of a claw pole 43b of the third rotor core 43, i.e., the projections 42c and 43c are arranged in the axial direction. Therefore, circumferential side surfaces of both projections 42c and 43c are located on the same plane. Hence, the second interpole magnet 51b and the third interpole magnet 51c are integrally formed together.

Each of the interpole magnets 51a to 51d is formed into a parallelogram shape as viewed in the axial direction. Each of the interpole magnets 51a to 51d is formed into a rectangular shape as viewed in the radial direction. Each of the interpole magnets 51a to 51d is arranged such that it has an angle with respect to a radial direction of a rotor 40. That is, the claw poles of the rotor cores 41 to 44 are arranged such that the interpole magnets 51a to 51d arranged between a circumferentially adjacent pair of the claw poles have angles with respect to the radial directions of the rotor cores 41 to 44.

Next, operation of the rotor 40 will be described.

The interpole magnets 51a and 51b are arranged between a circumferentially adjacent pair of the claw poles 41b and 42b. Each of the interpole magnets 51a and 51b is magnetized such that a surface thereof that is in contact with the claw pole 41b having the same polarity functions as a north pole and a surface of the interpole magnet that is in contact with the claw pole 42b functions as a south pole. The claw portion 41d of the claw pole 41b is formed into substantially a triangle shape of which the circumferential center projects radially inward. Therefore, magnetic flux of the interpole magnet 51a enters the claw pole 41b from the claw portion 41d of the claw pole 41b and reaches the stator 6 (see FIG. 1) from an outer peripheral surface 41e of the claw pole 41b. That is, magnetic flux generated between the claw pole 41b and the stator 6 includes magnetic flux caused by the annular magnet 25 and magnetic flux caused by the interpole magnet 51a. That is, a portion of the claw portion 41d formed into substantially a triangle shape of which the circumferential center projects radially inward functions as a magnetic flux guiding portion, which guides magnetic flux of the interpole magnet 51a to an outer peripheral surface of the claw pole 41b, i.e., to an end surface of the claw pole 41b that faces the stator 6. In the third embodiment, the magnetic flux guiding portion is a magnetic flux controlling section. In this manner, the amount of magnetic flux travelling from the rotor 40 toward the stator 6 is increased more than the amount of magnetic flux of only the annular magnet 25.

Each of the circumferential surfaces of the interpole magnets 51a and 51b arranged between a circumferentially adjacent pair of the claw pole 41b and the claw pole 42b is magnetized such that the circumferential surface has the same polarity as that of the claw pole that is adjacent to the circumferential surface. Therefore, each of the interpole magnets 51a and 51b prevents a direct magnetic flux travelling from the claw pole 41b toward the claw pole 42b from being formed. As a result, direct leakage magnetic flux between the claw pole 41b and the claw pole 42b is reduced.

The claw portion 41d is formed into substantially a triangle shape of which the circumferential center portion projects radially inward. Therefore, magnetic flux travelling from the claw portion 41d, which functions as a north pole, toward a core base 42a, which is a south pole, concentrates on a projecting apex portion, magnetic saturation is generated in the apex portion and thus, the amount of magnetic flux travelling from the claw portion 41d toward the core base 42a is reduced. That is, by forming the radially inside portion of the claw portion 41d into substantially the triangle shape, the amount of magnetic flux travelling from the claw portion 41d to the core base 42a, i.e., the amount of leakage magnetic flux is reduced.

As shown in FIGS. 12A and 12B, intersection points O1 and O2 between line segments passing through circumferential centers of the interpole magnets 51a and 51b arranged between a circumferentially adjacent pair of the claw pole 41b and the claw pole 42b are deviated from an intersection point between circumferential center lines of the claw poles 41b and 42b, i.e., from the rotation center O of the rotor 40. Therefore, when the rotor 40 rotates, the interpole magnets 51a and 51b are pressed against the circumferential side surface of the claw pole 41b by a centrifugal force. Hence, the interpole magnets 51a and 51b are prevented from being pulled out from the rotor 40.

Figure 11B:
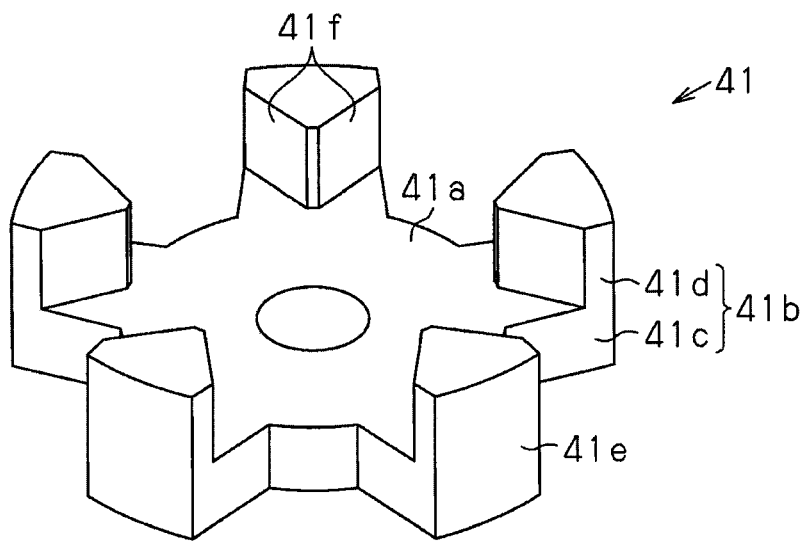
Figure 13:
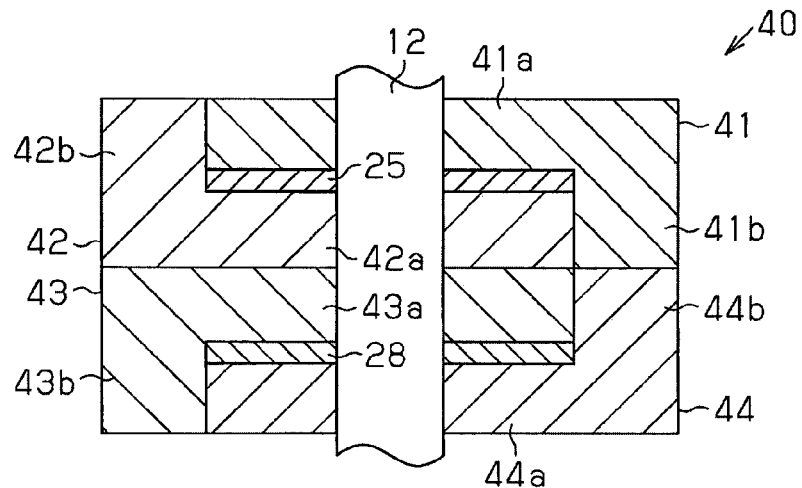
FIG. 13 is a schematic cross-sectional view of the rotor shown in FIG. 11.

As shown in FIG. 11B, the claw pole 41b of the first rotor core 41 includes the projection 41c extending from an outer periphery of a core base 41a radially outward and the claw portion 41d extending from the projection 41c in the axial direction. As shown in FIG. 13, magnetic flux caused by the annular magnet 25 travels from the core base 41a to the stator 6 (see FIG. 1) through the projection 41c and the claw portion 41d. However, since the claw portion 41d extends from the projection 41c in the axial direction, the magnetic flux of the annular magnet 25 does not easily pass through the claw portion 41d. As a result, a difference is generated between the magnetic flux density of a portion of the claw pole 41b close to the proximal end in the axial direction (projection 41c) and the magnetic flux density of a portion of the claw pole 41b close to a distal end in the axial direction (claw portion 41d).

In the third embodiment, as shown in FIG. 11A, the north pole of the interpole magnet 51a is in abutment against the claw portion 41d, which functions as a north pole. Therefore, magnetic flux of the interpole magnet 51a reaches the stator 6 through the claw portion 41d. Hence, since the amount of the magnetic flux in the claw portion 41d is increased, the interpole magnet 51a can reduce the difference between the magnetic flux density of the portion of the claw pole 41b close to the proximal end in the axial direction (projection 41c) and the magnetic flux density of the portion of the claw pole 41b close to the distal end in the axial direction (claw portion 41d).

The operation mainly in the first rotor core 41 has been described above. The second to fourth rotor cores 42 to 44 have the same shapes as that of the first rotor core 41. Therefore, the same effect is exerted also in the second to fourth rotor cores 42 to 44.

In the third embodiment, as shown in FIG. 11A, the interpole magnet 51a abuts against the claw portion 41d of the first rotor core 41, the interpole magnets 51b and 51c abut against the claw portions 42d and 43d of the second and third rotor cores 42 and 43, and the interpole magnet 51d abuts against the claw portion 44d of the fourth rotor core 44. Magnetic forces of the interpole magnets 51a to 51d can be made different from each other. Therefore, if the magnetic forces of the interpole magnets 51a and 51d, which abut against the claw portions 41d and 44d of the first and fourth rotor cores 41 and 44, are made stronger, it is possible to reinforce magnetic flux corresponding to leakage magnetic flux based on the arrangement. According to this configuration, it is possible to reduce the difference between the amount of magnetic fluxes travelling from the core bases 41a and 44a toward the claw poles 41b and 44b and the amount of magnetic fluxes travelling from the claw poles 42b and 43b toward the core bases 42a and 43a, i.e., it is possible to substantially make the amounts of the magnetic fluxes uniform.

As described above, according to the third embodiment, the following advantages are exerted in addition to the advantages (3), (4) and (6) of the first embodiment and the advantage (3) of the second embodiment.

(1) Each of the claw portions 41d to 44d of the claw poles 41b to 44b is formed into substantially the triangle shape of which the circumferential center projects radially inward. The interpole magnets 51a to 51d abut against the inclined surfaces of substantially the triangle shaped portions. The substantially triangle shaped portions function as magnetic flux guiding portions, which guide magnetic fluxes of the interpole magnets 51a and 51d to the outer peripheral surfaces of the claw poles 41b and 44b, i.e., to the end surfaces of the claw poles 41b and 44b facing the stator 6. In this manner, it is possible to increase the amount of magnetic flux travelling from the rotor 40 toward the stator 6 more than the amount of magnetic flux of only the annular magnets 25 and 28, i.e., it is possible to increase the amount of effective magnetic flux.

(2) The circumferential centers of the claw portions 41d to 44d of the claw poles 41b to 44b are formed into substantially triangle shapes of which the circumferential centers project radially inward. Therefore, magnetic flux travelling from the claw portion 41d, which functions as a north pole, toward a core base 42a, which is a south pole, concentrates on a projecting apex portion, magnetic saturation is generated in the apex portion and thus, the amount of magnetic flux travelling from the claw portion 41d toward the core base 42a is reduced. That is, by forming the radially inside portion of the claw portion 41d into substantially the triangle shape, it is possible to reduce the amount of the magnetic flux travelling from the claw portion 41d toward the core base 42a, i.e., to reduce the amount of the leakage magnetic flux, and it is possible to restrain effective magnetic flux from being reduced.

(Fourth Embodiment)

A fourth embodiment according to the present invention will be described below with reference to the drawings.

Figure 16A:
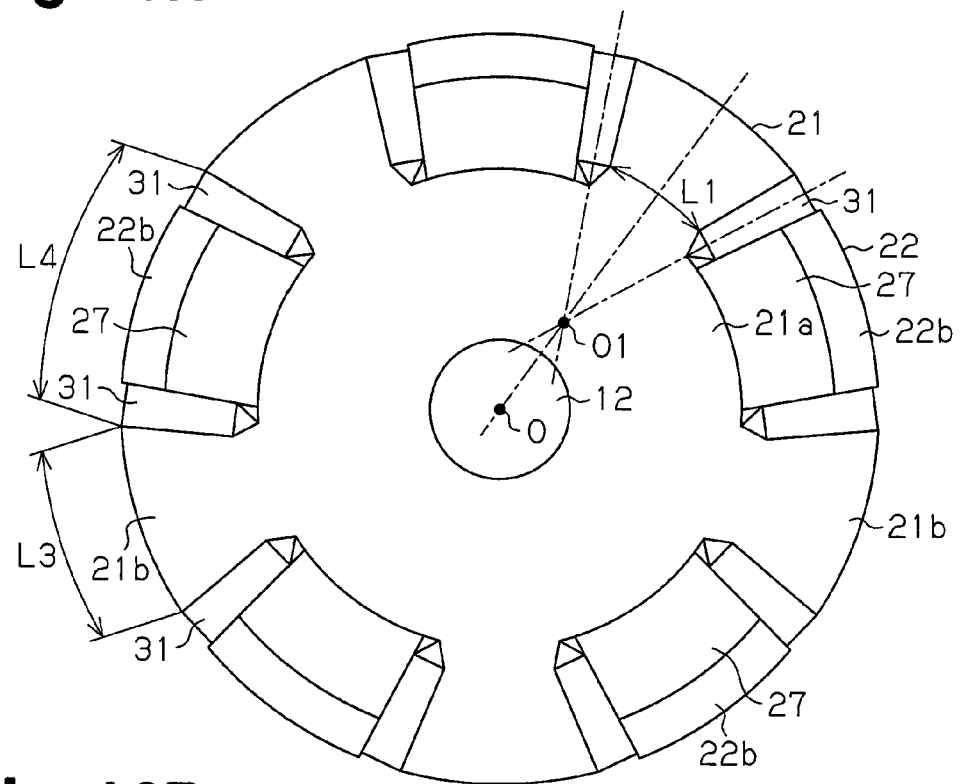
FIGS. 16A and 16B are explanatory diagrams of rotor cores, auxiliary magnets and interpole magnets shown in FIG. 15.
Figure 16B:
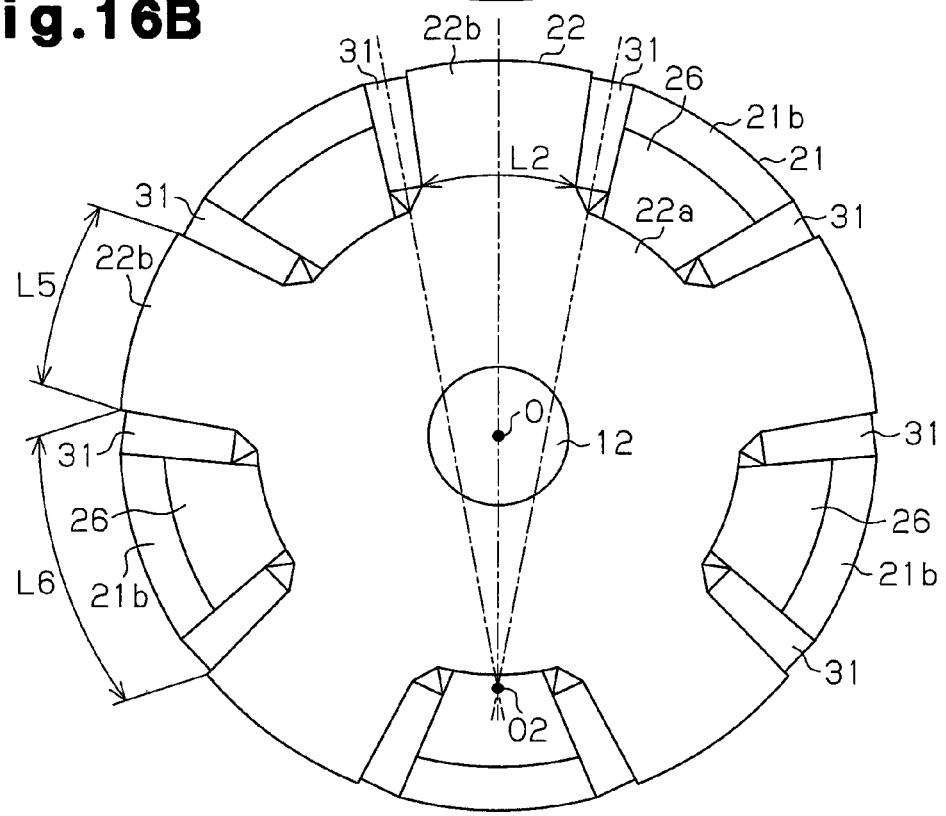

As shown in FIG. 16B, each of first back surface auxiliary magnets 26 is located between a back surface (radially inner surface) of each of claw poles 21b and an outer peripheral surface of a core base 22a. The first back surface auxiliary magnet 26 is formed into an arcuate shape as viewed in the axial direction of the rotary shaft 12. A pair of circumferential side surfaces of the first back surface auxiliary magnet 26 located on the same plane as a pair of circumferential side surfaces of the corresponding claw pole 21b. The first back surface auxiliary magnet 26 is magnetized in the radial direction such that a portion of the first back surface auxiliary magnet 26 close to the back surface of the claw pole 21b functions as a first magnetic pole, e.g., a north pole, which is the same as that of the claw pole 21b, and a portion of the first back surface auxiliary magnet 26 close to the core base 22a functions as a second magnetic pole, e.g., a south pole, which is the same as that of the core base 22a.

As shown in FIG. 16A, each of second back surface auxiliary magnets 27 is located between a back surface (radially inner surface) of each of the claw poles 22b and an outer peripheral surface of a core base 21a. Each of the second back surface auxiliary magnets 27 is formed into an arcuate shape as viewed in the axial direction of the rotary shaft 12. A pair of circumferential side surfaces of the second back surface auxiliary magnet 27 is located on the same plane as a pair of circumferential side surfaces of the corresponding claw pole 22b. The second back surface auxiliary magnet 27 is magnetized in the radial direction such that a portion of the second back surface auxiliary magnet 27 close to the back surface of the claw pole 22b functions as a second magnetic pole, e.g., a south pole, which is the same as that of the claw pole 22b, and a portion of the second back surface auxiliary magnet 27 close to the core base 21a functions as a first magnetic pole, e.g., a north pole, which is the same as that of the core base 21a.

Figure 15:
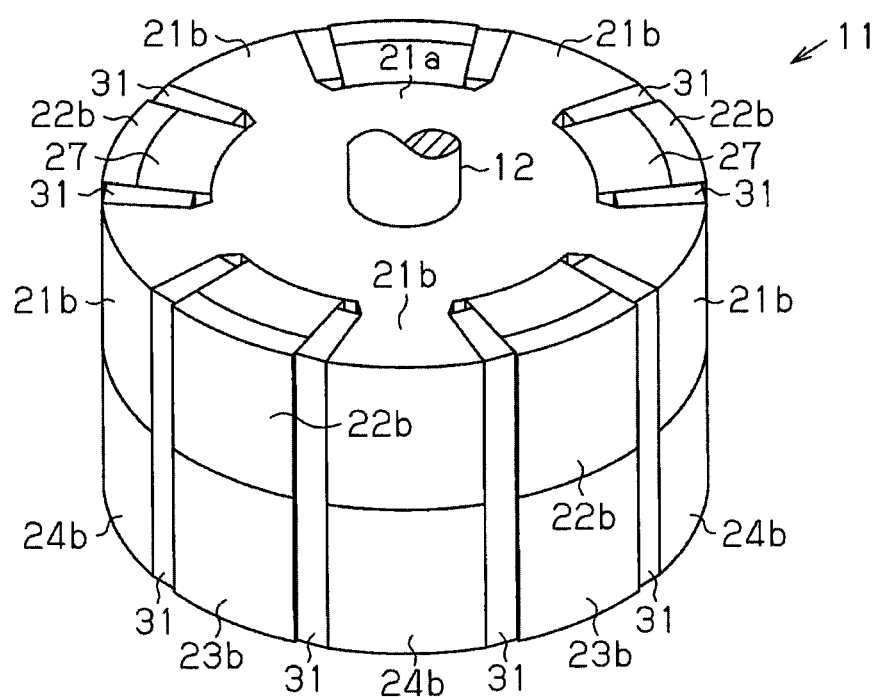
FIG. 15 is a schematic perspective view of a rotor according to a fourth embodiment of the present invention.

As shown in FIG. 16A, each of interpole magnets 31 is located between a circumferentially adjacent pair of the claw pole 21b and the claw pole 22b. Each of the interpole magnets 31 is formed into a rectangular shape as viewed in the axial direction of the rotary shaft 12. The interpole magnet 31 of the fourth embodiment is formed into a rectangular shape extending toward an interior of the rotor 11 along circumferential end surfaces of the claw poles 21b and 22b, and more specifically, the interpole magnet 31 is formed into a trapezoidal shape of which the circumferential width is gradually narrowed toward the interior. As shown in FIG. 15, each of the interpole magnets 31 extends in the axial direction of the rotary shaft 12. The axial length of each of the interpole magnets 31 is equal to the distance from two end surfaces of the rotary shaft 12, which are exposed in the axial direction of the rotary shaft 12, i.e., from an axial outer end surface of the first rotor core 21 to an axial outer end surface of the fourth rotor core 24.

As shown in FIG. 16A, each of the interpole magnets 31 is arranged such that its surface passing through its circumferential center has an angle with respect to a radial direction of the rotor 11 as viewed in the axial direction. That is, circumferential end surfaces of the claw poles 21b to 24b of the rotor cores 21 to 24 are formed such that the interpole magnets 31 located between the adjacent claw poles have angles with respect to the radial directions of the rotor cores 21 to 24. As shown in FIG. 16A for example, the claw pole 21b is formed such that an intersection point O1 of line segments (shown by lines formed by a long dash alternating with a short dash) passing through circumferential centers of the two circumferentially adjacent interpole magnets 31 is located radially outward of a rotation center O of the rotor 11, i.e., an axial center of the rotary shaft 12 and is located at a position closer the claw pole 21b.

As shown in FIG. 16B, the claw pole 22b is formed such that an intersection point O2 of line segments (shown by lines formed by a long dash alternating with a short dash) passing through circumferential centers of the two circumferentially adjacent interpole magnets 31 is located at a position radially outward of the rotation center O of the rotor 11, i.e., the axial center of the rotary shaft 12, and at a position separating away from the claw pole 22b.

Therefore, the circumferential width (see FIG. 16A) of a proximal end of the claw pole 21b is narrower than the circumferential width (see FIG. 16B) of a proximal end of the claw pole 22b. More specifically, the widths of the proximal ends when the claw poles have the same shapes are defined as a reference width L0. The width L1 of the proximal end of the claw pole 21b is narrower than the reference width L0 by ΔL, and the width L2 of the proximal end of the claw pole 22b is greater than the reference width L0 by ΔL. In the fourth embodiment, the proximal end of the claw pole is a magnetic flux controlling section.

Operation of the motor 1 of the fourth embodiment is the same as that of the first embodiment, and the advantages (2) to (6) of the first embodiment are obtained.

(Fifth Embodiment)

A fifth embodiment according to the present invention will be described below with reference to the drawings.

Figure 17:
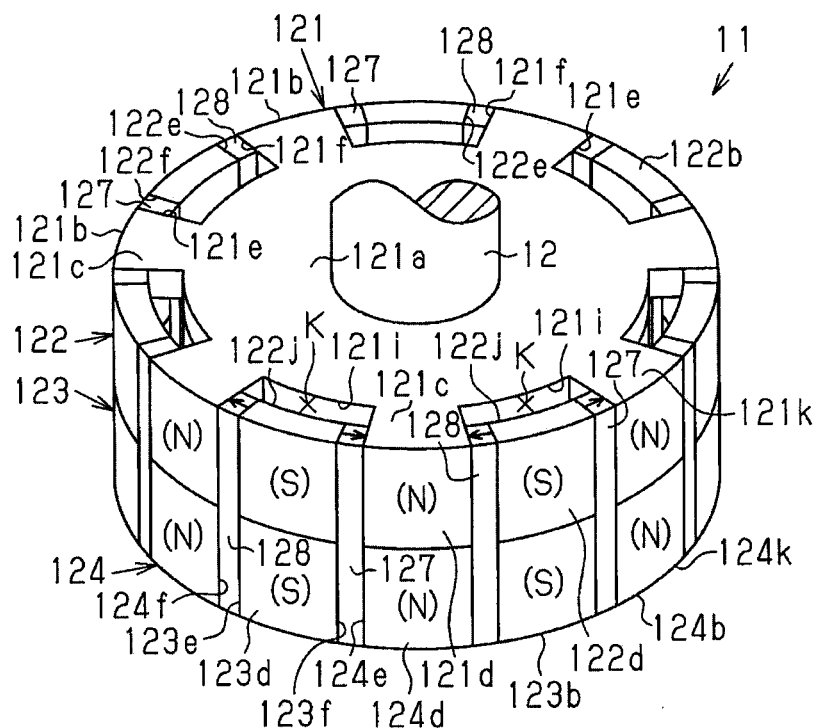
FIG. 17 is a perspective view of a rotor according to a fifth embodiment of the present invention.
Figure 18:
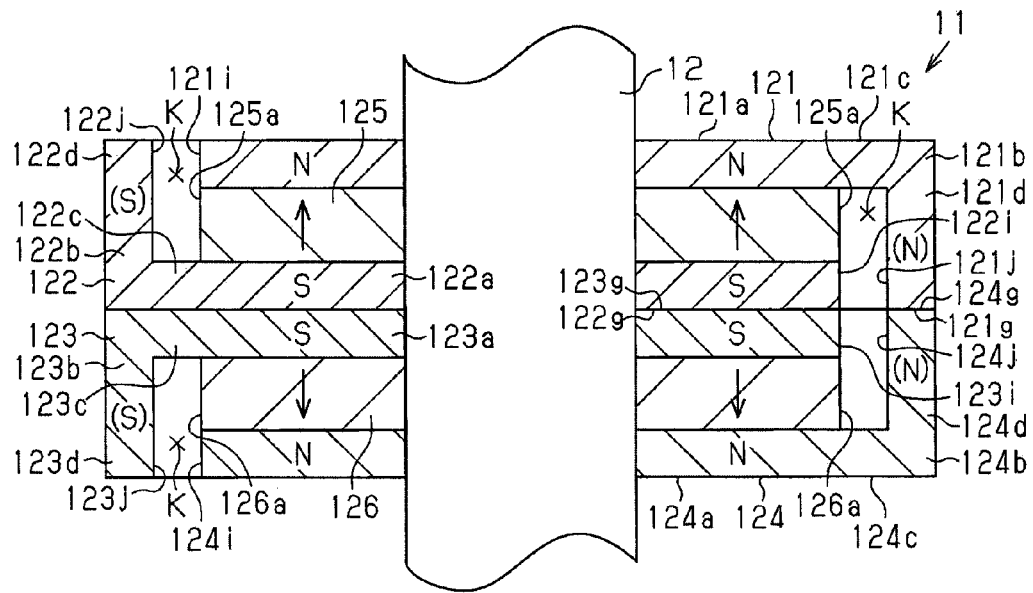
FIG. 18 is a cross-sectional view of the rotor shown in FIG. 17.

As shown in FIGS. 17 and 18, a rotor 11 includes a pair of first and second rotor cores 121 and 122, a pair of third and fourth rotor cores 123 and 124, annular magnets 125 and 126 (see FIGS. 19A and 19B) as field magnets, and interpole magnets 127 and 128. Arrows in FIGS. 17 and 18 show magnetizing directions (from a south pole toward a north pole) of the magnets 125, 126, 127 and 128.

As shown in FIG. 17, seven claw poles 121b are formed on an outer periphery of a core base 121a of the present embodiment at equal intervals from one another. Each of the claw poles 121b includes a projection 121c extending from the core base 121a radially outward and a claw portion 121d extending from the projection 121c in the axial direction.

A pair of circumferential end surfaces 121e and 121f of the claw pole 121b are flat surfaces extending in a radial direction, i.e., a flat surfaces that are not inclined with respect to the radial direction as viewed in an axial direction. A cross section of the projection 121c in a direction intersecting with the axial direction at right angles has an arcuate shape. The claw portion 121d extends in the axial direction from a radially outer end of the projection 121c. The circumferential width of the claw portion 121d is constant. The circumferential angle of each of the claw poles 121b, i.e., an angle between the pair of circumferential end surfaces 121e and 121f is smaller than the circumferential angle of the gap between a circumferentially adjacent pair of the claw poles 121b.

In the claw pole 121b, the circumferential angle H1 as the circumferential width of the projection 121c is equal to the circumferential angle H2 of the claw portion 121d. The claw pole 121b has the arcuate shape as described above, the circumferential width (the length) of the claw pole 121b becomes greater radially outward and therefore, the circumferential width of the claw portion 121d is longer than the circumferential width of a radially outermost portion of the projection 121c, i.e., the circumferential maximum width of the projection 121c.

As shown in FIGS. 17 and 18, projections 122c of seven claw poles 122b are formed on an outer periphery of a core base 122a of the present embodiment at equal intervals from one another. A cross section of the projection 122c in a direction intersecting with the axial direction at right angles has an arcuate shape. A claw portion 122d extends in the axial direction from a radially outer end of the projection 122c. The claw portion 122d is formed such that it protrudes circumferential sides more than the projection 122c. Hence, in the claw pole 122b, the circumferential angle H3 as the circumferential width of the projection 122c is smaller than the circumferential angle H4 of the claw portion 122d. The circumferential angle H4 of the claw portion 122d is equal to the circumferential angles H1 and H2 of the projection 121c and the claw portion 121d of the claw pole 121b. The circumferential angle H3 of the projection 122c is smaller than the circumferential angles H1 and H2 of the projection 121c and the claw portion 121d of the claw pole 121b.

A pair of circumferential end surfaces 122e and 122f of the claw pole 122b are flat surfaces extending in the radial direction. A cross section of the claw pole 122b (projection 122c) in a direction intersecting with the axial direction at right angles has an arcuate shape. The circumferential angle of each of the claw poles 122b, i.e., the angle between the pair of circumferential end surfaces 122e and 122f is smaller than the circumferential angle of the gap between a circumferentially adjacent pair of the claw poles 122b.

The second rotor core 122 is assembled with the first rotor core 121 such that each claw portion 122d is located between a corresponding pair of claw portions 121d and such that the annular magnet 125 (see FIG. 18) is located (sandwiched) between the core base 121a and the core base 122a in the axial direction. At this time, since the circumferential end surface 121e of the claw pole 121b and the circumferential end surface 122f of the claw pole 122b become parallel to each other in the axial direction, the gap between the end surfaces 121e and 122f form substantially a straight line in the axial direction. Since the circumferential end surface 121f of the claw pole 121b and the circumferential end surface 122e of the claw pole 122b become parallel to each other in the axial direction, the gap between the end surfaces 121f and 122e form substantially a straight line in the axial direction.

The outer diameter of the annular magnet 125 and the outer diameters of the core bases 121a and 122a are equal to each other. The annular magnet 125 is magnetized in the axial direction such that the claw pole 121b functions as a first magnetic pole, e.g., a north pole, and the claw pole 122b functions as a second magnetic pole, e.g., a south pole.

If the first and second rotor cores 121 and 122 and the annular magnet 125 are assembled with each other, a gap K is provided between radially outer end surfaces 121i and 122i of the core bases 121a and 122a, a radially outer end surface 125a of the annular magnet 125, and back surfaces 121j and 122j of the claw portions 121d and 122d of the claw poles 121b and 122b in the radial direction as shown in FIG. 18.

As shown in FIGS. 17 and 18, the third rotor core 123 is obtained by reversing the second rotor core 122 in a direction intersecting with the axial direction at right angles. Seven claw poles 123b are formed on an outer periphery of a core base 123a at equal intervals from one another. The claw pole 123b includes a projection 123c extending from the core base 123a radially outward and a claw portion 123d extending from the projection 123c in the axial direction.

As shown in FIG. 18, the third rotor core 123 is assembled with the rotary shaft 12 such that an axial first end surface 123g of the third rotor core 123 abuts against an axial second end surface 122g of the second rotor core 122. Hence, the claw portion 123d extends in an axial direction opposite from the claw portion 122d of the second rotor core 122.

A pair of circumferential end surfaces 123e and 123f of the claw pole 123b are radially extending flat surfaces, i.e., flat surfaces that are not inclined in the radial direction as viewed in the axial direction. A cross section of the projection 123c in a direction intersecting with the axial direction at right angles has an arcuate shape. The claw portion 123d extends from a radially outer end of the projection 123c in the axial direction. The circumferential width of the claw portion 123d is constant. The circumferential angle of each of the claw poles 123b, i.e., the angle between the pair of circumferential end surfaces 123e and 123f is smaller than the circumferential angle of the gap between a circumferentially adjacent pair of the claw poles 123b.

The fourth rotor core 124 is obtained by reversing the first rotor core 121 in a direction intersecting with the axial direction at right angles and has substantially the same shape as that of the third rotor core 123. Projections 124c of seven claw poles 124b are formed on an outer periphery of a core base 124a at equal intervals from one another. A cross section of the projection 124c in a direction intersecting with the axial direction at right angles has an arcuate shape. A claw portion 124d extends in the axial direction from a radially outer end of the projection 124c.

A pair of circumferential end surfaces 124e and 124f of the claw pole 124b are flat surfaces extending in the radial direction. A cross section of the claw pole 124b (projection 124c) in a direction intersecting with the axial direction at right angles has an arcuate shape. The circumferential angle of each of the claw poles 124b, i.e., the angle between the pair of circumferential end surfaces 124e and 124f is smaller than the angle of the gap between a circumferentially adjacent pair of the claw poles 124b.

The fourth rotor core 124 is assembled with the third rotor core 123 such that each claw portion 124d is located between a corresponding pair of claw portions 123d and such that the annular magnet 126 (see FIG. 18) is located (sandwiched) between the core bases 123a and 124a in the axial direction. At this time, since the circumferential end surface 123e of the claw pole 123b and the circumferential end surface 124f of the claw pole 124b become parallel to each other in the axial direction, the gap between the end surfaces 123e and 124f form substantially a straight line in the axial direction. Since the circumferential end surface 123f of the claw pole 123b and the circumferential end surface 124e of the claw pole 124b become parallel to each other in the axial direction, the gap between the end surfaces 123f and 124e form substantially a straight line in the axial direction. The claw poles 124b (fourth rotor core 124) is assembled with the third rotor core 123 and the rotary shaft 12 such that an axially distal end surface 124g of each of the claw portions 124d axially abuts against an axially distal end surface 121g of the corresponding claw portion 121d of the claw pole 121b.

If the third and fourth rotor cores 123 and 124 and the annular magnet 126 are assembled with each other, as shown in FIG. 18, a gap K is provided between radially outer end surfaces 123i and 124i of the core bases 123a and 124a, the radially outer end surface 126a of the annular magnet 126, and back surfaces 123j and 124j of the claw portions 123d and 123d of the claw poles 123b and 124b in the radial direction.

Figure 19A:
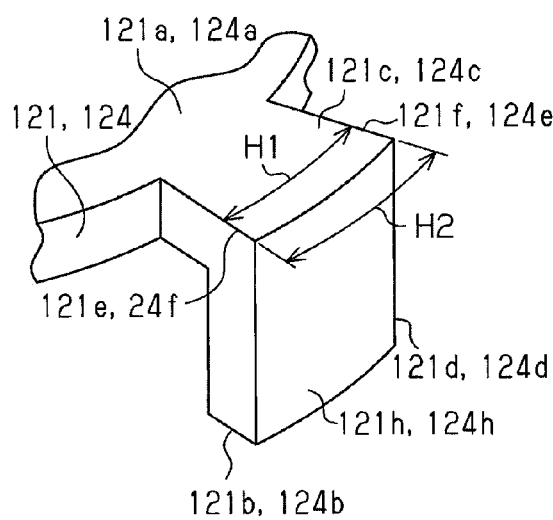
FIG. 19A is a perspective view showing claw poles of rotor cores on both ends in an axial direction thereof.
Figure 19B:
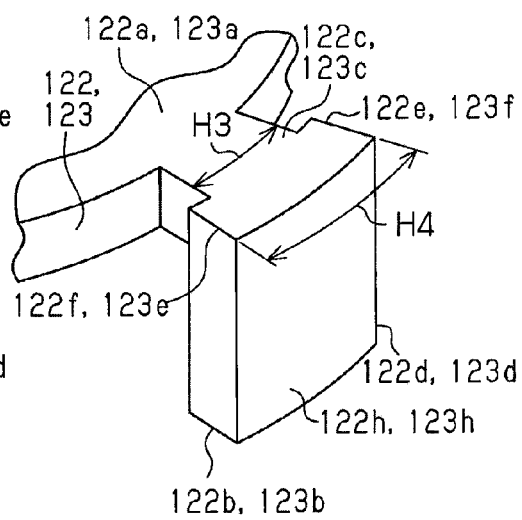
FIG. 19B is a perspective view showing claw poles of the rotor cores on the side of a center in the axial direction.

As shown in FIGS. 19A and 19B, all of the claw portions 121d to 124d of the claw poles 121b to 124b have the same shapes, and radially outer end surfaces 121h to 124h of these claw portions have substantially the same areas.

The magnetizing direction of the annular magnet 126 is opposite from that of the annular magnet 125. The outer diameter of the annular magnet 126 is equal to those of the core bases 123a and 124a. The annular magnet 126 is magnetized in the axial direction such that the claw pole 123b functions as a second magnetic pole, e.g., a south pole, and the claw pole 124b functions as a first magnetic pole, e.g., a north pole.

As shown in FIG. 17, interpole magnets 127 and 128 are located between the claw pole 121b and the claw pole 122b in the circumferential direction and between the claw pole 123b and the claw pole 124b in the circumferential direction. More specifically, the interpole magnet 127 is located between a circumferential end surface 121e of the claw pole 121b and a circumferential end surface 122f of the claw pole 122b and between a circumferential end surface 123f of the claw pole 123b and a circumferential end surface 124e of the claw pole 124b. The interpole magnet 128 is located between a circumferential end surface 121f of the claw pole 121b and a circumferential end surface 122e of the claw pole 122b and between a circumferential end surface 123e of the claw pole 123b and a circumferential end surface 124f of the claw pole 124b. The interpole magnets 127 and 128 are magnetized in the circumferential direction such that the same polarities of the interpole magnets 127 and 128 and the same polarities of the claw poles 121b to 124b face each other, i.e., such that portions of the interpole magnets 127 and 128 close to the claw pole 121b and the claw poles 124b function as north poles, portions of the interpole magnets 127 and 128 close to the claw pole 122b and the claw pole 123b function as south poles.

The interpole magnets 127 and 128 are formed to from an axial outer end surface 121k of the first rotor core 121 of an axial first end to an axial outer end surface 124k of the fourth rotor core 124 of an axial second end, and the interpole magnets 127 and 128 are arranged to be flush with the end surfaces 121k and 124k. At this time, the first to fourth rotor cores 121 to 124 and the annular magnets 125 and 126 are assembled with each other such that a gap K, which is similar to the above-described gap K, is provided between radially inner end surfaces of the interpole magnets 127 and 128, radially outer end surfaces 121i, 122i, 123i and 124i of the core bases 121a, 122a, 123a and 124a, and the radially outer end surfaces 125a and 126a of the annular magnets 125 and 126.

Next, operation of a motor 1 configured as described above will be described.

Like the first embodiment, in the motor 1, when drive current is supplied to a segment conductor (SC) coil 8 through a power supply circuit in a box 5, a magnetic field for rotating the rotor 11 is generated in a stator 6, and the rotor 11 is rotated.

The interpole magnets 127 and 128 are located between the claw pole 121b and the claw pole 122b in the circumferential direction and between the claw pole 123b and the claw poles 124b in the circumferential direction. The interpole magnets 127 and 128 are magnetized in the circumferential direction such that the same polarities of the interpole magnets 127 and 128 and the same polarities of the claw poles 121b to 124b face each other. According to this configuration, leakage magnetic fluxes are reduced between the claw poles 121b, 122b, 123b and 124b, and magnetic fluxes of the annular magnets 125 and 126 can effectively be utilized for output of the motor 1.

As shown in FIGS. 19A and 19B, the first to fourth rotor cores 121 to 124 include the projections 121c to 124c, which are proximal ends of the claw poles 121b to 124b, respectively. The circumferential angle H1 as the circumferential widths of the projections 121c and 124c of the first and fourth rotor cores 121 and 124 of axial ends is greater than the circumferential angle H3 as the circumferential widths of the projections 122c and 123c of the other rotor cores 122 and 123. According to this configuration, in the axial end rotor cores 121 and 124, and the other rotor cores 122 and 123, magnetic flux densities of the claw poles 121b, 122b, 123b and 124b become uniform. In the fifth embodiment, the proximal end of the claw pole is a magnetic flux controlling section.

As described above, according to the fifth embodiment, the following advantages can be obtained.

(1) The circumferential angle H1, or the circumferential widths of the projections 121c and 124c, which are proximal ends of the claw poles 121b and 124b possessed by the first and fourth rotor cores 121 and 124, which are exposed in the axial direction, is greater than the circumferential angle H3, or the circumferential widths of the projections 122c and 123c, which are proximal ends of the claw poles 121b to 124b possessed by the other rotor cores 122 and 123. According to this configuration, when the axial thicknesses of the rotor cores 121 to 124 are made the same, areas of cross sections of the projections 121c and 124c in the circumferential direction thereof are wider than areas of cross sections of the other projections 122c and 123c in the circumferential direction thereof. According to this configuration, it is possible to take in magnetic flux that would leak outside, reliably cause the magnetic flux to flow to the claw poles 121b to 124b, and make the magnetic flux densities of the rotor cores 121 and 124 on the axial ends and the other rotor cores 122 and 123 uniform. As a result, it is possible to suppress the generation of torque ripple in the motor, and to suppress generation of noise and vibration.

(2) All of the radially outer end surfaces 121h to 124h of the claw portions 121d to 124d of the claw poles 121b to 124b have the same shapes. Hence, surfaces of the claw poles 121b to 124b, which face the stator 6, have the same areas, and influence of a rotation magnetic field generated from the stator 6 can be made uniform in the claw poles 121b to 124b.

(3) The interpole magnets 127 and 128 are each located between a circumferentially adjacent pair of the claw poles 121b, 122b, 123b and 124b, and the interpole magnets 127 and 128 are magnetized such that the same polarities of the interpole magnets 127 and 128 and the same polarities of the claw poles 121b, 122b, 123b and 124b, which are adjacent to each other in the circumferential direction, face each other. Since the interpole magnets 127 and 128 are provided, it is possible to reduce the leakage magnetic flux that can be generated between the claw poles 121b, 122b, 123b and 124b and to enhance the motor output.

(4) Since the interpole magnets 127 and 128 are formed to extend from the axial outer end surface 121k of the first rotor core 121 of the axial first end to the axial outer end surface 124k of the fourth rotor core 124 of the axial second end, it is possible to restrain the number of parts from increasing. According to this, it is possible to suppress the number of manufacturing steps required for assembling the interpole magnets 127 and 128.

(Sixth Embodiment)

A sixth embodiment according to the present invention will be described below with reference to the drawings.

Figure 20:
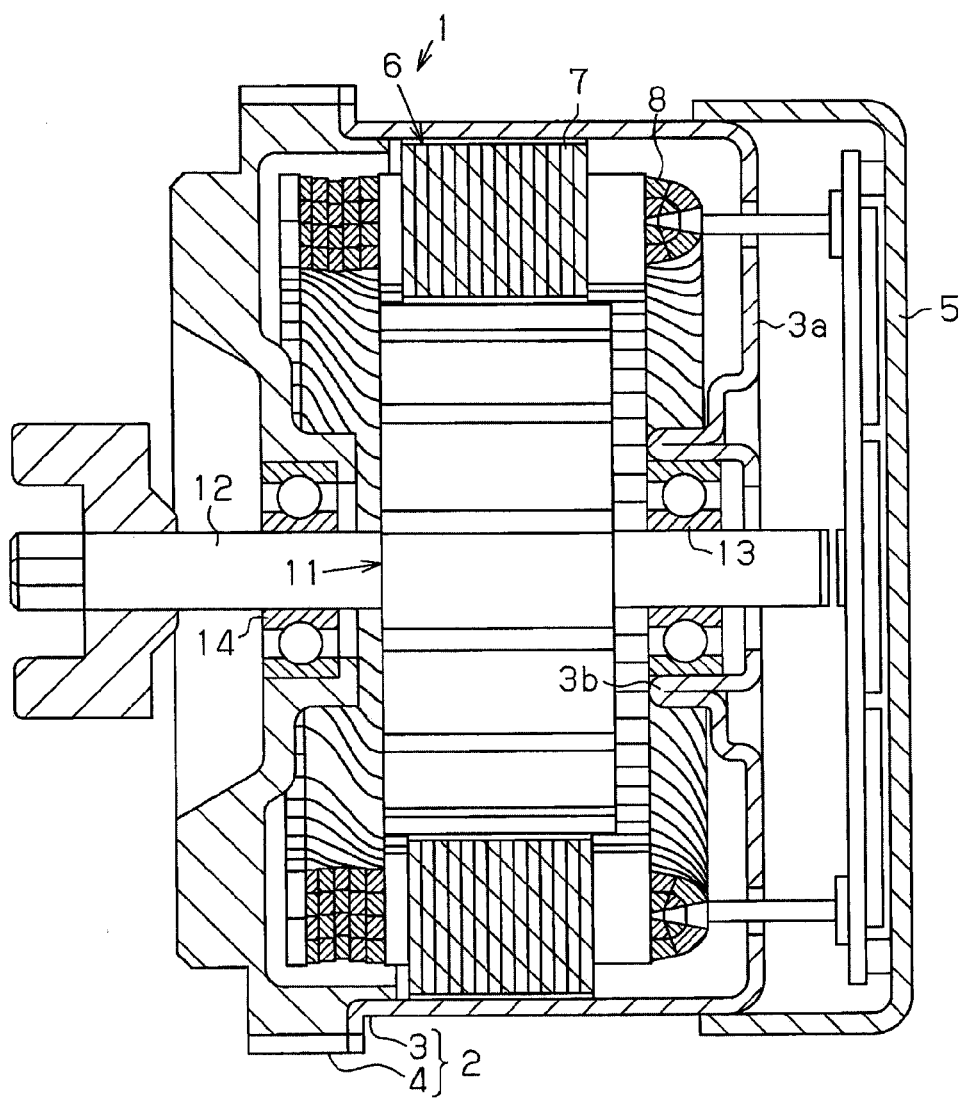
FIG. 20 is a cross-sectional view of a motor according to a sixth embodiment of the present invention.

As shown in FIG. 20, a motor case 2 of a motor 1 includes a cylindrical metal housing 3 having a closed end on the rear side (right side in FIG. 20) an opening one the front side (left side in FIG. 20), and a plastic end plate 4, which closes the opening of the housing 3. A box 5, in which a power supply circuit such as a circuit substrate is accommodated, is mounted on the rear end of the housing 3. A stator 6 is fixed to an inner peripheral surface of the housing 3. The stator 6 includes an annular armature core 7 (stator core) including a plurality of teeth extending radially inward and a segment conductor coil 8 (SC coil), which is wound around each of the teeth of the armature core 7.

A rotor 11 includes a rotary shaft 12 and is located radially inside of the stator 6. The rotary shaft 12 is made of non-magnetic metal and is rotationally supported by a bearing 13 accommodated in a bearing accommodating portion 3b formed in a central portion of a bottom 3a of the housing 3 and by a bearing 14 supported by the end plate 4. The bearing accommodating portion 3b is formed into a recessed shape, which opens in the housing 3.

Figure 21A:
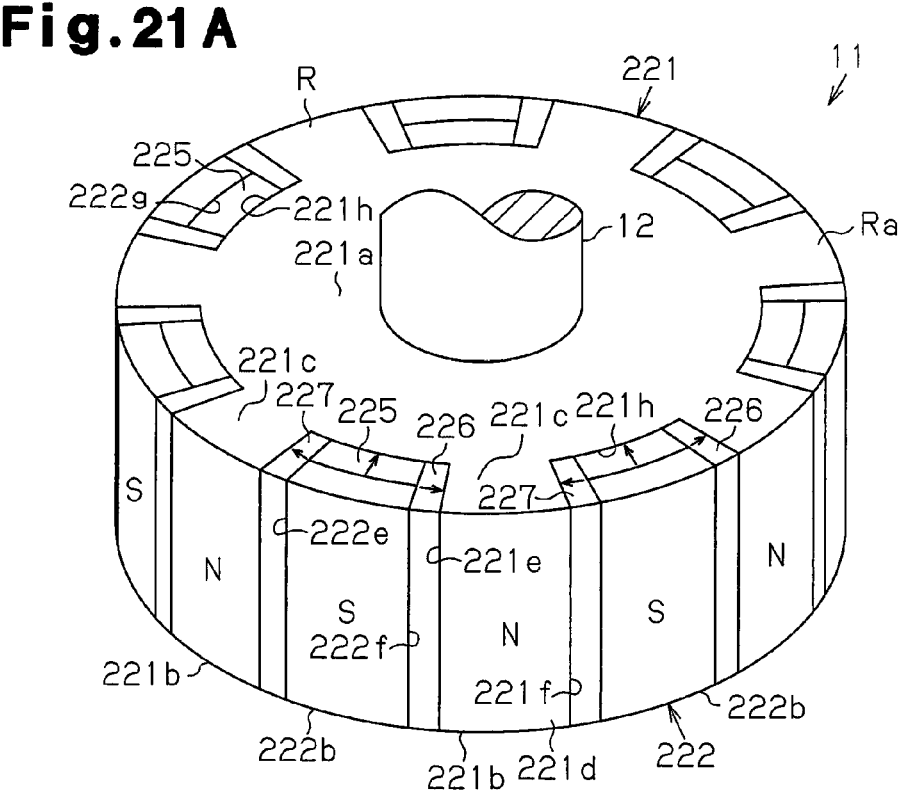
FIG. 21A is a perspective view of a rotor shown in FIG. 20 as viewed from a first core member.
Figure 21B:
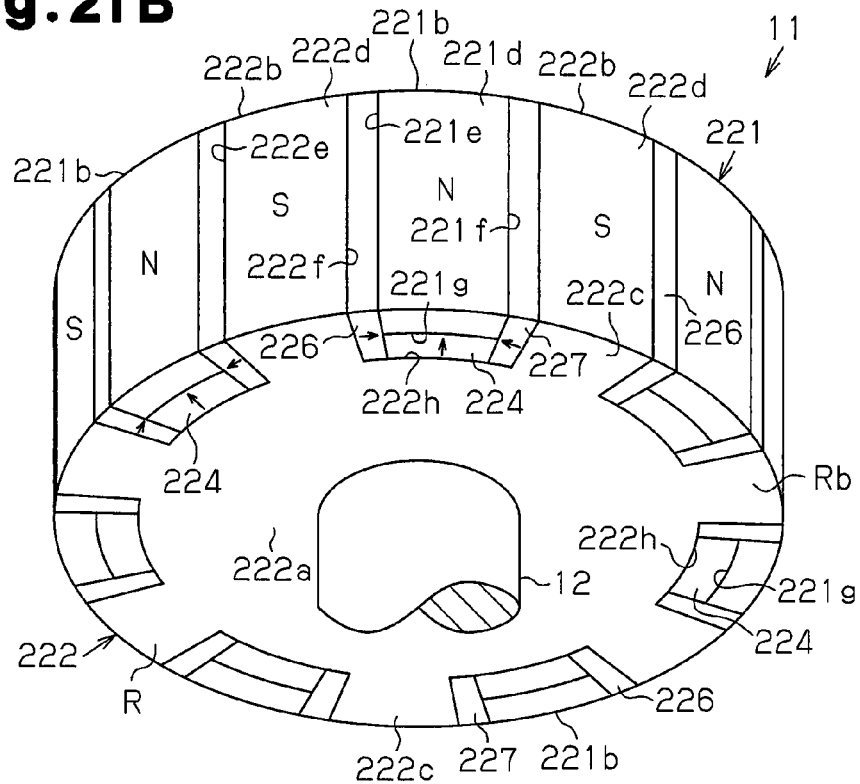
FIG. 21B is a perspective view of the rotor shown in FIG. 20 as viewed from a second core member.
Figure 22:
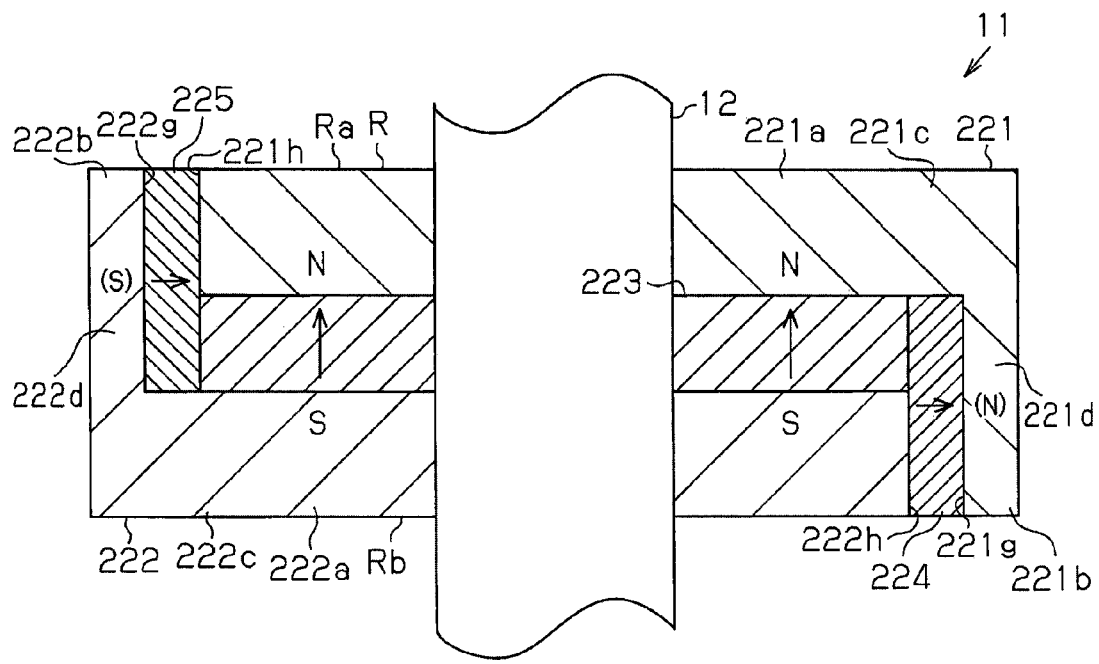
FIG. 22 is a cross-sectional view of the rotor shown in FIG. 20.

As shown in FIGS. 21A, 21B and 22, the rotor 11 includes a first rotor core 221, a second rotor core 222, an annular magnet 223 (see FIG. 22) as a field magnet, first and second back surface auxiliary magnets 224 and 225 and first and second interpole magnets 226 and 227. The magnets 223, 224, 225, 226 and 227 are permanent magnets, and arrows in FIGS. 21A, 21B and 22 show magnetizing directions (from south poles toward north poles) of the magnets 223, 224, 225, 226 and 227.

As shown in FIG. 21A, seven claw poles 221b are formed on an outer periphery of a core base 221a of this embodiment at equal intervals from one another. A claw pole 221b is formed into a rectangular shape as viewed in the radial direction. The claw pole 221b includes a projection 221c extending from the core base 221a radially outward and a claw portion 221d extending from the projection 221c in the axial direction. A pair of circumferential end surfaces 221e and 221f of the claw pole 221b are flat surfaces extending in the radial direction. A cross section of the projection 221c in a direction intersecting with the axial direction at right angles has an arcuate shape. A cross section of the projection 221c in the circumferential direction is rectangular in shape. The claw portion 221d extends from a radially outer end of the projection 221c in the axial direction. The circumferential width of the claw portion 221d is constant. The circumferential width (circumferential angle) of each of the claw poles 221b, i.e., the circumferential width (circumferential angle) between the pair of circumferential end surfaces 221e and 221f is smaller than the circumferential angle of the gap between a circumferentially adjacent pair of the claw poles 221b.

As shown in FIG. 21B, the second rotor core 222 has the same shape as that of the first rotor core 221. Seven claw poles 222b are formed on an outer periphery of a core base 222a at equal intervals from one another. A cross section of a projection 222c of the claw pole 222b in a direction intersecting with the axial direction at right angles has an arcuate shape. A claw portion 222d extends from a radially outer end of the projection 222c in the axial direction. The second rotor core 222 is assembled with the first rotor core 221 such that each claw portion 222d is located between a corresponding pair of claw portions 221d, and such that an annular magnet 223 (see FIG. 22) is located (sandwiched) between the core base 221a and the core base 222a in the axial direction.

As shown in FIG. 22, the outer diameter of the annular magnet 223 is equal to those of the core bases 221a and 222a. The annular magnet 223 is magnetized in the axial direction such that the claw pole 221b functions as a first magnetic pole, e.g., a north pole, and the claw pole 222b functions as a second magnetic pole, e.g., a south pole. That is, the rotor 11 of this embodiment is a rotor of Lundell type structure including the annular magnet 223. As the annular magnet 223, it is possible to use a neodymium magnet for example. An axial thickness of the annular magnet 223 is smaller than the axial thicknesses of the core bases 221a and 222a.

A first back surface auxiliary magnet 224 is located between the back surface 221g (radially inner surface) of each of the claw poles 221b and the outer peripheral surface 222h of the core base 222a. A cross section of the first back surface auxiliary magnet 224 in a direction intersecting with the axial direction at right angles has an arcuate shape. The first back surface auxiliary magnet 224 is magnetized in the radial direction such that a portion of the claw pole 221b close to the back surface 221g functions as a north pole, which is the same as that of the claw pole 221b, and a portion of the core base 222a close to the outer peripheral surface 222h functions as a south pole, which is the same as that of the core base 222a.

Similarly, a second back surface auxiliary magnet 225 is located between the back surface 222g (radially inner surface) of each of the claw poles 222b and an outer peripheral surface 221h of the core base 221a. As the first and second back surface auxiliary magnets 224 and 225, it is possible to use a ferrite magnet. A cross section of the second back surface auxiliary magnet 225 in a direction intersecting with the axial direction at right angles has an arcuate shape. The second back surface auxiliary magnet 225 is magnetized in the radial direction such that a portion of the claw pole 222b close to the back surface 222g functions as a south pole, and a portion of the core base 221a close to the outer peripheral surface 221h functions as a north pole.

The first and second back surface auxiliary magnets 224 and 225 are arranged to be superposed on each other in the axial direction at an axial position of the rotor 11 where the annular magnet 223 is located. In other words, the axial lengths of the first and second back surface auxiliary magnets 224 and 225 are set such that the first and second back surface auxiliary magnets 224 and 225 reach an axial position where the annular magnet 223 is located from the axial outer end surface (first and second end surfaces Ra and Rb) of the rotor 11. That is, the first back surface auxiliary magnet 224 extends from the axial outer end surface of the core base 222a to the axially inner end surface of the core base 221a, and the second back surface auxiliary magnet 225 extends from an axial outer end surface of the core base 221a to an axially inner end surface of the core base 222a.

As shown in FIGS. 21A and 22B, the first and second interpole magnets 226 and 227 are located between the claw pole 221b and the claw pole 222b in the circumferential direction. More specifically, the first interpole magnet 226 is fitted and fixed between a flat surface formed by the circumferential end surface 221e of the claw pole 221b and the first circumferential end surface of the first back surface auxiliary magnet 224 and a flat surface formed by the circumferential end surface 222f of the claw pole 222b and the first circumferential end surface of the second back surface auxiliary magnet 225.

The second interpole magnet 227 has the same shape as that of the first interpole magnet 226 and is fitted and fixed between a flat surface formed by the circumferential end surface 221f of the claw pole 221b and the second circumferential end surface of the first back surface auxiliary magnet 224 and a flat surface formed by the circumferential end surface 222e of the claw pole 222b and the second circumferential end surface of the second back surface auxiliary magnet 225. The first and second interpole magnets 226 and 227 are magnetized in the circumferential direction such that the same polarities of the first and second interpole magnets 226 and 227 and the same polarities of the claw poles 221b and 222b face each other, i.e., such that a portion thereof close to the claw pole 221b functions as a north pole, and a portion thereof close to the claw pole 222b functions as a south pole.

Figure 23:
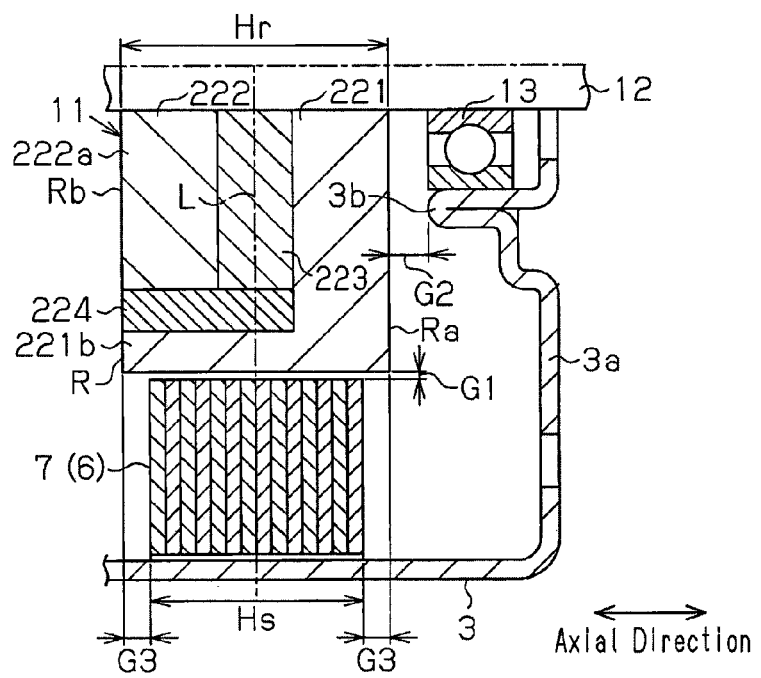
FIG. 23 is an explanatory schematic diagram showing sizes of the rotor, an armature core and a bottom of a housing shown in FIG. 20.

The size configuration in the motor 1 of the present embodiment will be described with reference to FIG. 23.

The axial length Hr of the rotor 11 is greater than the axial length Hs of the armature core 7. The axial length Hr of the rotor 11 is the axial length from an axial end surface of the core base 221a that is opposite from the annular magnet 223, i.e., from an axial outer end surface of the core base 221a to an axial end surface of the core base 222a that is opposite from the annular magnet 223, i.e., to an axial outer end surface of the core base 222a. Since the axial length Hr of the rotor 11 is set greater than the axial length Hs of the armature core 7, the axial thicknesses of the first and second rotor cores 221 and 222 (mainly core bases 221a and 222a) can be made thick. In this embodiment, the axial center line of the rotor 11 matches with the axial center line of the armature core 7 (shown as center line L in FIG. 23). That is, the axial width of the rotor 11 is greater than the axial width of the armature core 7 toward both sides in the axial direction by the same sizes (overlap width G3). The overlap width G3 is the axial projecting amount of axial ends of the rotor 11 projecting from the armature core 7. In this embodiment, the overlap width G3 is equal to a half of the difference between the axial length Hr of the rotor 11 and the axial length Hs of the armature core 7.

In the rotor 11, an axial distal end of the claw pole 221b extends to an axial outer end surface of the core base 222a in the axial direction, and an axial distal end of the claw pole 222b extends to an axial outer end surface of the core base 221a in the axial direction. That is, the axial lengths of the claw poles 221b and 222b, i.e., the axial lengths of outer peripheral surfaces of the claw poles 221b and 222b, which are parallel to an inner peripheral surface of the armature core 7, are equal to the axial length Hr of the rotor 11. The first and second back surface auxiliary magnets 224 and 225 located inside of the claw poles 221b and 222b extend to positions where the axially outer ends thereof match with distal ends of the claw poles 221b and 222b in the axial direction. That is, the axial outer end surface of the first back surface auxiliary magnet 224 is flush with the second end surface Rb of the rotor 11, and an axial outer end surface of the second back surface auxiliary magnet 225 is flush with the first end surface Ra of the rotor 11. Since the first and second back surface auxiliary magnets 224 and 225 extend to the axial end surface of the rotor 11 (axial outer end surfaces of core bases 221a and 222a) in a state where the first and second back surface auxiliary magnets 224 and 225 do not protrude axially outward from the claw poles 221b and 222b in this manner, it is possible to sufficiently ensure the axial lengths of the back surface auxiliary magnets 224 and 225. It is also possible to thicken the annular magnet 223 in the axial direction. Accordingly, it is possible to increase the power of the motor.

Next, operation of the motor 1 will be described.

Like the first embodiment, in the motor 1, when drive current is supplied to a segment conductor (SC) coil 8 through a power supply circuit in a box 5, a magnetic field for rotating the rotor 11 is generated in a stator 6, and the rotor 11 is rotated.

In the rotor 11 of the present embodiment, since the axial length Hr of the rotor 11 is greater than the axial length Hs of the armature core 7, the axial thicknesses of the first and second rotor cores 221 and 222 (mainly core bases 221a and 222a) can be increased. If the axial thicknesses of the first and second rotor cores 221 and 222 are increased, a margin is produced in a magnetic path, and it is possible to suppress the generation of magnetic saturation. As a result, it is possible to increase the power of the motor 1 without increasing the axial length of the annular magnet 223.

The first and second back surface auxiliary magnets 224 and 225 extend to the axial end surface of the rotor 11 (axial outer end surfaces of core bases 221a and 222a) in a state where the back surface auxiliary magnets 224 and 225 do not protrude axially outward from the claw poles 221b and 222b. Hence, it is possible to sufficiently ensure the axial lengths of the back surface auxiliary magnets 224 and 225. As a result, it is possible to further increase the power of the motor 1.

The rotor 11 of the present embodiment is not of a type in which a permanent magnet is located on a rotor core outer peripheral surface, but is of the Lundell type having the annular magnet 223 located in the rotor 11. In the case of the rotor in which the permanent magnet is located on the rotor core outer peripheral surface, if the axial length of the permanent magnet is made greater than the axial length of the armature core 7, the permanent magnet protrudes from the stator core in the axial direction. In such a case, there is fear that magnetic flux of the permanent magnet cannot be utilized effectively. In the case of the Lundell type rotor 11 as in this embodiment, a portion to which the armature core 7 is opposed is not a magnet but a core, i.e., the claw poles 221*b* and 222*b*. Hence, even if the axial length Hr of the rotor 11 is made greater than the axial length Hs of the armature core 7, magnetic flux is less prone to be forcibly discharged into air from portions of the claw poles 221*b* and 222*b* protruding from the armature core 7 in the axial direction. As a result, effective magnetic flux that contributes to a motor torque is less prone to be reduced. Therefore, by making the axial length Hr of the rotor 11 in the Lundell type rotor 11 greater than the axial length Hs of the armature core 7, it is possible to more effectively enhance the motor output. In the sixth embodiment, the rotor core is magnetic flux controlling section.

Next, influence exerted on the motor output by a radial gap width G1 between the rotor 11 and the armature core 7 (the radial distance between outer peripheral surface of rotor 11 and inner peripheral surface of armature core 7) and by an axial gap width G2 between the rotor 11 and the housing 3 will be described. The gap width G2 is an axial distance between the axial outer end surface of the core base 221*a* and a bottom 3*a* of the housing 3. In this embodiment, the distance of the bottom 3*a* of the housing 3 between the bearing accommodating portion 3*b*, which is closest to the rotor 11, and the axial outer end surface of the core base 221*a* is the gap width G2.

Figure 24:
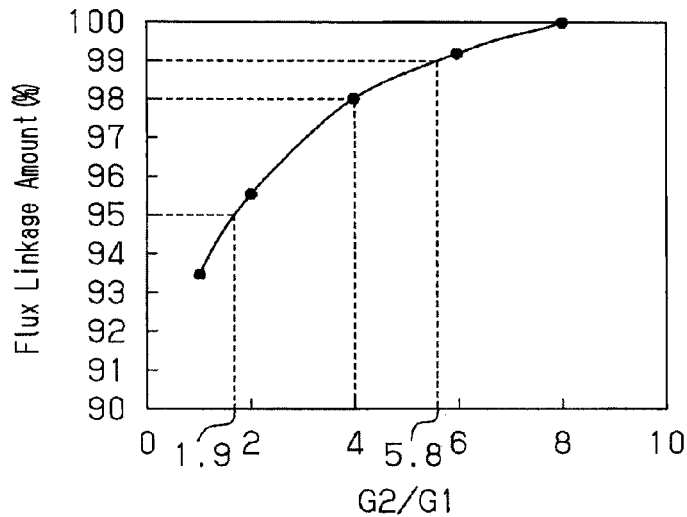
FIG. 24 is a graph showing a relationship between a flux linkage amount and a ratio G2/G1 of a gap width G2 between a rotor core and a housing and a radial gap width G1 between the rotor core and an armature core.

Since the housing 3 is made of metal, when the gap width G2 is small, there is fear that leakage magnetic flux is generated from the axial outer end surface of the core base 221*a* under the influence of the housing 3. FIG. 24 shows a relationship between a flux linkage amount (effective magnetic flux amount that contributes to motor torque) and the ratio G2/G1 of the gap width G2 and the gap width G1. In FIG. 24, a flux linkage amount when the gap width G2 is made sufficiently large with respect to the gap width G1, i.e., when the G2/G1 is 8 is defined as a reference, i.e., 100%. As shown in FIG. 24, as the G2/G1 decreases from eight, the flux linkage amount is reduced. More specifically, when the G2/G1 is about 5.8, the flux linkage amount becomes 99%, when the G2/G1 is about 4.0, the flux linkage amount becomes 98%, and when the G2/G1 is about 1.9, the flux linkage amount becomes 95%.

According to the sixth embodiment, the following advantages can be obtained.

(1) The rotor 11 includes the first and second rotor cores 221 and 222, which respectively include the claw poles 221*b* and 222*b*, and the annular magnet 223 located between the first and second rotor cores 221 and 222 in the axial direction. The annular magnet 223 is magnetized in the axial direction. According to this, the claw pole 221*b* functions as the first magnetic pole and the claw pole 22*b* functions as the second magnetic pole. The axial length Hr of the rotor 11 is greater than the axial length Hs of the armature core 7 of the stator 6. According to this configuration, the axial thicknesses of the first and second rotor cores 221 and 222 can be increased. If the axial thicknesses of the first and second rotor cores 221 and 222 are increased, a margin is produced in a magnetic path, and it is possible to suppress the generation of magnetic saturation. As a result, it is possible to increase the power of the motor 1.

(2) The first and second back surface auxiliary magnets 224 and 225 are respectively located between the back surfaces 221*g* and 222*g* of the claw poles 221*b* and 222*b* and the outer peripheral surfaces 222*h* and 221*h* of the core bases 222*a* and 221*a*. The claw pole 221*b* extends to the end surface of the core base 222*a* opposite from the annular magnet 223 in the axial direction, i.e., to the axial outer end surface of the core base 222*a*, and the claw pole 222*b* extends to the end surface of the core base 221*a* opposite from the annular magnet 223 in the axial direction, i.e., to the axial outer end surface of the core base 221*a*. According to this configuration, the first and second back surface auxiliary magnets 224 and 225 can extend to the axial end surface of the rotor 11 (axial outer end surfaces of core bases 221*a* and 222*a*) in a state where the back surface auxiliary magnets 224 and 225 do not protrude from the claw poles 221*b* and 222*b* in the axial direction. Hence, it is possible to sufficiently ensure the axial lengths of the first and second back surface auxiliary magnets 224 and 225. As a result, it is possible to further increase the power of the motor 1.

(Seventh Embodiment)

A seventh embodiment according to the present invention will be described below with reference to the drawings.

Figure 27:
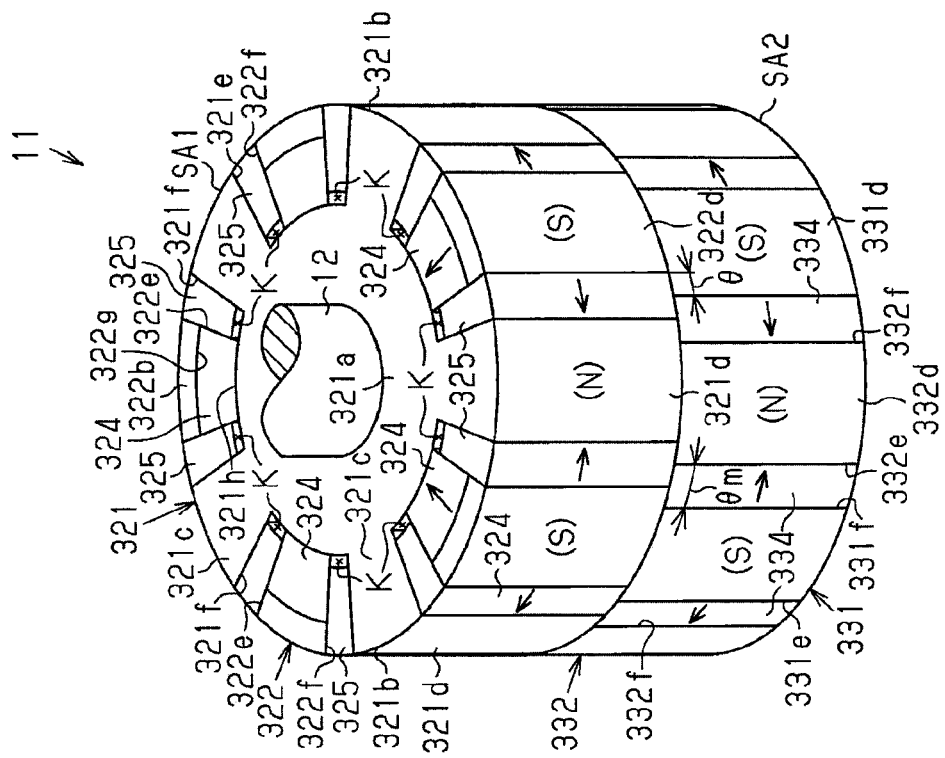
FIG. 27 is a perspective view of a rotor shown in FIG. 26.
Figure 26:
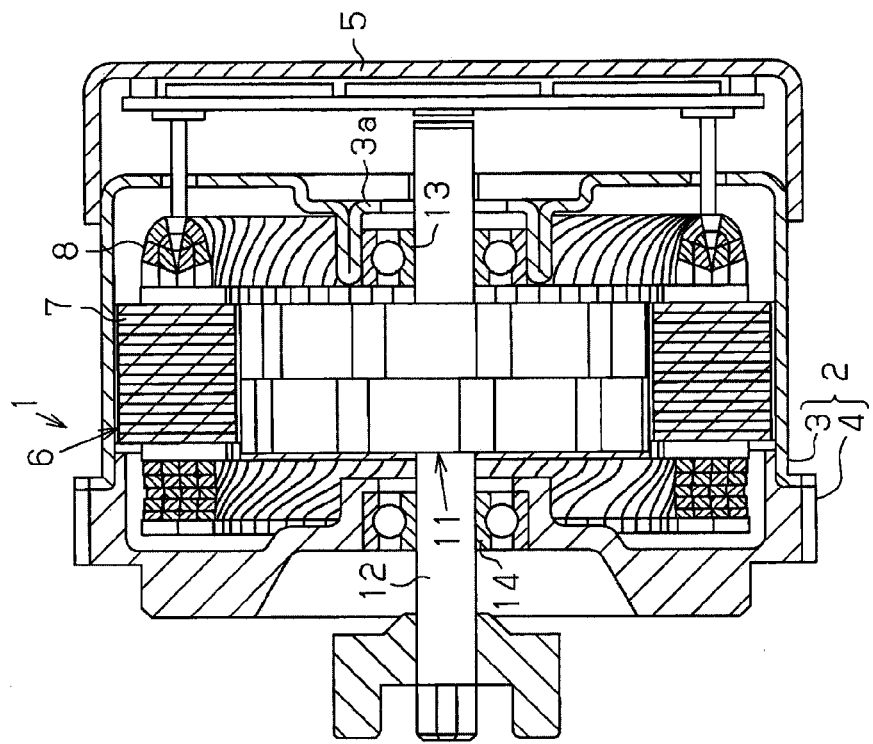
FIG. 26 is a cross-sectional view of a motor according to a seventh embodiment of the present invention.
Figure 28:
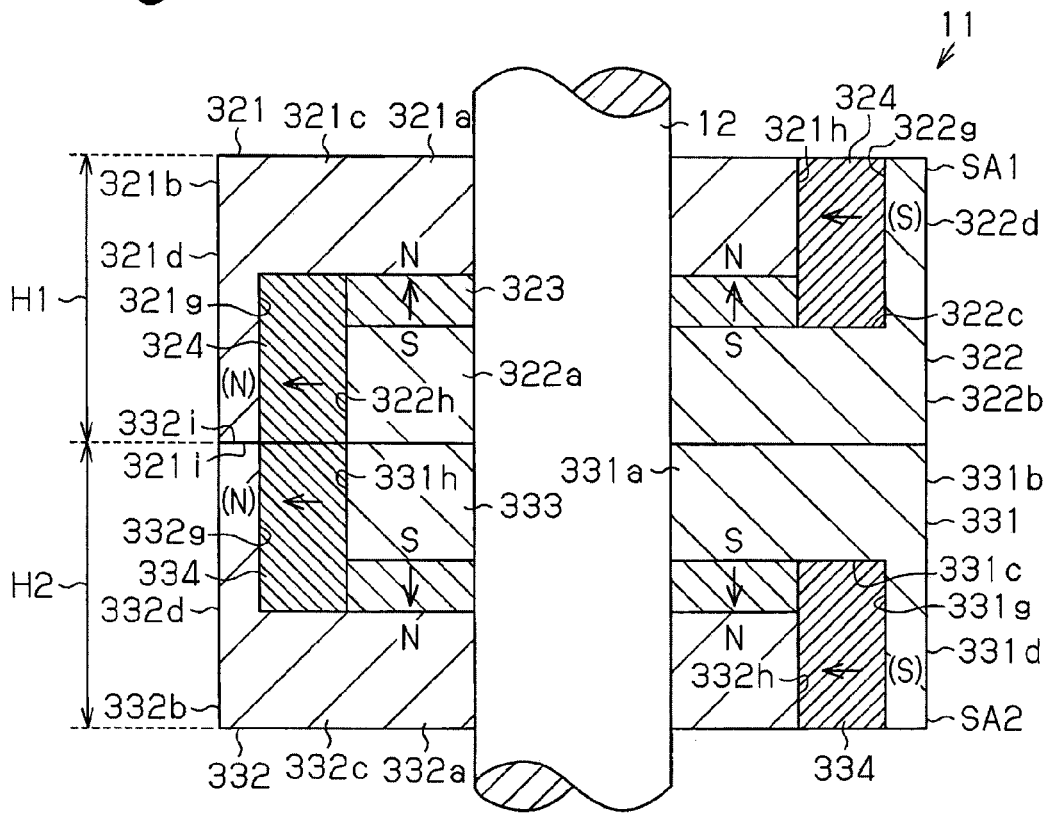
FIG. 28 is a cross-sectional view of the rotor shown in FIG. 26.

A rotor 11 of a motor 1 shown in FIG. 26 includes first and second assemblies SA1 and SA2 as shown in FIGS. 27 and 28.

As shown in FIGS. 27 and 28, the first assembly SA1 includes a pair of first and second rotor cores 321 and 322, an annular magnet 323 as a field magnet, a back surface auxiliary magnet 324, and an interpole magnet 325. Arrows in FIGS. 27 and 28 show magnetizing directions (from south poles toward north poles) of the magnets 323, 324 and 325.

As shown in FIG. 26, five claw poles 321*b* are formed on an outer periphery of a core base 321*a* at equal intervals from one another. Each of the claw poles 321*b* includes a projection 321*c* projecting from the core base 321*a* radially outward and a claw portion 321*d* extending from the projection 321*c* in the axial direction.

A pair of circumferential end surfaces 321*e* and 321*f* of the claw pole 321*b* are flat surfaces extending in the radial direction, i.e., flat surfaces that are not inclined with respect to the radial direction as viewed in the axial direction. A cross section of the projection 321*c* in a direction intersecting with the axial direction at right angles has an arcuate shape. The claw portion 321*d* extends in the axial direction from a radially outer end of the projection 321*c*. The circumferential width of the claw portion 321*d* is constant. The circumferential angle of each of the claw poles 321*b*, i.e., the angle between the pair of circumferential end surfaces 321*e* and 321*f* is smaller than the circumferential angle of the gap between a circumferentially adjacent pair of the claw poles 321*b*.

As shown in FIGS. 27 and 28, projections 322*c* of five claw poles 322*b* are formed on an outer periphery of a core base 322*a* at equal intervals from one another. A cross section of the projection 322*c* in a direction intersecting with the axial direction at right angles has an arcuate shape. A claw portion 322*d* extends from a radially outer end of the projection 322*c* in the axial direction.

A pair of circumferential end surfaces 322*e* and 322*f* of the claw pole 322*b* are flat surfaces extending in the radial direction. A cross section of the claw pole 322*b* (projection 322*c*) in a direction intersecting with the axial direction at right angles has an arcuate shape. The circumferential angle of each of the claw poles 322*b*, i.e., the angle between the pair of circumferential end surfaces 322*e* and 322*f* is smaller than the angle of the gap between a circumferentially adjacent pair of the claw poles 322*b*.

A second rotor core 322 is assembled with the first rotor core 321 such that each claw portion 322*d* is located between a corresponding pair of claw portions 321*d*, and such that the annular magnet 323 (see FIG. 28) is located (sandwiched) between the core base 321*a* and the core base 322*a* in the axial direction. At this time, since the circumferential end surface 321*e* of the claw pole 321*b* and the circumferential end surface 322*f* of the claw pole 322*b* become parallel to each other in the axial direction, the gap between the end surfaces 321*e* and 322*f* forms substantially a straight line in the axial direction. Since the circumferential end surface 321*f* of the claw pole 321*b* and the circumferential end surface 322*e* of the claw pole 322*b* become parallel to each other in the axial direction, the gap between the end surfaces 321*f* and 322*e* forms a substantially straight line in the axial direction.

The outer diameter of the annular magnet 323 is equal to the outer diameters of the core bases 321*a* and 322*a*. The annular magnet 323 is magnetized in the axial direction such that the claw pole 321*b* functions as a first magnetic pole, e.g., a north pole, and the claw pole 322*b* functions as a second magnetic pole, e.g., a south pole.

The back surface auxiliary magnet 324 is located between a back surface 321*g* (radially inner surface) of each of the claw poles 321*b* and the outer peripheral surface 322*h* of the core base 322*a*. Similarly, the back surface auxiliary magnet 324 is located between the back surface 322*g* (radially inner surface) of each of the claw poles 322*b* and the outer peripheral surface 321*h* of the core base 321*a*. A cross section of each of the back surface auxiliary magnets 324 in a direction intersecting with the axial direction at right angles has an arcuate shape. The back surface auxiliary magnet 324 is magnetized such that a portion thereof close to the back surface 321*g* and a portion close to the outer peripheral surface 321*h* become north poles. The back surface auxiliary magnet 324 is magnetized such that a portion thereof close to the outer peripheral surface 322*h* and a portion thereof close to the back surface 322*g* become south poles that are the same as that of the core base 322*a*.

The back surface auxiliary magnets 324 are arranged to be superposed on each other in the axial direction at an axial position of the rotor 11 where the annular magnet 323 is located. In other words, the axial length of each of the back surface auxiliary magnets 324 is set such that the back surface auxiliary magnet 324 reaches an axial position where the annular magnet 323 is located from the axial surfaces (pair of axial outer end surfaces) of the rotor 11.

As shown in FIG. 27, the interpole magnet 325 is located between the claw pole 321*b* and the claw pole 322*b* in the circumferential direction. More specifically, the interpole magnet 325 is located between the circumferential end surface 321*e* of the claw pole 321*b* and the circumferential end surface 322*f* of the claw pole 322*b*. The second interpole magnet 325 is located between the circumferential end surface 321*f* of the claw pole 321*b* and the circumferential end surface 322*e* of the claw pole 322*b*. Each of the interpole magnets 325 is magnetized in the circumferential direction such that the same polarity of the interpole magnet 325 and the same polarities of the claw poles 321*b* and 322*b* face each other, i.e., such that a portion of the interpole magnet 325 close to the claw pole 321*b* functions as a north pole and a portion thereof close to the claw pole 322*b* functions as a south pole. A gap K for preventing leakage magnetic flux is provided in a portion of each of the interpole magnets 325 close to the rotary shaft 12 (radially inner side of the rotor 11).

The second assembly SA2 has substantially the same shape as that of the first assembly SA1, and includes a pair of third and fourth rotor cores 331 and 332, an annular magnet 333 as a field magnet, a back surface auxiliary magnet 334 and an interpole magnet 335. Arrows in FIGS. 27 and 28 show magnetizing directions (from south poles toward north poles) of the magnets 333, 334 and 335.

As shown in FIGS. 27 and 28, the third rotor core 331 is obtained by reversing the second rotor core 322 in a direction intersecting with the axial direction at right angles. Five claw poles 331*b* are formed on an outer periphery of a core base 331*a* at equal intervals. The claw pole 331*b* includes a projection 331*c* extending from the core base 331*a* radially outward and a claw portion 331*d* extending from the projection 331*c* in the axial direction.

As shown in FIG. 28, the rotor core 331 is assembled with the rotary shaft 12 such that an axial first end surface thereof abuts against an axial second end surface of the second rotor core 322. Hence, the claw portion 331*d* extends in a direction opposite from the claw portion 322*d* of the second rotor core 322 in the axial direction.

A pair of circumferential end surfaces 331*e* and 331*f* of the claw pole 331*b* are flat surfaces extending in the radial direction, i.e., flat surfaces that are not inclined with respect to the radial direction as viewed in the axial direction. A cross section of the projection 331*c* in a direction intersecting with the axial direction at right angles has an arcuate shape. The claw portion 331*d* extends in the axial direction from a radially outer end of the projection 331*c*. The circumferential width of the claw portion 331*d* is constant. The circumferential angle of each of the claw poles 331*b*, i.e., the angle between the pair of circumferential end surfaces 331*e* and 331*f* is smaller than the circumferential angle of the gap between a circumferentially adjacent pair of the claw poles 331*b*.

The fourth rotor core 332 is obtained by reversing the first rotor core 321 in a direction intersecting with the axial direction at right angles, and has substantially the same shape as that of the third rotor core 331. Projections 332*c* of five claw poles 332*b* are formed on an outer periphery of a core base 332*a* at equal intervals from one another. A cross section of the projection 332*c* in a direction intersecting with the axial direction at right angles has an arcuate shape. The claw portion 332*d* extends in the axial direction from a radially outer end of the projection 332*c*.

A pair of circumferential end surfaces 332*e* and 332*f* of the claw pole 332*b* are flat surfaces extending in the radial direction. A cross section of the claw pole 332*b* (projection 332*c*) in a direction intersecting with the axial direction at right angles has an arcuate shape. The circumferential angle of each of the claw poles 332*b*, i.e., the angle between the pair of circumferential end surfaces 332*e* and 332*f* is smaller than the angle of the gap between a circumferentially adjacent pair of the claw poles 332*b*.

The fourth rotor core 332 is assembled with the third rotor core 331 such that each claw portion 332*d* is located between a corresponding pair of claw portions 331*d*, and such that the annular magnet 333 (see FIG. 28) is located (sandwiched) between the core base 331*a* and the core base 332*a* in the axial direction. At this time, since the circumferential end surface 331*e* of the claw pole 331*b* and the circumferential end surface 332*f* of the claw pole 332*b* become parallel to each other in the axial direction, the gap between the end surfaces 331*e* and 332*f* forms substantially a straight line in the axial direction. Since the circumferential end surface 331*f* of the claw pole 331*b* and the circumferential end surface 332*e* of the claw pole 332*b* become parallel to each other in the axial direction, the gap between the end surfaces 331*f* and 332*e* forms a substantially straight line in the axial direction. The claw pole 332*b* (fourth rotor core 332) is assembled with the third rotor core 331 and the rotary shaft 12 such that an axial distal end surface 332*i* of the claw portion 332*d* abuts against an axial distal end surface 321*i* of the corresponding claw portion 321*d* of the claw pole 321*b* in the axial direction.

At this time, the pair of first and second rotor cores 321 and 322 configuring the first assembly SA1 and the pair of third and fourth rotor cores 331 and 332 configuring the second assembly SA2 are assembled with the rotary shaft 12 such that they are deviated from each other in the circumferential direction by a deviation angle θ, which is a predetermined angle. When the number of pole pairs is defined as P (five in this embodiment), the deviation angle θ is in a range of 0<θ≤10° (shown as X1 in FIG. 29) which is preferably in a range of 0<θ≤50°/P, and more preferably in a range of 0<θ≤7° (shown as X2 in FIG. 29) which is in a range of 0<θ≤335°/P. More preferably, the deviation angle θ is in a range of 0<θ≤4° (shown as X3 in FIG. 29), which is in a range of 0<θ≤20°/P.

The magnetizing direction of the annular magnet 333 is set opposite from that of the annular magnet 323. The outer diameter of the annular magnet 333 is equal to those of the core bases 331*a* and 332*a*. The annular magnet 333 is magnetized in the axial direction such that the claw pole 331*b* functions as a second magnetic pole, e.g., a south pole, and the claw pole 332*b* functions as a first magnetic pole, e.g., a north pole.

The back surface auxiliary magnet 334 is located between the back surface 331*g* (radially inner surface) of each of the claw poles 331*b* and the outer peripheral surface 332*h* of the core base 332*a*. Similarly, the back surface auxiliary magnet 334 is located between the back surface 332*g* (radially inner surface) of each of the claw poles 332*b* and the outer peripheral surface 331*h* of the core base 331*a*. A cross section of each of the back surface auxiliary magnets 334 in a direction intersecting with the axial direction at right angles has an arcuate shape. The back surface auxiliary magnet 334 is magnetized such that a portion thereof close to the back surface 331*g* and a portion thereof close to the outer peripheral surface 331*h* become south poles. The back surface auxiliary magnet 334 is magnetized such that a portion thereof close to the outer peripheral surface 332*h* and a portion thereof close to the back surface 332*g* become north poles, which are the same as that of the core base 332*a*.

The back surface auxiliary magnets 334 are arranged to be superposed on each other in the axial direction at an axial position of the rotor 11 where the annular magnet 333 is located. In other words, the axial length of each of the back surface auxiliary magnets 334 is set such that the back surface auxiliary magnet 334 reaches an axial position where the annular magnet 323 is located from the axial surfaces (pair of axial outer end surfaces) of the rotor 11.

The interpole magnet 335 is located between the claw pole 331*b* and the claw pole 332*b* in the circumferential direction. More specifically, the first interpole magnet 335 is located between the circumferential end surface 331*f* of the claw pole 331*b* and the circumferential end surface 332*e* of the claw pole 332*b*. The second interpole magnet 335 is located between the circumferential end surface 331*e* of the claw pole 331*b* and the circumferential end surface 332*f* of the claw pole 332*b*. Each of the interpole magnets 335 is magnetized in the circumferential direction such that the same polarity of the interpole magnet 335 and the same polarities of the claw poles 331*b* and 332*b* face each other, i.e., such that a portion of the interpole magnet 335 close to the claw pole 324*b* functions as a north pole, and a portion of the interpole magnet 335 close to the claw pole 323*b* functions as a south pole. A gap (not shown) for preventing leakage magnetic flux is provided in a portion of each of the interpole magnets 335 close to the rotary shaft 12 (radially inner side of the rotor 11).

The axial lengths H1 and H2 of the first assembly SA1 and the second assembly SA2 are the same as shown in FIG. 28.

Next, operation of the motor 1 configured as described above will be described.

Like the first embodiment, in the motor 1, when drive current is supplied to a segment conductor (SC) coil 8 through a power supply circuit in a box 5, a magnetic field for rotating the rotor 11 is generated in a stator 6, and the rotor 11 is rotated.

The rotor 11 of the motor 1 of the present embodiment is of a tandem structure in which the first assembly SA1, including the pair of first and second rotor cores 321 and 322, and the second assembly SA2, including the pair of third and fourth rotor cores 331 and 332, are laminated on each other. The pair of first and second rotor cores 321 and 322 and the pair of third and fourth rotor cores 331 and 332 are arranged to be deviated from each other in the circumferential direction. In the case of the rotor of the Lundell type structure of a permanent magnetic field system, a surface magnetic flux of the rotor is prone to include harmonic, and there is fear that a cogging torque is increased in the rotor by the harmonic. In this embodiment, phases of cogging torques generated in the pair of rotor cores 321 and 322 and the pair of rotor cores 331 and 332 are deviated from each other. Thus, the cogging torques of which the phases are deviated from each other cancel each other, so that synthetic cogging torque is reduced and generation of vibration is suppressed.

The deviation angle θ of the pair of rotor cores 321 and 322 and the pair of rotor cores 331 and 332 is set in the range of 0<θ≤50°/P (P=5) when the number of pole pairs is defined as P (five in this embodiment). According to this configuration, reduction of the flux linkage amount is suppressed to 10% or lower in the range of X1 in FIG. 29, and the cogging torque is reduced. When the deviation angle θ is set in the range of 0<θ≤335°/P, reduction of the flux linkage amount is suppressed to 5% or lower in the range of X2 in FIG. 29. Further, when the deviation angle θ is set in the range of 0<θ≤20°/P, reduction of the flux linkage amount is suppressed to 1% or lower in the range of X3 in FIG. 29.

According to the seventh embodiment, the following advantages can be obtained.

(1) The pairs of rotor cores, i.e., the first and second rotor cores 321 and 322 and the third and fourth rotor cores 331 and 332 are arranged such that the rotor cores 322 and 331 of the same magnetic poles are adjacent to each other. The pair of rotor cores 321 and 322 and the pair of rotor cores 331 and 332 are deviated from each other in the circumferential direction. Since phases of cogging torques generated in the pair of rotor cores 321 and 322 and the pair of rotor cores 331 and 332 are deviated from each other, the cogging torques of which the phases are deviated from each other cancel each other, so that the synthetic cogging torque is reduced, and generation of vibration can be suppressed.

Figure 29:
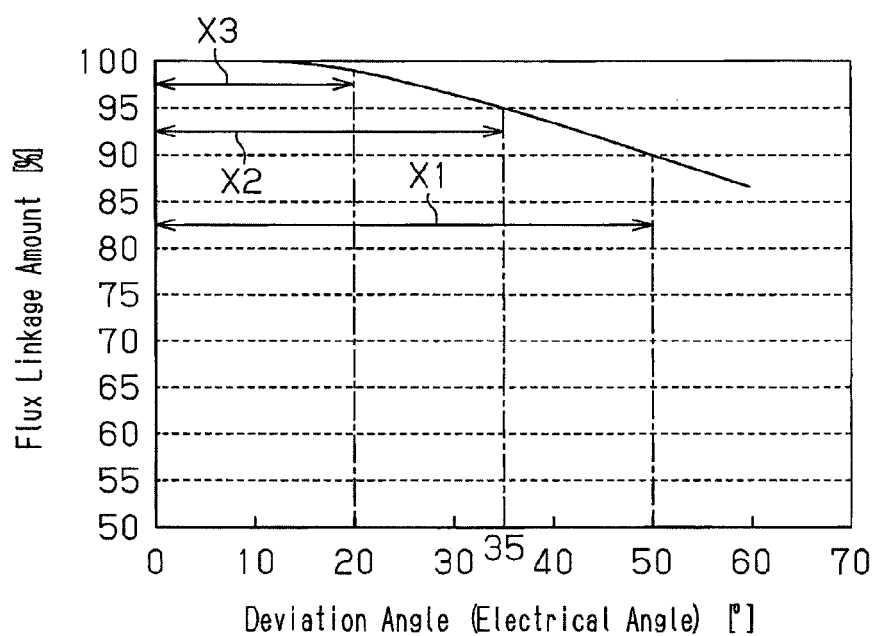
FIG. 29 is a graph showing a relationship between a flux linkage amount and a deviation angle θ between rotor cores shown in FIG. 26.

(2) The deviation angle θ in the circumferential direction is set in the range of 0<θ≤10°, which is in the range of 0<θ≤50°/P when the number of pole pairs is defined as P. Therefore, it is possible to suppress the reduction in the flux linkage amount, i.e., reduction in torque as shown in FIG. 29, and to reduce the cogging torque. If the deviation angle θ is set to 0<θ≤7°, which is in the range of 0<θ≤335°/P, it is possible to further suppress the reduction in the flux linkage amount, i.e., reduction in torque as shown in FIG. 29, and to reduce the cogging torque. Further, if the deviation angle θ is set to 0<θ≤4°, which is in the range of 0<θ≤20°/P, it is possible to further suppress the reduction in the flux linkage amount, i.e., reduction in torque as shown in FIG. 29, and to reduce the cogging torque.

(3) Since the axial lengths H1 and H2 of the first assembly SA1 and the second assembly SA2 are the same, magnetic circuits (paths) of the pair of rotor cores 321 and 322 and the pair of rotor cores 331 and 332 are completed and the magnetic circuits are balanced. Hence, a short circuit magnetic flux between the magnetic poles of the pair of rotor cores 321 and 322 and the pair of rotor cores 331 and 332 becomes small.

The embodiments of the present invention may be modified as follows.

Figure 5A:
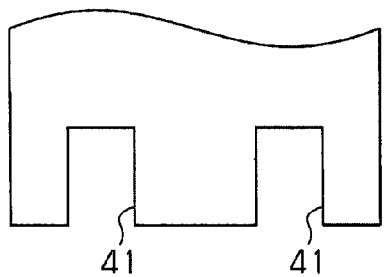
FIGS. 5A to 5F show modifications of a claw poles.
Figure 5B:
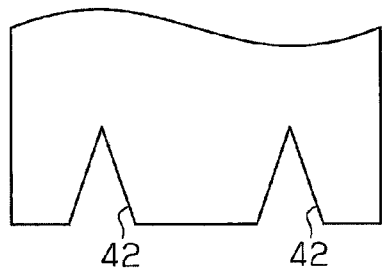
Figure 5C:
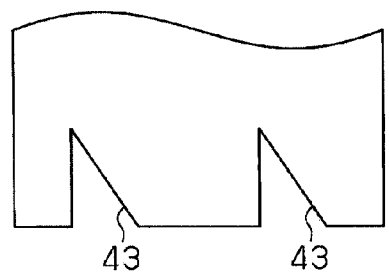
Figure 5D:
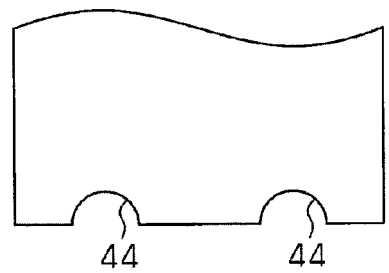
Figure 5E:
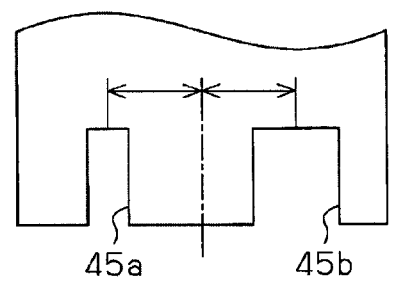
Figure 5F:
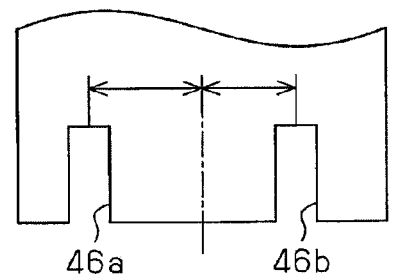

Although the rectangular auxiliary grooves 21c to 24c are formed in distal ends of the claw poles 21b to 24b in the first embodiment, the shapes and the like may appropriately be changed. For example, as shown in FIG. 5A, auxiliary grooves 41, each having a circumferential width greater than those of the auxiliary grooves 21c to 24c in the first embodiment, may be formed. As shown in FIG. 5B, isosceles triangle auxiliary grooves 42 may be formed. As shown in FIG. 5C, triangle auxiliary grooves 43 in which the one of apexes of each of the isosceles triangles is shifted in the circumferential direction may be formed. As shown in FIG. 5D, arcuate auxiliary grooves 44 or auxiliary grooves including arcs may be formed. As shown in FIG. 5E, auxiliary grooves 45a and 45b having different widths may be formed at positions separated by equal distances in the circumferential direction from a circumferential center of a claw pole. As shown in FIG. 5F, auxiliary grooves 46a and 46b may be formed at positions separated by different distances in the circumferential direction from a circumferential center of a claw pole.

In the first embodiment, to adjust the magnetic flux density distribution in the outer peripheral surface of each of the claw poles 21b to 24b, the auxiliary grooves 21c to 24c extending from the distal ends to the proximal ends thereof are formed. However, the shapes are not limited to the above-described shapes as long as the magnetic flux density distribution can be adjusted. For example, through holes that extend through the claw poles 21b to 24b in the radial direction and open in the outer peripheral surfaces and the inner peripheral surfaces of the claw poles 21b to 24b may be formed. Recesses may be formed in the outer peripheral surfaces of the claw poles 21b to 24b.

Although the shapes of the auxiliary grooves 21c to 24c formed in the claw poles 21b to 24b are the same in the first embodiment, the shapes may appropriately be changed in accordance with the position or the like of the rotor core. For example, the auxiliary grooves 41 shown in FIG. 5A may be formed in the first rotor core 21 and the fourth rotor core 24 on axial ends, and the auxiliary grooves 44 shown in FIG. 5D may be formed in the second rotor core 22 and the third rotor core 23.

Although two auxiliary grooves 21c to 24c are formed in the claw poles 21b to 24b in the first embodiment, one or three or more auxiliary grooves may be formed. The number of auxiliary grooves formed in the rotor cores 21 to 24 may be changed in accordance with the position or the like of the rotor core.

Although the interpole magnets 31 are symmetrically arranged with respect to the circumferential center line of the claw poles 21b to 24b in the first and fourth embodiments, the interpole magnets 31 may be arranged asymmetrically. That is, the claw poles 21b to 24b may be formed such that the intersection points O1 and O2 shown in FIGS. 3A and 3B are deviated from the straight line that passes through circumferential centers of radially outer sides of the claw poles 21b to 24b and through the axial center of the rotary shaft 12. For example, inclination of the interpole magnet 31 is changed in accordance with the rotation direction or the number of rotations of the rotor 11. Even if these configurations are employed, the same advantages as those of the first embodiment can be obtained.

Although each of the claw poles 21b to 24b is formed such that the circumferential center line of the interpole magnet 31 forms an angle with respect to the radial direction of the rotor 11 in the first embodiment, the claw poles 21b to 24b may be formed such that the circumferential center line of the interpole magnet 31 matches with the radial direction of the rotor 11.

The interpole magnets 31 and 131 may appropriately be omitted in the first, fourth and fifth embodiments.

The back surface auxiliary magnets 26, 27, 29 and 30 may appropriately be omitted in the first and fourth embodiments.

Although the annular magnets 25 and 28 are used as field magnets in the first and fourth embodiments, a plurality of flat plate-shaped permanent magnets may be arranged in the circumferential direction to generate magnetic fields in the claw poles 21b to 24b. One disk-shaped permanent magnet may be interposed between a pair of core bases in the axial direction to generate magnetic fields in the claw poles 21b to 24b.

Although the interpole magnet 31 is located between the claw poles 21b and 22b or between the claw poles 23b and 24b in the first and fourth embodiments, the shape of the interpole magnet may be changed in accordance with the position.

Although each of the interpole magnets 31 extends from the axial outer end surface of the first rotor core 21 to the axial outer end surface of the fourth rotor core 24 in the first, second and fourth embodiments, a plurality of interpole magnets may be arranged in the axial direction.

Figure 10A:
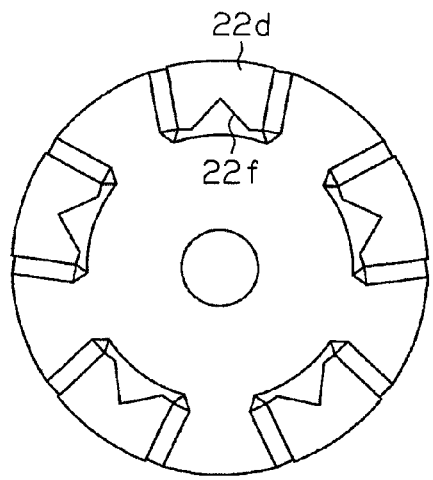
FIGS. 10A to 10D show modifications of claw poles.
Figure 10B:
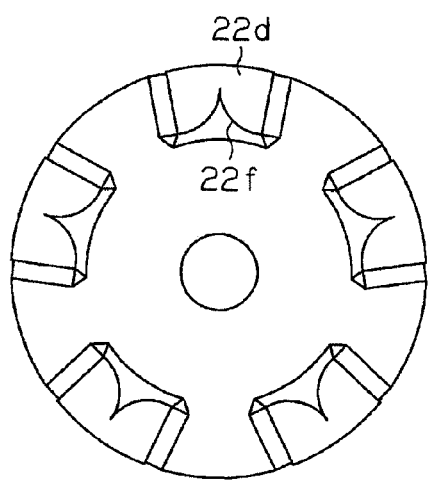
Figure 10C:
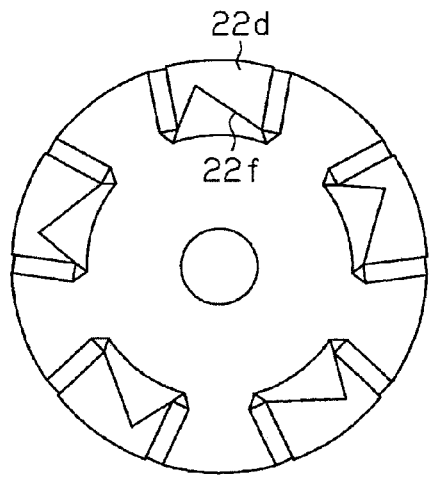
Figure 10D:
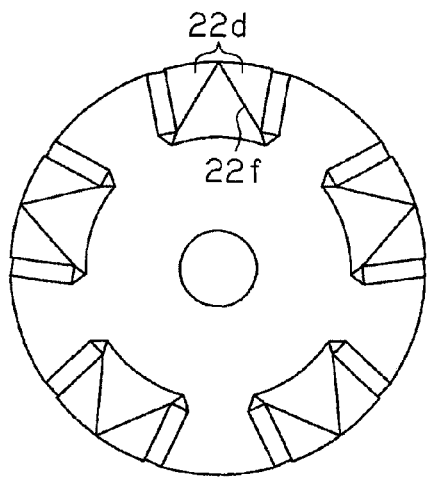

Although each of the radially inner end surfaces 21f and 22f of the claw poles 21b and 22b is formed by two flat surfaces in the second embodiment as shown in FIGS. 7A and 7B, the shape of the inner peripheral surface may appropriately be changed. For example, as shown in FIG. 10A, each of the radially inner end surfaces 22f may be formed into a shape including flat portions facing the core base. As shown in FIG. 10B, the radially inner end surface 22f may be formed by two curved arcuate surfaces as viewed in the axial direction. As shown in FIG. 10C, the circumferential lengths of two flat surfaces forming the radially inner end surface 22f may be different from each other in accordance with the rotation direction of the rotor 11, for example. As shown in FIG. 10D, a central portion of the radially inner end surface 22f may reach the radially outer end surface 22e. Although FIGS. 10A to 10D show the claw pole 22b, the claw poles 21b, 23b and 24b can similarly be changed of course.

Figure 14A:
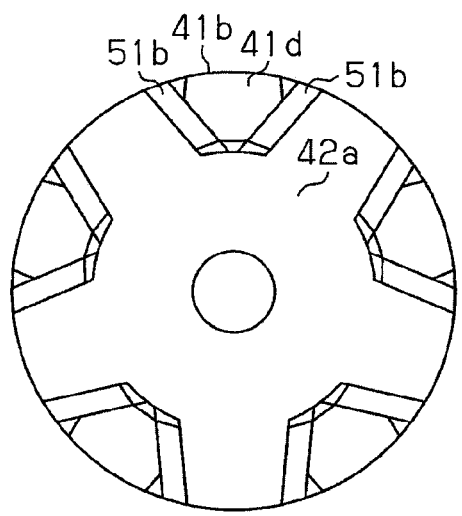
FIGS. 14A and 14B show modifications of a claw poles.
Figure 14B:
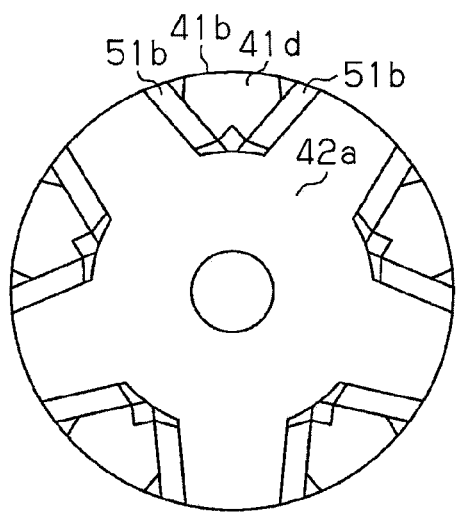

In the third embodiment, as shown in FIG. 12B for example, the circumferential center of the claw portion 41d projects radially inward, and the apex of the claw portion 41d comes into contact with the core base 42a. Alternatively, as shown in FIG. 14A for example, the claw portion 41d may be formed flatly so that a circumferential center thereof does not projects radially inward from the interpole magnet 51a, and the circumferential center of the claw portion 41d may be separated from the core base 42a. Further, a portion between the two interpole magnets 51a may be recessed radially outward as shown in FIG. 14B.

Although the interpole magnets 51a to 51d are symmetrically arranged with respect to the circumferential center line of the claw poles 41b to 44b in the third embodiment, the interpole magnets 51a to 51d may be arranged asymmetrically. Inclinations of the interpole magnets 51a to 51d are changed in accordance with the rotation direction or the number of rotations of the rotor 11. According to this configuration also, the same advantages as those of the third embodiment can be obtained.

Although the annular magnets 28 and 29 are used as the field magnets in the second and third embodiments, a plurality of flat plate-shaped permanent magnets may be arranged in the circumferential direction to generate magnetic fields in the claw poles 41*b* to 44*b*. One disk-shaped permanent magnet may be interposed between a pair of core bases in the axial direction to generate magnetic fields in the claw poles 41*b* to 44*b*.

In the fourth embodiment, the circumferential width L1 of the proximal end of each of the claw poles 21*b* and 24*b* is made narrower than the circumferential width L2 of the proximal end of each of the claw poles 22*b* and 23*b*, thereby setting the amount of magnetic flux flowing between the claw poles from the core base. Alternatively, if the amount of magnetic flux passing between the core base and the claw pole can be adjusted, a cross-sectional area (area of cross section in circumferential direction) of a portion of the claw pole extending circumferentially outward from the core base may be set. For example, the axial widths of portions of the proximal ends of the claw poles 21*b* and 24*b* of the rotor cores 21 and 24 on axial ends extending circumferentially outward from the core bases 21*a* and 24*a* may be made narrower than the axial widths of proximal ends of the claw poles 22*b* and 23*b* of the other rotor cores 22 and 23. The circumferential widths and the axial widths of the proximal ends of the claw poles 21*b* and 24*b* may be made narrower than the circumferential widths and the axial widths of the proximal ends of the claw poles 22*b* and 23*b*.

In the fifth embodiment, all of the claw portions 121*d* to 124*d* of the claw poles 121*b* to 124*b* have the same shapes. However, if the surface areas of the radially outer end surfaces 121*h* to 124*h* of the claw portions 121*d* to 124*d* are equal to each other, the shapes of the claw portions 121*d* to 124*d* may be different from each other.

In the fifth embodiment, the interpole magnets 127 and 128 located between the claw poles 121*b* to 124*b* extend from the axial end surface 121*k* of the rotor core 121 on an axial side to the other axial end surface 124*k* of the rotor core 124 on the other axial side, but the invention is not limited to this configuration. For example, it is possible to employ such a configuration that an interpole magnet is divided into a plurality of pieces (in accordance with the number of pairs of rotor cores for example) and is arranged in the axial direction.

Although the pair of first and second rotor cores 121 and 122 and the pair of third and fourth rotor cores 123 and 124 are assembled with the rotary shaft 12 such that the rotor cores are laminated on each other in the axial direction in the fifth embodiment, a plurality of pairs of rotor cores may be assembled with the rotary shaft 12.

The cross-sectional areas of the proximal ends of the claw poles 121*b* and 124*b* of the rotor cores 121 and 124 on the axial ends, i.e., the cross-sectional areas of the projections 121*c* and 124*c* are made wider than cross-sectional areas of the proximal ends of the claw poles 122*b* and 123*b* of the other rotor cores 122 and 123, i.e., cross-sectional areas of the projections 122*c* and 123*c* by changing the circumferential angles H1 and H3 (widths) of the projections 121*c* to 124*c* in the fifth embodiment, but the invention is not limited to this configuration. For example, the cross-sectional areas of the projections 121*c* and 124*c* may be made wider than the cross-sectional areas of the projections 122*c* and 123*c* by changing the axial thicknesses of the projections 121*c* to 124*c*.

In the fifth and seventh embodiments, each of the pairs of first rotor cores 121 and 321 and the second rotor cores 122 and 322, and the pairs of third rotor cores 123 and 323 and the fourth rotor cores 124 and 324 is provided with the single annular magnet 125, 126, 325 and 326 as a field magnet, but the invention is not limited to this configuration. For example, it is possible to employ such a configuration that a plurality of divided permanent magnets are located between the core bases 121*a* and 122*a* (321*a* and 322*a*) of the pair of rotor cores 121 and 122 (321 and 322) and the core bases 123*a* and 124*a* (323*a* and 324*a*) of the pair of rotor core 123 and 124 (323 and 324) in the axial direction around the rotary shaft 12.

Although it is not particularly mentioned in the fifth to seventh embodiments, the first to fourth rotor cores 121 to 124, 221 to 224 and 321 to 324 and the armature core 7 may be formed by laminating magnetic metal plates or by molding magnetic powder for example.

From the rotor 11 of the sixth embodiment, the first and second back surface auxiliary magnets 224 and 225 may be omitted, the first and second interpole magnets 226 and 227 may be omitted, or both first and second back surface auxiliary magnets 224 and 225 and the first and second interpole magnets 226 and 227 may be omitted.

Although the rotor 11 has one set of the pair of rotor cores and the magnets 223 and 227 in the sixth embodiment, the invention is not limited to this configuration, the rotor may be of a tandem structure in which a plurality of sets are laminated on each other in the axial direction. For example, a rotor 231 shown in FIG. 25 includes two sets of magnets 223 to 227. That is, the first and second rotor cores 221 and 222 are provided two each, the two second rotor cores 22 abut against each other in the axial direction, and the rotor cores are laminated on one another such that the first rotor cores 21 are located on axially outsides. The claw poles 221*b* and 222*b* are configured such that the magnetic poles arranged in the axial direction have the same polarities. In the configuration shown in FIG. 25 also, the axial length Hr of the entire rotor 231, i.e., the length from the axial outer end surface of the first rotor core 221 existing on the upper side in the drawing to the axial outer end surface of the first rotor core 221 existing on the lower side is set greater than the axial length Hs of the armature core 7 of the stator 6, and the same advantages as those of the sixth embodiment can be obtained.

In the rotor 231 of such a tandem structure, the core base 221*a* of the first rotor core 221 and the core base 222*a* of the second rotor core 222 are arranged in the axial direction. According to the structure shown in FIG. 25, of the core bases 221*a* and 222*a*, which are arranged in the axial direction, the axial thickness T1 of each of the core bases 221*a* located on both ends in the axial direction is thicker than the axial thickness T2 of the core base 222*a* located on the inner side in the axial direction. Since the axial outer end surface of the core base 221*a* faces outside, magnetic flux is prone to leak therefrom. However, according to the structure shown in FIG. 25, since the axial thickness of the core base 221*a* is increased, the magnetic saturation in the core base 221*a* is suppressed. As a result, it is possible to suppress the generation of leakage magnetic flux from the axial outer end surface of the core base 221*a*.

Figure 25:
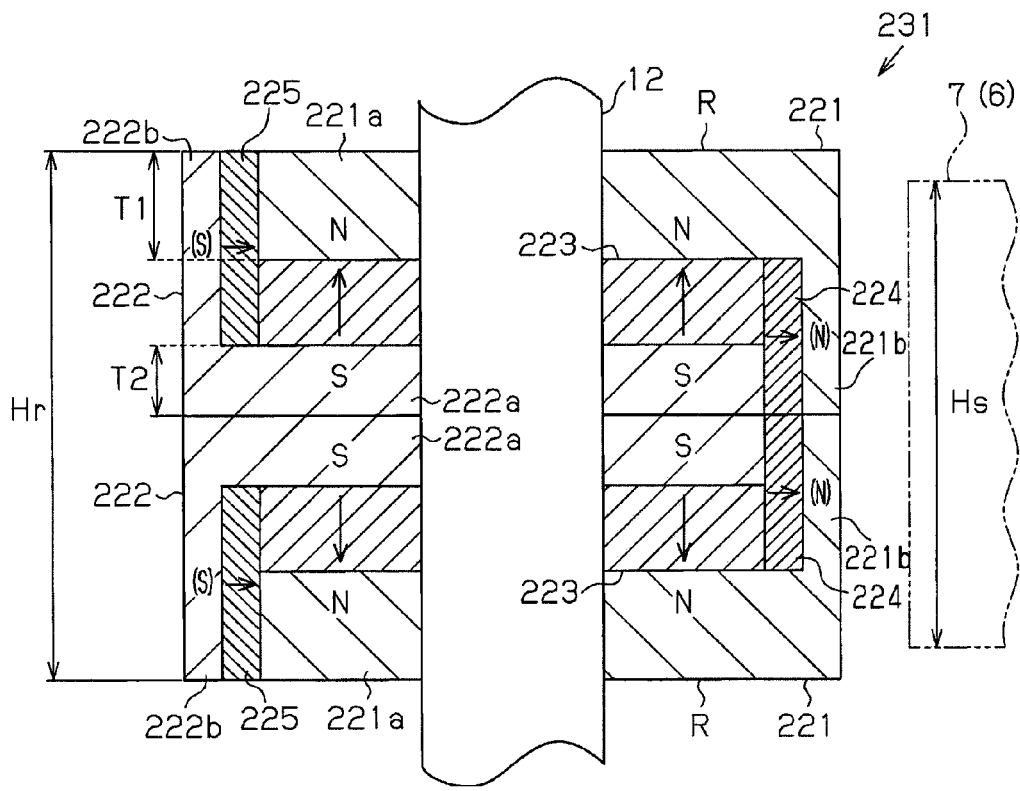
FIG. 25 is a cross-sectional view of a rotor according to a modification.

Although the axial thickness T1 of the core base 221*a* is set thicker than the axial thickness T2 of the core base 222*a* in the configuration shown in FIG. 25, the axial thickness T1 of the core base 221*a* may be set thinner than the axial thickness T2 of the core base 222*a*. Although the two sets of the pair of rotor cores and the magnets 223 to 27 are provided in this configuration, the number of sets is not limited to this, and three or more sets may be employed.

In the sixth embodiment, the shape and the number of the claw poles 221b and 222b may appropriately be changed in accordance with configuration.

Although a winding method of the stator 6 around the teeth is not particularly mentioned in the sixth embodiment, concentrated winding or distributed winding may be employed.

Figure 30:
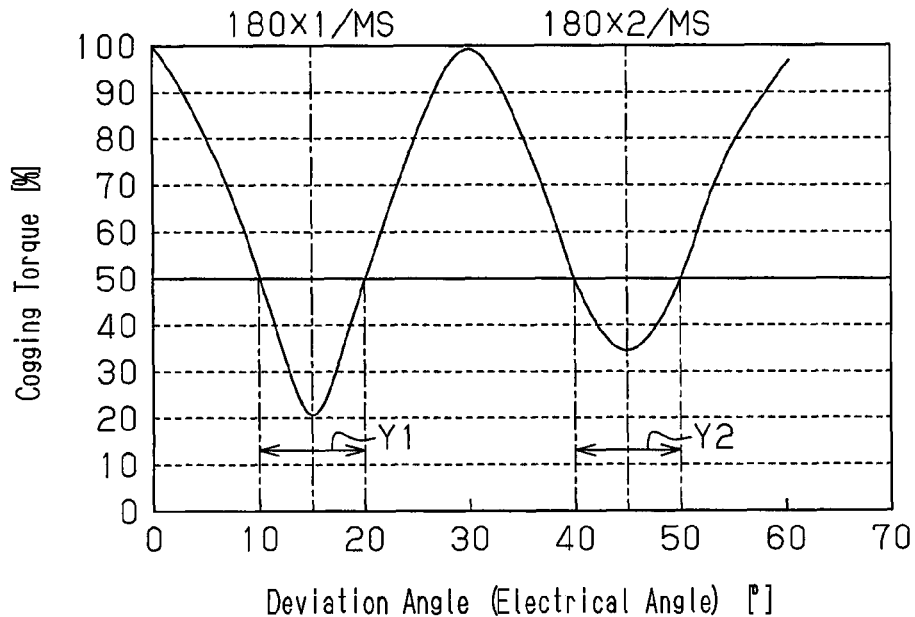
FIG. 30 is a graph showing a relationship between a cogging torque and a deviation angle θ between the rotor cores shown in FIG. 26.

Although it is not particularly mentioned in the seventh embodiment, when a least common multiple of the number of magnetic poles of the rotor 11 and the number of slots of the stator 6 is defined as MS and n is set to 1 or 2, it is preferable that θ is set in a range of 180°×n/MS−5°<θ≤180°×n/MS+5°. For example, when the least common multiple MS is set to 12 and n is set to 1, the deviation angle θ is set in a range of 10°≤θ≤20° (Y1 in FIG. 30). When the least common multiple MS is set to 12 and n is set to 2, the deviation angle θ is set in a range of 40°≤θ≤50° (Y2 in FIG. 30). According to this configuration, it is possible to reduce the cogging torque to 50% as shown in FIG. 30.

Figure 31:
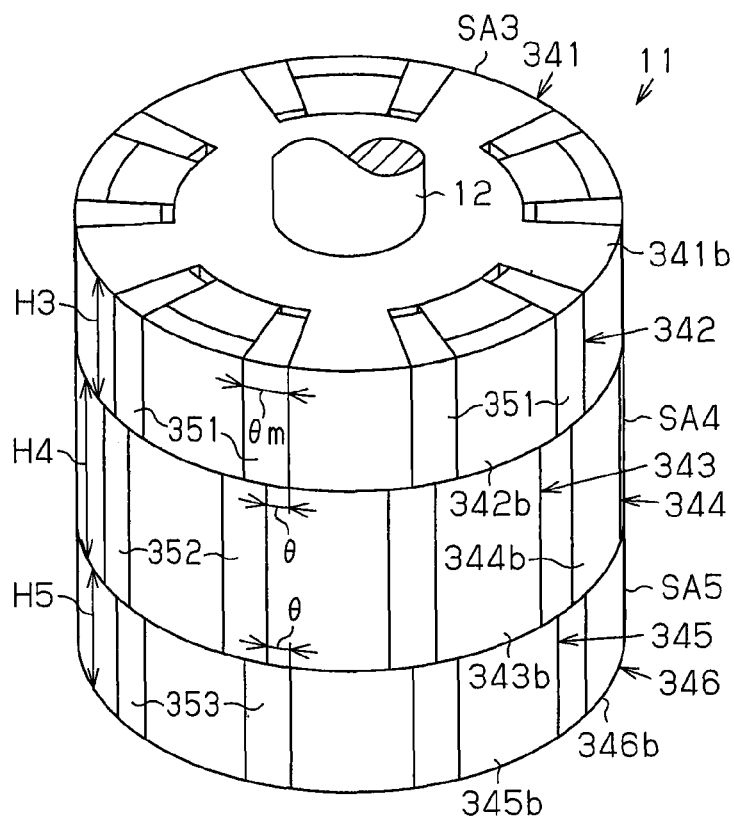
FIG. 31 is a perspective view of a rotor according to a modification.

In the seventh embodiment, the assembly SA1 including the pair of rotor cores 321 and 322 and the assembly SA2 including the pair of rotor cores 331 and 332 are laminated on each other and the number of laminated assemblies is two as the tandem structure. However, the number of laminated assemblies may be appropriately changed to three or more as shown in FIG. 31 for example.

Figure 32:
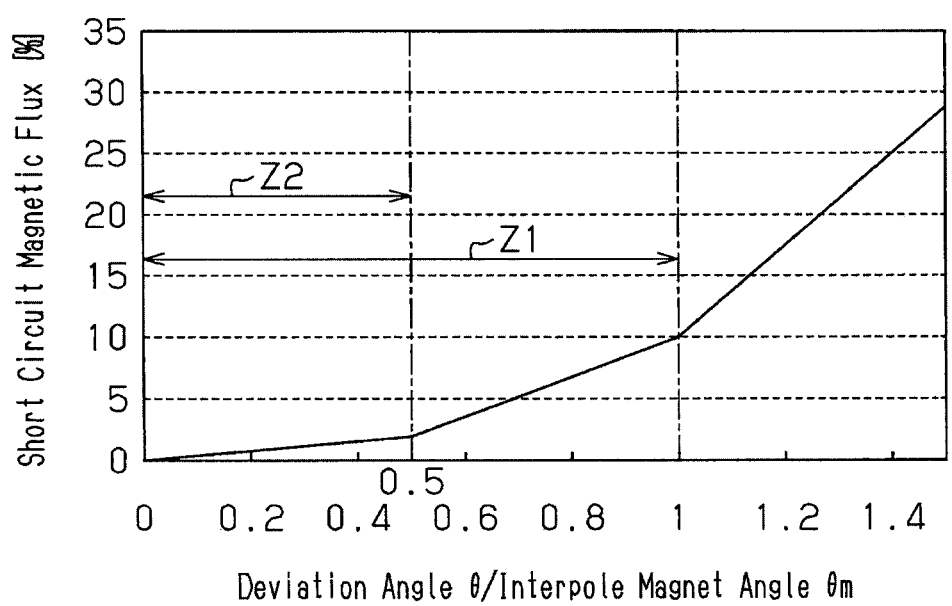
FIG. 32 is a graph showing a relationship between a flux linkage amount and a deviation angle θ between rotor cores shown in FIG. 31.

In the seventh embodiment, the axial length of the first assembly SA1 including the pair of rotor cores 321 and 322, i.e., the length between axial end surfaces of the rotor cores 321 and 322 and the axial length of the second assembly SA2 including the pair of rotor cores 331 and 332, i.e., the length between the axial end surfaces of the rotor cores 331 and 332 are the same, but the invention is not limited to this configuration. For example, the axial length of the first assembly SA1 and the axial length of the second assembly SA2 may be different from each other. Also in a configuration in which three or more assemblies each having a pair of rotor cores are laminated on each other for example, the axial lengths of the pairs of rotor cores may be different from each other. According to a rotor 11 shown in FIG. 31 for example, rotor cores 341 and 342 form a third assembly SA3, rotor cores 343 and 344 form a fourth assembly SA4, and rotor cores 345 and 346 form a fifth assembly SA5. Each of the rotor cores 341 to 346 includes a plurality of claw poles 341b to 346b. Interpole magnets 350, 351 and 352 are arranged between a circumferentially adjacent pair of the claw poles 341b to 346b. The deviation angle θ between the rotor cores 341 and 346 in the circumferential direction, i.e., the deviation angle θ between the assemblies SA3, SA4 and SA5 is set in a range of 0<θ≤θm when the circumferential width of the interpole magnets 350, 351 and 352 is defined as θm. When the axial lengths of the assemblies SA3, SA4 and SA5 are the same, the magnetic circuits (paths) of each of the pair of rotor cores are completed and balanced. Hence, a short circuit magnetic flux between the magnetic poles of the pair of rotor cores is small. However, when the axial lengths L3, L4 and L5 of the assemblies SA3, SA4 and SA5 are different from each other, there is a tendency that a short circuit magnetic flux is increased. In this case, by reducing the deviation angle θ to the circumferential widths θm of the interpole magnets 350, 351 and 352 or less, it is possible to suppress the short circuit magnetic flux from the first magnetic pole to the second magnetic pole as shown as Z1 in FIG. 32 by a rectification effect of magnetic flux caused by the interpole magnets 350, 351 and 352. By setting the deviation angle θ in a range of 0<θ≤θm/2, it is possible to further suppress the short circuit magnetic flux from the first magnetic pole to the second magnetic pole as shown as Z2 in FIG. 32 by a rectification effect of magnetic flux caused by the interpole magnets 50, 51 and 52.

The invention claimed is:

1. A motor comprising:
a rotor having an axial direction, the rotor comprising:
at least a pair of rotor cores arranged in the axial direction; and
a field magnet arranged between the rotor cores and magnetized in the axial direction, wherein
each of the rotor cores includes a plurality of claw poles extending in the axial direction, and
each of the rotor cores are configured to appropriately cause a magnetic flux to flow to the claw poles, and
a stator around which a coil is wound, the stator having an annular stator core located outside of the rotor in its radial direction,
wherein
an axial length of the rotor core of the rotor is greater than an axial length of the stator core,
auxiliary magnets are located on the back surfaces of the claw poles,
the claw poles of a first rotor core of each pair of the rotor cores extend in the axial direction to an axial outer end surface of a second rotor core of the pair,
the claw poles of the second rotor cores extend to axial outer end surfaces of the first rotor cores in the axial direction, and
the axial outer end surface of each of the auxiliary magnets protrudes from a corresponding axial outer end surface of the stator core in the axial direction.

2. The motor according to claim 1, wherein
each of the rotor cores further includes a disk-shaped core base,
the claw poles extend in a radial direction of the rotor from an outer periphery of the core base and extend in the axial direction,
each of the claw poles is formed into a rectangular shape as viewed in the radial direction,
at least the pair of rotor cores are arranged such that the claw poles of each of the rotor cores extend in directions opposite from each other in the axial direction and the claw poles of the rotor cores are arranged alternately in a circumferential direction of the rotor, and
each of the rotor cores includes magnetic flux restricting portions, which are formed on distal ends of the claw poles and open outward in the radial direction.

3. The motor according to claim 2, wherein each of the magnetic flux restricting portions is an auxiliary groove, which extends from a distal end toward a proximal end of the claw pole, and extends from an outer peripheral surface to an inner peripheral surface of the claw pole.

4. The motor according to claim 2, wherein two or more of the magnetic flux restricting portions are formed on a distal end of each of the claw poles in the circumferential direction.

5. The motor according to claim 1, wherein
each of the rotor cores further includes a disk-shaped core base,
the claw poles extend in a radial direction of the rotor from an outer periphery of the core base and extend in the axial direction,
at least the pair of rotor cores are arranged such that the claw poles of each of the rotor cores extend in directions opposite from each other in the axial direction and the claw poles of the rotor cores are arranged alternately in a circumferential direction of the rotor, the rotor further includes a plurality of interpole magnets each arranged between a circumferentially adjacent pair of the claw poles, the interpole magnets are magnetized such that each of surfaces thereof that faces a claw pole in the circumferential direction has the same polarity as that of the faced claw pole, and each of the rotor cores includes a magnetic flux guiding portion, which is formed on a distal end of the claw pole and guides magnetic flux of the interpole magnet to an outer peripheral surface of the claw pole.

6. The motor according to claim 5, wherein each of the magnetic flux guiding portions includes a radially inner end surface and a radially outer end surface, the radially inner end surface includes circumferential ends and a circumferential central portion, and a distance between the circumferential central portion and the radially outer end surface in the radial direction is smaller than a distance between the circumferential ends and the radially outer end surface in the radial direction.

7. The motor according to claim 6, wherein at least two pairs of rotor cores are arranged in the axial direction, and circumferential widths of proximal ends of claw poles possessed by the rotor cores arranged on axial ends are narrower than circumferential widths of proximal ends of the claw poles possessed by the other rotor cores.

8. The motor according to claim 5, wherein a circumferential central portion of the magnetic flux guiding portion projects inward in the radial direction.

9. The rotor according to claim 1, wherein at least two pairs of rotor cores are arranged in the axial direction, the rotor cores are arranged such that the rotor cores having the same polarities are adjacent to each other, and a cross-sectional area in the circumferential direction of the proximal end of the claw poles possessed by the rotor cores arranged on axial ends is narrower than a cross-sectional area in the circumferential direction of the proximal end of the claw poles possessed by the other rotor cores.

10. The motor according to claim 9, further comprising an auxiliary magnet arranged between the claw pole of first one of each of the pairs of rotor cores and the core base of second one of the pair of rotor cores, wherein the auxiliary magnet is magnetized such that a portion of the auxiliary magnet close to the claw pole has the same polarity as that of the claw pole and that a portion of the auxiliary magnet close to the core base has the same polarity as that of the core base.

11. The motor according to claim 9, further comprising a plurality of interpole magnets each arranged between a circumferentially adjacent pair of the claw poles, wherein each of the interpole magnets is magnetized such that a surface of the interpole magnet that faces the claw pole in the circumferential direction has the same polarity as that of the faced claw pole.

12. The motor according to claim 11, wherein each of the interpole magnets extends from an axial outer end surface of the rotor core located on a first end in the axial direction to an axial outer end surface of the rotor core located on a second end in the axial direction.

13. The motor according to claim 1, wherein at least two pairs of rotor cores are arranged in the axial direction, the rotor cores are arranged such that the rotor cores having the same polarities are adjacent to each other, the rotor further includes interpole magnets, each arranged between a circumferentially adjacent pair of the claw poles, each of the interpole magnets is magnetized such that a surface thereof facing the claw pole in the circumferential direction has the same polarity as that of the faced claw pole, and the claw pole of each of the rotor core is formed such that circumferential center lines of the two interpole magnets located on both sides in the circumferential direction have an angle with respect to a radial direction of the rotor.

14. The motor according to claim 1, wherein at least two pairs of rotor cores are arranged in the axial direction, the rotor cores are arranged such that the rotor cores having the same polarities are adjacent to each other, and a cross-sectional area in the circumferential direction of the proximal end of the claw poles possessed by the rotor cores located on axial ends is wider than a cross-sectional area in the circumferential direction of the proximal end of the claw poles possessed by the other rotor cores.

15. The motor according to claim 14, wherein all of radially outer end surfaces of the claw poles have the same shapes.

16. The motor according to claim 14, further comprising a plurality of interpole magnets each arranged between a circumferentially adjacent pair of the claw poles, wherein each of the interpole magnets is magnetized such that a surface of the interpole magnet that faces a claw pole in the circumferential direction has the same polarity as that of the faced claw pole.

17. The motor according to claim 16, wherein each of the interpole magnets extends from an axial outer end surface of the rotor core located on a first end in the axial direction to an axial outer end surface of the rotor core located on a second end in the axial direction.

18. The motor according to claim 1, wherein at least two pairs of rotor cores are arranged in the axial direction, and axial thicknesses of the rotor cores located on axial ends are thicker than axial thicknesses of the other rotor cores.

* * * * *